United States Patent
Tokuchi

(10) Patent No.: US 12,348,664 B2
(45) Date of Patent: *Jul. 1, 2025

(54) INFORMATION PROCESSING APPARATUS, METHOD AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,838

(22) Filed: Jun. 13, 2024

(65) Prior Publication Data

US 2024/0357033 A1 Oct. 24, 2024

Related U.S. Application Data

(63) Continuation of application No. 18/326,005, filed on May 31, 2023, now Pat. No. 12,047,526, which is a
(Continued)

(30) Foreign Application Priority Data

Nov. 14, 2017 (JP) .................. 2017-219080

(51) Int. Cl.
*H04L 51/216* (2022.01)
*G06F 3/04886* (2022.01)
(Continued)

(52) U.S. Cl.
CPC .... *H04M 1/72436* (2021.01); *G06F 3/04886* (2013.01); *H04L 51/04* (2013.01);
(Continued)

(58) Field of Classification Search
CPC . H04L 51/216; H04L 51/226; G06F 3/04886; G06F 203/04803
See application file for complete search history.

(56) References Cited

U.S. PATENT DOCUMENTS 8,249,352 B2 8/2012 Konno
8,452,343 B2 5/2013 Arisawa
(Continued)

FOREIGN PATENT DOCUMENTS

CN 1882189 12/2006
CN 101377855 3/2009
(Continued)

OTHER PUBLICATIONS

Liang Huang et al., "Delphi5.0 Network Programming: Basic to Advanced", Oct. 2000, with English translation thereof of pp. 85, National Defense Industry Press, vol. 1, Beijing, China.
(Continued)

*Primary Examiner* — Myron Wyche
(74) *Attorney, Agent, or Firm* — JCIPRNET

(57) ABSTRACT

An information processing apparatus, method and non-transitory computer readable medium are provided. The information processing apparatus includes a controller configured to: align and display a first conversation screen for making a conversation with a first conversation partner, and a second conversation screen for making a conversation with a second conversation partner to a user; when a gesture movement performed toward the second conversation screen is received from a message transmitted by a person other than the user, included in the first conversation screen, comprising: in response to the gesture movement ending on the second conversation screen, copy a message transmitted by the person other than the user as a message with the user as a transmitter and the second conversation partner as a destination, and in response to the gesture movement not
(Continued)

ending on the second conversation screen, not copy the messages transmitted by the person other than the user.

9 Claims, 33 Drawing Sheets

Related U.S. Application Data continuation of application No. 17/400,140, filed on Aug. 12, 2021, now Pat. No. 11,785,132, which is a continuation of application No. 16/985,198, filed on Aug. 4, 2020, now Pat. No. 11,134,147, which is a continuation of application No. 16/671,156, filed on Oct. 31, 2019, now Pat. No. 10,771,612, which is a continuation of application No. 16/118,463, filed on Aug. 31, 2018, now Pat. No. 10,498,878.

(51) Int. Cl.
    *H04L 51/04*       (2022.01)
    *H04L 51/226*     (2022.01)
    *H04M 1/72436*   (2021.01)

(52) U.S. Cl.
    CPC .......... *H04L 51/216* (2022.05); *H04L 51/226* (2022.05); *G06F 2203/04803* (2013.01)

(56) References Cited

U.S. PATENT DOCUMENTS

| | | |
|---|---|---|
| 8,621,022 B2 | 12/2013 | Buchheit et al. |
| 9,015,257 B2 | 4/2015 | Buchheit et al. |
| 9,015,264 B2 | 4/2015 | Buchheit et al. |
| 9,026,935 B1 | 5/2015 | Rasmussen et al. |
| 9,071,566 B2 | 6/2015 | Buchheit et al. |
| 9,124,543 B2 | 9/2015 | Buchheit et al. |
| 9,258,399 B2 | 2/2016 | Kim et al. |
| 9,508,029 B2 | 11/2016 | Tani et al. |
| 9,781,285 B2 | 10/2017 | Tani et al. |
| 9,800,530 B2 | 10/2017 | Chen et al. |
| 9,819,624 B2 | 11/2017 | Buchheit et al. |
| 9,996,248 B2 | 6/2018 | Park et al. |
| 10,075,605 B2 | 9/2018 | Tani et al. |
| 10,284,506 B2 | 5/2019 | Buchheit et al. |
| 10,331,292 B2 | 6/2019 | Arisada et al. |
| 10,374,985 B2 | 8/2019 | Kim et al. |
| 10,447,880 B2 | 10/2019 | Tani et al. |
| 10,817,163 B2 | 10/2020 | Critchlow |
| 10,819,871 B2 | 10/2020 | Tani et al. |
| 11,010,012 B2 | 5/2021 | Arisada et al. |
| 11,134,147 B2 | 9/2021 | Tokuchi |
| 12,047,526 B2 * | 7/2024 | Tokuchi ................ H04L 51/04 |
| 2003/0131064 A1 | 7/2003 | Bell, III et al. |
| 2004/0025112 A1 | 2/2004 | Chasen et al. |
| 2007/0226309 A1 | 9/2007 | Bell, III et al. |
| 2007/0242656 A1 | 10/2007 | Klassen et al. |
| 2008/0039152 A1 | 2/2008 | Arisawa |
| 2008/0270560 A1 | 10/2008 | Tysowski et al. |
| 2010/0203908 A1 | 8/2010 | Jeong et al. |
| 2011/0296320 A1 | 12/2011 | Kwon et al. |
| 2012/0096393 A1 | 4/2012 | Shim et al. |
| 2013/0069969 A1 | 3/2013 | Chang et al. |
| 2013/0072262 A1 | 3/2013 | Mhun et al. |
| 2013/0100036 A1 | 4/2013 | Papakipos et al. |
| 2013/0218987 A1 | 8/2013 | Chudge et al. |
| 2014/0046961 A1 | 2/2014 | Buchheit et al. |
| 2014/0089843 A1 | 3/2014 | Yoshida |
| 2014/0136989 A1 | 5/2014 | Choi |
| 2014/0164540 A1 | 6/2014 | Park |
| 2014/0195933 A1 | 7/2014 | Rao DV |
| 2015/0012881 A1 | 1/2015 | Song et al. |
| 2015/0350148 A1 | 12/2015 | Kenney et al. |
| 2016/0018954 A1 | 1/2016 | Park et al. |
| 2016/0065529 A1 | 3/2016 | Katayama |
| 2016/0231878 A1 | 8/2016 | Tsuda et al. |
| 2016/0246763 A1 | 8/2016 | Higuchi et al. |
| 2017/0083168 A1 | 3/2017 | Linner |
| 2017/0131864 A1 | 5/2017 | Edgar |
| 2017/0177169 A1 | 6/2017 | Arisada et al. |
| 2018/0198887 A1 | 7/2018 | Nishimura et al. |
| 2019/0014065 A1 | 1/2019 | Lim et al. |

FOREIGN PATENT DOCUMENTS

| | | |
|---|---|---|
| CN | 101605109 | 12/2009 |
| CN | 101923425 | 12/2010 |
| CN | 102244703 | 11/2011 |
| CN | 102495705 | 6/2012 |
| CN | 102833408 | 12/2012 |
| CN | 103181089 | 6/2013 |
| CN | 103309673 | 9/2013 |
| CN | 103369089 | 10/2013 |
| CN | 103797438 | 5/2014 |
| CN | 104104585 | 10/2014 |
| CN | 104391625 | 3/2015 |
| CN | 104679381 | 6/2015 |
| CN | 105511777 | 4/2016 |
| CN | 105607827 | 5/2016 |
| CN | 105786507 | 7/2016 |
| CN | 105930071 | 9/2016 |
| CN | 106569903 | 4/2017 |
| CN | 106649245 | 5/2017 |
| CN | 107168626 | 9/2017 |
| CN | 107222382 | 9/2017 |
| CN | 107231242 | 10/2017 |
| EP | 1734728 | 8/2014 |
| EP | 3015978 | 5/2016 |
| EP | 2393268 | 4/2019 |
| EP | 3570526 | 10/2021 |
| JP | H0475094 | 3/1992 |
| JP | 2002-344582 | 11/2002 |
| JP | 2007531165 | 11/2007 |
| JP | 2008048061 | 2/2008 |
| JP | 2010-193235 | 9/2010 |
| JP | 2016143385 | 8/2016 |
| JP | 6062027 | 1/2017 |
| JP | 2017111674 | 6/2017 |
| WO | 2012178121 | 12/2012 |
| WO | 2016108545 | 7/2016 |

OTHER PUBLICATIONS

"Office Action of China Counterpart Application", issued on Nov. 18, 2023, with English translation thereof, pp. 1-28.
"Office Action of China Counterpart Application", issued on Mar. 15, 2024, with English translation thereof, p. 1-p. 24.
"Office Action of U.S. Appl. No. 18/326,005", issued on Dec. 14, 2023, pp. 1-19.
"Notice of Allowance of U.S. Appl. No. 18/326,005", issued on Mar. 18, 2024, pp. 1-12.
"Corrected Notice of Allowance of U.S. Appl. No. 18/326,005", issued on May 21, 2024, pp. 1-8.
"Office Action of China Counterpart Application", issued on Aug. 3, 2024, with English translation thereof, p. 1-p. 22.
"Decision on Rejection of China Counterpart Application", issued on Oct. 17, 2024, with English translation thereof, p. 1-p. 22.

* cited by examiner

INFORMATION PROCESSING APPARATUS, METHOD AND NON-TRANSITORY COMPUTER READABLE MEDIUM

CROSS-REFERENCE TO RELATED APPLICATIONS

The present application is a continuation application of U.S. application Ser. No. 18/326,005 which is filed on May 31, 2023. The prior application is a continuation application of U.S. application Ser. No. 17/400,140 which is filed on Aug. 12, 2021, and now issued as U.S. Pat. No. 11,785,132B2. The prior application Ser. No. 17/400,140 is a continuation application of U.S. application Ser. No. 16/985,198 which is filed on Aug. 4, 2020, and now issued as U.S. Pat. No. 11,134,147B2. The prior application Ser. No. 16/985,198 is a continuation application of and claims the priority benefit of U.S. patent application Ser. No. 16/671,156, filed on Oct. 31, 2019 and now issued as U.S. Pat. No. 10,771,612B2, which claims the priority benefit of U.S. Pat. No. 10,498,878B2, filed on Aug. 31, 2018 and Japanese Patent Application No. 2017-219080, filed on Nov. 14, 2017. The entirety of the above-mentioned patent applications is hereby incorporated by reference herein and made a part of this specification.

BACKGROUND

Technical Field

The present invention relates to an information processing apparatus, method and a non-transitory computer readable medium.

SUMMARY

Aspects of non-limiting embodiments of the present disclosure relate to changing what is being displayed on a display in accordance with a user operation.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the invention, there is provided an information processing apparatus comprising a controller configured to: simultaneously display a first conversation screen, which is used for making a conversation with a user and a first conversation group, and a second conversation screen, which is used for making a conversation with the user and a second conversation group, on the display device; when a gesture movement performed toward the second conversation screen is received from a message transmitted by a person of the first conversation group, comprising: in response to the gesture movement ending on the second conversation screen, paste the message transmitted by the person of the first conversation group as a message with the user as a transmitter and the second conversation group as a destination, and display the pasted message in the second conversation screen; and in response to the gesture movement not ending on the second conversation screen, not paste the message transmitted by the person of the first conversation group among plural conversation groups.

According to an aspect of the invention, there is provided an information processing method performed by a controller, comprising: simultaneously displaying a first conversation screen, which is used for making a conversation with a user and a first conversation group, and a second conversation screen, which is used for making a conversation with the user and a second conversation group, on a display device; and when a gesture movement performed toward the second conversation screen is received from a message transmitted by a person of the first conversation group, comprising: in response to the gesture movement ending on the second conversation screen, pasting the message transmitted by the person of the first conversation group as a message with the user as a transmitter and the second conversation group as a destination, and displaying the pasted message in the second conversation screen; and in response to the gesture movement not ending on the second conversation screen, not pasting the messages transmitted by the person of the first conversation group among plural conversation groups According to an aspect of the invention, there is provided a non-transitory computer readable medium on which a program is stored. When the program is executed by a computer, the information processing method described above is implemented.

BRIEF DESCRIPTION OF THE DRAWINGS

Exemplary embodiment(s) of the present invention will be described in detail based on the following figures, wherein.

DETAILED DESCRIPTION

First Exemplary Embodiment

Figure 1:
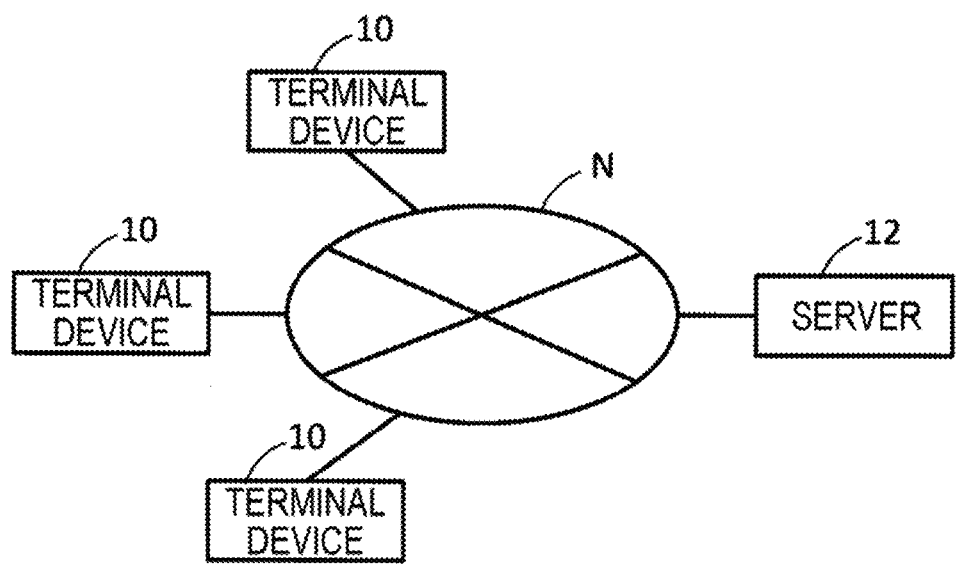
FIG. 1 is a block diagram illustrating the configuration of an information processing system according to a first exemplary embodiment of the present invention.

Hereinafter, an information processing system according to a first exemplary embodiment of the present invention will be described with reference to FIG. 1. FIG. 1 illustrates an example of an information processing system according to the first exemplary embodiment.

The information processing system according to the first exemplary embodiment includes plural terminal devices 10 and a server 12 as an example. For example, each terminal device 10 and the server 12 have a function of communicating with other devices via a communication path N such as the Internet. The terminal device 10 and the server 12 may communicate with other devices via different communication paths as well or may directly communicate with other devices without using the communication path N. In the example illustrated in FIG. 1, three terminal devices 10 are provided in the information processing system, but fewer or more terminal devices 10 may be provided in the information processing system.

The terminal device 10 is a device such as a personal computer (PC), a tablet PC, a smartphone, a mobile phone or the like, and has a function of exchanging data with other devices. The terminal device 10 may be a wearable terminal (a wristwatch type terminal, a wristband type terminal, a spectacle type terminal, a ring type terminal, a contact lens type terminal, an intracorporeal embedded terminal, a hearable terminal, etc.). Further, the terminal device 10 may have a flexible display as a display device. Examples of the flexible display include an organic electroluminescence type display (flexible organic EL display), an electronic paper type display, and a flexible liquid crystal display. Flexible displays employing other display modes may be used. The flexible display is a display with a flexibly-deformable display portion which can be, for example, bent, folded, rolled, twisted or stretched. The terminal device 10 may be entirely implemented by a flexible display or may be implemented by a flexible display and other components which are functionally or physically separated from each other.

The server 12 is a device for managing data and user information. For example, the server 12 has a function of offering a social networking service (SNS) to a user. The terminal device 10 can use the SNS offered by the server 12 to exchange information (for example, a character string, a still image, a moving image, a voice, etc.) with another terminal device 10 using the SNS. In the SNS, conversation (exchange of information) can be made on a conversation group basis and the server 12 manages the conversation in each conversation group. One or plural users (also referred to as speakers) can participate in each conversation group, and information can be exchanged among plural user terminal devices 10 that belong to the same conversation group. For example, when plural users log in to the same conversation group, information is exchanged among the plural user terminal devices 10.

Figure 2:
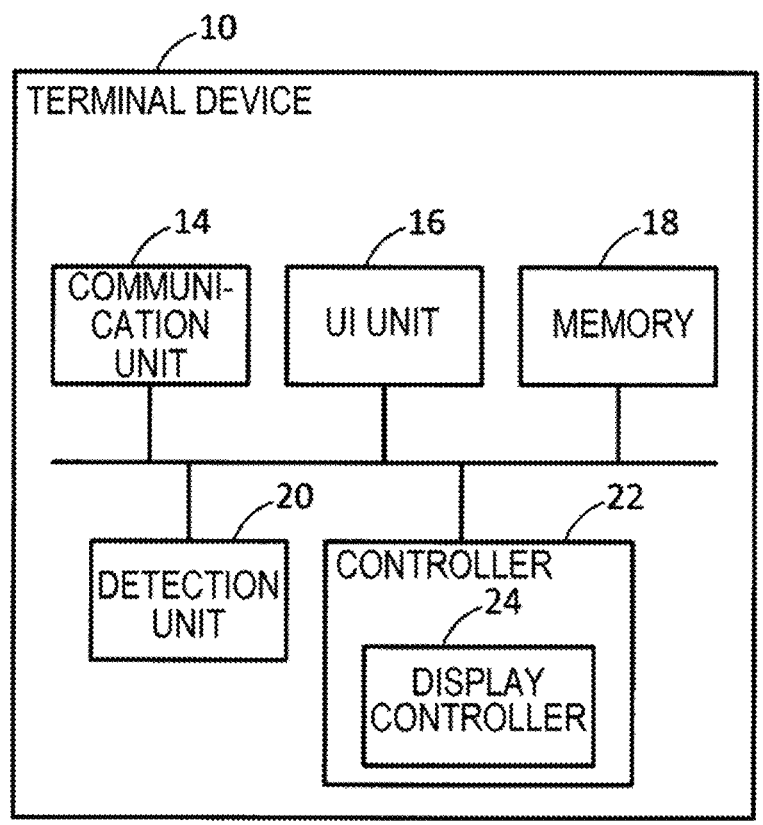
FIG. 2 is a block diagram illustrating the configuration of a terminal device.

Hereinafter, the configuration of the terminal device 10 will be described in detail with reference to FIG. 2.

A communication unit 14 is a communication interface and has a function of transmitting data to other devices and a function of receiving data from other devices. The communication unit 14 may be either a communication interface having a wireless communication function or a communication interface having a wired communication function. For example, the communication unit 14 conforms to one or plural types of communication methods and may communicate with a communication partner according to a communication method suitable for the communication partner (that is, a communication method supported by the communication partner). The communication method is, for example, infrared communication, visible light communication, Wi-Fi® communication, close proximity wireless communication (for example, NFC (Near Field Communication), etc.), or the like. As the close proximity wireless communication, Felica®, Bluetooth®, RFID (Radio Frequency Identifier) and the like are used. Other types of wireless communication may be used as well as the close proximity wireless communication. The communication unit 14 may switch the communication method or the frequency band depending on a communication partner or the surrounding environments.

A UI unit 16 is a user interface unit and includes a display unit and an operation unit. The display unit is a display device such as a liquid crystal display. The display unit may be a flexible display. The operation unit is an input device such as a touch panel or a keyboard. The UI unit 16 may be a user interface that also serves as a display unit and an operation unit (including, for example, a touch type display, a device that electronically displays a keyboard or the like on a display). Further, the UI unit 16 may include a sound collecting unit such as a microphone and a sound generating unit such as a speaker. In this case, information may be input to the terminal device 10 by voice input or may be issued by voice.

A memory 18 is a storage device such as a hard disk or a memory (for example, SSD, etc.). The memory 18 stores, for example, various data, various programs (for example, OS (Operating System), various application programs (application software), etc.), information indicating addresses of other terminal devices 10 (terminal address information), information indicating an address of the server 12 (server address information), and the like. They may be stored in separate storage devices or may be stored in one storage device. For example, when an SNS application program for utilizing the SNS offered by the server 12 is stored in the memory 18 and the SNS application program is executed, the SNS can be used. In addition, information transmitted and/or received by the terminal device 10 using the SNS may be stored in the memory 18.

A detection unit 20 has a function of detecting an operation of a user. The operation by the user is, for example, gesture motion, voice or the like of the user. The gesture motion may include, for example, finger movement, hand movement, arm movement, neck movement, foot movement, eyeball movement, eyelid movement, upper body movement, lower body movement, whole body movement, expression change, mouth movement and the like of the user. For example, the detection unit 20 uses a sensor to detect the user's operation. As the sensor, for example, a sensor for detecting physical contact with the display unit of the UI unit 16 is used. As such a sensor, for example, a pressure sensor for detecting a pressure on the display unit, a capacitance sensor for detecting a change in capacitance, a temperature sensor for detecting a change in temperature due to contact, a humidity sensor for detecting a change in humidity are used. A camera may be also used as the sensor. The camera may be used to detect physical contact with the display unit or the operation by the user not physically contacting the display unit. When a flexible display is used as the display unit, a pressure sensor, an acceleration sensor, a gyroscope sensor or the like is used as the sensor, and the detection unit 20 may detect a change in bending of the flexible display, a change in pressure, a change in capacitance, a change in optical characteristics, temperature, humidity, acceleration, direction, etc. In addition, the operation of the user may be detected by an external sensor installed in a location or a device other than the terminal device 10. In this case, information indicating a result of the detection is transmitted from the sensor to the terminal device 10, and a controller 22 receives the information. When the external sensor is used, the terminal device 10 may not have a sensor. Further, a sound collecting device such as a microphone may be used as the sensor, and the detection unit 20 may detect the user's voice.

The controller 22 has a function of controlling the operation of each unit of the terminal device 10. For example, the controller 22 executes various programs, controls communication by the communication unit 14, controls information notification (for example, display and voice output) using the UI unit 16, receives information input by using the UI unit 16, etc. For example, when the controller 22 executes the SNS application program, it becomes possible to use the SNS offered by the server 12. Further, the controller 22 includes a display controller 24.

The display controller 24 has a function of controlling display of various kinds of information. For example, when the SNS is used, the display controller 24 causes the display unit of the UI unit 16 to display the information (character strings, images, etc.) transmitted or received using the SNS. Voice information transmitted or received using the SNS may be output from a speaker or the like. When the user performs an operation for changing the current conversation partner in the SNS to another conversation partner and the detection unit 20 detects the operation, the display controller 24 changes a screen displayed on the display unit to a screen for making a conversation with the other conversation partner. The process by the display controller 24 will be described in detail later.

Figure 3:
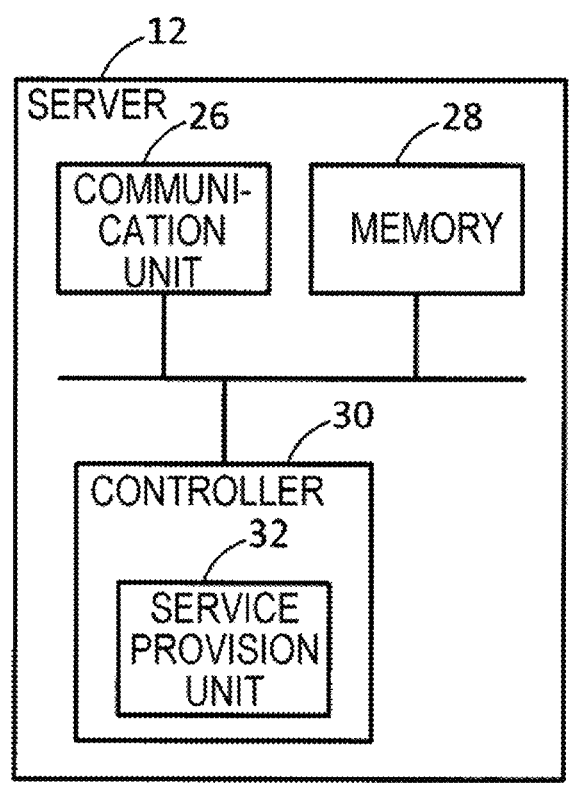
FIG. 3 is a block diagram illustrating the configuration of a server.

Hereinafter, the configuration of the server 12 will be described in detail with reference to FIG. 3. FIG. 3 illustrates the configuration of the server 12.

A communication unit 26 is a communication interface and has a function of transmitting data to other devices and a function of receiving data from other devices. The communication unit 26 may be either a communication interface having a wireless communication function or a communication interface having a wired communication function.

A memory 28 is a storage device such as a hard disk or a memory (for example, SSD, etc.). For example, various kinds of data, various kinds of programs, terminal address information of the terminal device 10, server address information of the server 12, and the like are stored in the memory 28. They may be stored in separate storage devices as well or may be stored in one storage device. For example, information transmitted by the terminal device 10 using the SNS may be stored in the memory 28.

A controller 30 controls the operation of each unit of the server 12. For example, the controller 30 controls communication by the communication unit 26. Further, the controller 30 includes a service provision unit 32.

The service provision unit 32 has a function of providing an SNS to the terminal device 10. For example, the service provision unit 32 transmits information (e.g., character strings, images, sound information, etc.), which is sent from the terminal device 10 to the server 12 using the SNS, to another terminal device 10 using the SNS. Further, the service provision unit 32 has a function of controlling conversation (information exchange) on a conversation group basis. Specifically, the service provision unit 32 controls information exchange among terminal devices 10 of plural users who log in to the same conversation group. That is, the service provision unit 32 transmits information, which is transmitted from a terminal device 10 of a user who is logging in to a certain conversation group to the server 12, to a terminal device 10 of another user who is logging in to the same conversation group. For example, for each conversation group, the service provision unit 32 manages conversation group identification information for identifying the conversation group, identification information for identifying a user who is logging in to the conversation group or a terminal device 10 (for example, user identification information such as a user account, terminal identification information, etc.) in association with each other. The service provision unit 32 refers to the managed information to specify a user who is logging in to each conversation group or a terminal device 10, and controls information exchange among the plural terminal devices 10.

The information exchange using the SNS may be performed via the server 12 or may be performed without going through the server 12 among the plural terminal devices 10 directly (without going through another device) or indirectly (via another device).

Hereinafter, the operation of the terminal device 10 will be described in detail with a specific example.

For example, it is assumed that users A, B and C belong to conversation group 1, users A, D and E belong to conversation group 2, and a conversation is made using an SNS for both conversation groups 1 and 2. For example, it is also assumed that the users A, B and C log in to the conversation group 1 to exchange messages, and the users A, D and E log in to the conversation group 2 to exchange messages.

Each user uses the SNS by using his/her own terminal device 10. The same terminal device 10 may also be shared by plural users when it is possible to switch user accounts on the same terminal device 10 or when it is possible to distinguish between users to exchange information on the same terminal device 10.

In the following description, for the convenience of explanation, a terminal device 10 used by the user A will be referred to as a "terminal device 10A", a terminal device 10 used by the user B will be referred to as a "terminal device 10B", a terminal device 10 used by the user C will be referred to as a "terminal device 10C", a terminal device 10 used by the user D will be referred to as a "terminal device 10D", and a terminal device 10 used by the user E will be referred to as a "terminal device 10E".

For example, a certain user may transmit information to other users so that a conversation group may be formed by these users, or a new user may join or be invited to an already formed conversation group to thereby add the new user to the conversation group. In addition, a conversation group may be formed in advance. These conversation groups are managed by the service provision unit 32 of the server 12.

For example, the users A, B and C use their own terminal devices 10 to activate an SNS application program, and log in to the conversation group 1 formed by the SNS provided by the service provision unit 32. In order to log in, information for identifying a user (for example, a user ID or a name) or authentication information (for example, a password or biometric information of a user) may be used. When the user A instructs transmission of a message to the conversation group 1, the terminal device 10A transmits the message to the server 12. The service provision unit 32 of the server 12 receives the message transmitted from the terminal device 10A, and transmits the message to the terminal device 10B of the user B and the terminal device 10C of the user C. The terminal address information of each of the terminal devices 10B and 10C may be sent from the terminal device 10A to the server 12 or may be stored in advance in the server 12. The service provision unit 32 identifies the terminal devices 10B and 10C using the terminal address information and transmits the message from the user A to the terminal devices 10B and 10C. The display controller 24 of the terminal device 10B causes the display unit of the UI unit 16 to display the message from the terminal device 10A. The same process is performed also in the terminal device 10C.

The service provision unit 32 may transmit to the terminal devices 10B and 10C an acknowledgement message indicating that a message has been sent from the user A. In this case, the display controller 24 of the terminal device 10B causes the display unit to display the acknowledgement message. When the user B uses the UI unit 16 to instruct acquisition of the message from the user A, the terminal device 10B transmits a request for acquisition of the message to the server 12. In response to the acquisition request, the service provision unit 32 transmits the message from the user A to the terminal device 10B. The display controller 24 of the terminal device 10B causes the display unit to display the message. The same process is performed also in the terminal device 10C.

When the user B does not log in to the conversation group 1 or when the SNS application is not activated on the terminal device 10B, the display controller 24 of the terminal device 10B may cause the display unit to display the acknowledgement message. For example, the display controller 24 causes the display unit to display an image (for example, an icon) representing the SNS application program and display the acknowledgement message (for example, the number of messages not acquired or read by the user B) in association with the image. When the user B logs in to the conversation group 1 or when the SNS application program is activated in the terminal device 10B, the terminal device 10B transmits to the server 12 a request to acquire the message of the user A. In response to the acquisition request, the service provision unit 32 transmits the message to the terminal device 10B. The display controller 24 of the terminal device 10B causes the display unit to display the message. The same process as above is also performed when the user C does not log in to the conversation group 1 or when the SNS application program is not activated on the terminal device 10C.

Even when the users B and C transmit a message, the same process as in the case where the user A transmits the message is executed. The same process is executed for the conversation group 2. Each user may log in to a conversation group later or may log out from the conversation group on the way.

Figure 4:
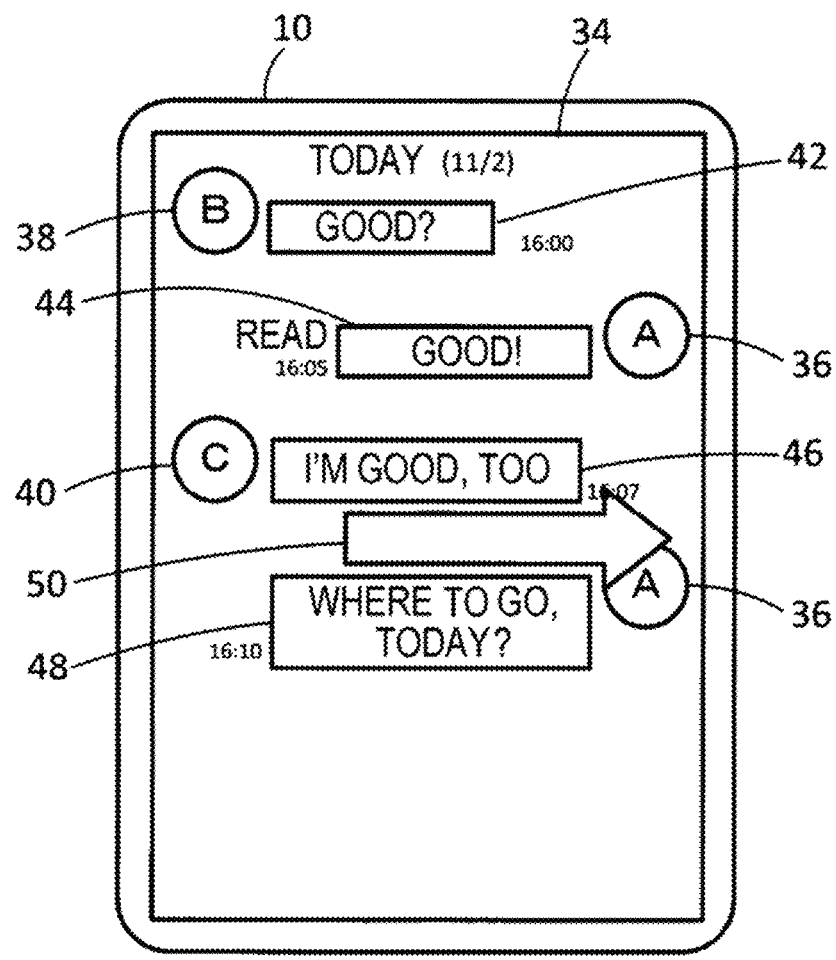
FIG. 4 is a view illustrating a screen.

A screen displayed on the terminal device 10 when using the SNS will be described with reference to FIG. 4. FIG. 4 illustrates an example of a screen displayed on the terminal device 10A used by the user A. The display controller 24 of the terminal device 10A causes the display unit of the UI unit 16 to display a screen 34 and causes the scree 34 to display various kinds of information. The screen 34 is an interface (conversation screen) for making a conversation with another user (speaker). Information (for example, character strings, images, etc.) input by each user is displayed on the screen 34. The conversation between plural users may be a so-called chatting-type conversation (that is, a real-time conversation, in further other words, a form of conversation between users while remarking). For example, when the SNS application program is executed by the controller 22 of the terminal device 10A, the display controller 24 causes the display unit of the UI unit 16 to display the screen 34 for making a conversation using the SNS. When the SNS application program is executed, it may be possible to use the Internet telephone function, etc. in addition to the chatting function.

The screen 34 is a screen on which the conversation contents between the users A, B and C logging in to the conversation group 1 are displayed. The conversation group 1 being displayed is a current conversation partner (conversation group) for the user A, and the users B and C are current speakers for the user A.

The display controller 24 displays an image 36 associated with the user A, an image 38 associated with the user B, and an image 40 associated with the user C on the screen 34. The image 36 is an image for identifying the user A, the image 38 is an image for identifying the user B, and the image 40 is an image for identifying the user C. Instead of the image 36 or in addition to the image 36, a character string (for example, a character string for identifying the user, such as a name, a user ID, a handle name, a nickname, etc.) indicating the user A may be displayed. The same applies to the images 38 and 40. The image 36 associated with the user A is displayed in an area allocated to a user who uses the terminal device 10A in the screen 34, and the image 38 associated with the user B and the image 40 associated with the user C are displayed in an area allocated to other users in the screen 34.

Thereafter, a conversation is made between the users A, B and C. Each user may operate the UI unit 16 of the terminal device 10 of his/her own to input the remark contents with a character string, an image, voice or the like. In addition, the remark contents of each user may be output as voice. According to an instruction of a user, the input remark contents are transmitted to the terminal device 10 of another user. The remark contents are displayed in time series according to the date and time of transmission. When the conversation progresses on the screen 34, the screen 34 is scrolled such that the past remark contents which cannot be displayed on the screen 34 disappear from the screen 34 and the latest remark contents or the most recent remark contents are displayed on the screen 34.

A remark content 42 is a remark content (for example, a message) transmitted by the user B using the terminal device 10B. The remark content 42 is transmitted from the terminal device 10B to the server 12 and is transmitted from the server 12 to the terminal devices 10A and 10C that belong to the conversation group 1 by the service provision unit 32. The remark content 42 may also be transmitted from the terminal device 10B to the terminal devices 10A and 10C without going through the server 12. The remark content 42 is displayed on the screen 34 in association with the image 38 of the user B. The remark content 42 is also displayed on the terminal devices 10B and 10C as the remark content of the user B. A remark content 44 is a remark content transmitted by the user A using the terminal device 10A and is displayed on the screen 34 in association with the image 36 of the user A. The remark content 44 is also displayed on the terminal devices 10B and 10C as the remark content of the user A. A remark content 46 is a remark content transmitted by the user C using the terminal device 10C and is displayed on the screen 34 in association with the image 40 of the user C. The remark content 46 is also displayed on the terminal devices 10B and 10C as the remark content of the user C. A remark content 48 is a remark content transmitted by the user A. In the example illustrated in FIG. 4, the remark contents 42, 44, 46 and 48 are transmitted in this order. The remark contents 42, 44, 46 and 48 are displayed in time series according to the date and time of the transmission. The same also applies to the following remark contents.

In addition, information indicating a time at which each remark content is transmitted (for example, hour and minute or date and time) may be displayed on the screen 34. For example, a character string indicating a date (for example, today's date, November 2) is displayed on the screen 34. A remark content displayed below the display position of the character string indicating the date is a remark content transmitted after that date. A remark content displayed above the display position is a remark content transmitted before that date. For example, the remark content 42 is transmitted by the user B at 16:00 on November 2, and information indicating the time is associated with the remark content 42. Similarly, information indicating the time is displayed for other remark contents. Information indicating hour and minute or date and time may not be displayed as well.

In addition, read and unread of a remark content may be managed. Here, a read message and an unread message will be described. The read message is a remark content read by another user and the unread message is a remark content not read by another user. For example, when a message (remark content) transmitted by the user A to the conversation group 1 is read by another user (for example, the user B or the user C), read information indicating that the message has been read is transmitted from the terminal device 10 of a user who reads the message to the terminal device 10A. For example, when the SNS application program is executed on the terminal device 10 of another user and a message of the user A is displayed on a screen (for example, a screen corresponding to the screen 34) for conversation, the message is treated as being read by another user. In this case, the read information is transmitted from the terminal device 10 of another user to the terminal device 10A. When another user designates a message of the user A on his/her own terminal device 10, when another user designates and displays the message on another window (another screen), or when another user gives an instruction to transmit the read information, the read information may be transmitted from the terminal device 10 of the other user to the terminal device 10A. As another example, when an acknowledgement message indicating that the message of the user A has been transmitted is displayed on the display unit of the terminal device 10 of another user and when the other user gives an instruction to display the message of the user A or the message is actually displayed, the read information may be transmitted from the terminal device 10 of the other user to the terminal device 10A.

When the read information is transmitted from another terminal device 10 to the terminal device 10A, the display controller 24 of the terminal device 10A displays the read information (a character string, an image, etc.) on the display unit in association with the message. In the example illustrated in FIG. 4, the remark content 44 (message) of the user A has been read by another user and the read information (for example, a character string "read") is displayed in association with the remark content 44. For example, the read information is displayed in the vicinity of the remark content 44. When the remark content 44 is read by all the other users, the read information may be displayed in association with the remark content 44. Alternatively, when the remark content 44 is read by at least one of the other users, the read information may be displayed in association with the remark content 44.

The remark content with which the read information is associated corresponds to the read message, and the message with which the read information is not associated corresponds to the unread message. Since the read information (for example, the character string "read") is not displayed in association with the remark content 48 of the user A, the remark content 48 corresponds to the unread message.

The display controller 24 may display the unread information indicating that the message has not been read by another user on the screen 34 in association with the unread message. For example, the unread information may be displayed in association with the remark content 48. Also, both the read information and the unread information may be displayed, or one of the read information and the unread information may be displayed.

In the example illustrated in FIG. 4, the read information is displayed as a character string in association with the remark content. Alternatively, the read information may be expressed by a method other than the method using a character string. For example, the display controller 24 may apply different expression modes to a read message and an unread message. Specifically, the display controller 24 may (i) express a character string included in the unread message using a specific font, (ii) express the character string in a specific color, (iii) express the character string in boldface, (iv) decorate a display frame of the unread message, or (v) highlight the unread message. This allows the read message and the unread message to be distinguished from each other. In the example illustrated in FIG. 4, since the remark content 44 is the read message and the remark content 48 is the unread message, the display controller 24 applies the different expression modes to the remark content 44 and the remark content 48. Also, the display controller 24 does not have to apply the above process to the unread message while applying the above process to the read message. Further, the display controller 24 may execute the above process while displaying the read information and the unread information.

The concept of the read message and the unread message is not limited to the above-described concept. For example, when the user A reads a message transmitted by another user, the message may be treated as the read message. When the user A does not read the message transmitted by another user, the message may be treated as the unread message. For example, when a message transmitted by the user B to the conversation group 1 is not read by the user A, the message corresponds to the unread message for the user A. When the user A designates the message of the user B on the terminal device 10A, when the user A designates the message and displays the message on another window (another screen), or when the user A gives an instruction to transmit the read information, the controller 22 of the terminal device 10A determines that the message has been read by the user A. As another example, when an acknowledgement message indicating that the message of the user B has been transmitted is displayed on the display unit of the terminal device 10A and when the user A gives an instruction to display the message of the user B or the message is actually displayed, the controller 22 may determine that the message has been read by the user A. Further, when the message of the user B is displayed on the screen 34, the controller 22 may determines that the message has been read by the user A. In such a case, the read information is transmitted from the terminal device 10A to the terminal device 10B.

When the controller 22 of the terminal device 10A determines that the message of another user has been read by the user A, the display controller 24 of the terminal device 10A displays the read information on the screen 34 in association with the message. For example, when it is determined that the remark content 42 of the user B has been read by the user A, the display controller 24 displays the read information (for example, the character string "read") on the screen 34 in association with the remark content 42. The display controller 24 may display the unread information (for example, the character string "unread") on the screen 34 in association with the unread message while displaying or not displaying the read information on the screen 34 in association with the read message. In addition, the display controller 24 may apply the different expression modes to the read message and the unread message so that the read message and the unread message can be distinguished from each other.

While the read information or the unread information about the message of the user A is being displayed on screen 34, the read information or the unread information about a message of another user may be displayed on screen 34. The read information and the unread information may not be displayed.

As described above, when the conversation contents of the conversation group 1 is displayed on the screen 34, the user A performs an operation for changing the current conversation group to another conversation group to which the user A is logging in. When the operation is detected by the detection unit 20, the display controller 24 of the terminal device 10A changes the screen 34 to a screen for making a conversation with the other conversation group. For example, when the user A performs an operation of moving the screen 34 in a direction indicated by an arrow 50 (for example, when the user A performs a flick operation), the display controller 24 changes the screen 34 to a screen for making a conversation with another conversation group. When the user performs the flick operation in the upward direction, the downward direction, the leftward direction or the rightward direction, the display controller 24 may change the screen 34. The operation for changing the conversation group may be a gesture motion other than the flick operation, voice input, or a combination of gesture motion and voice.

Figure 5:
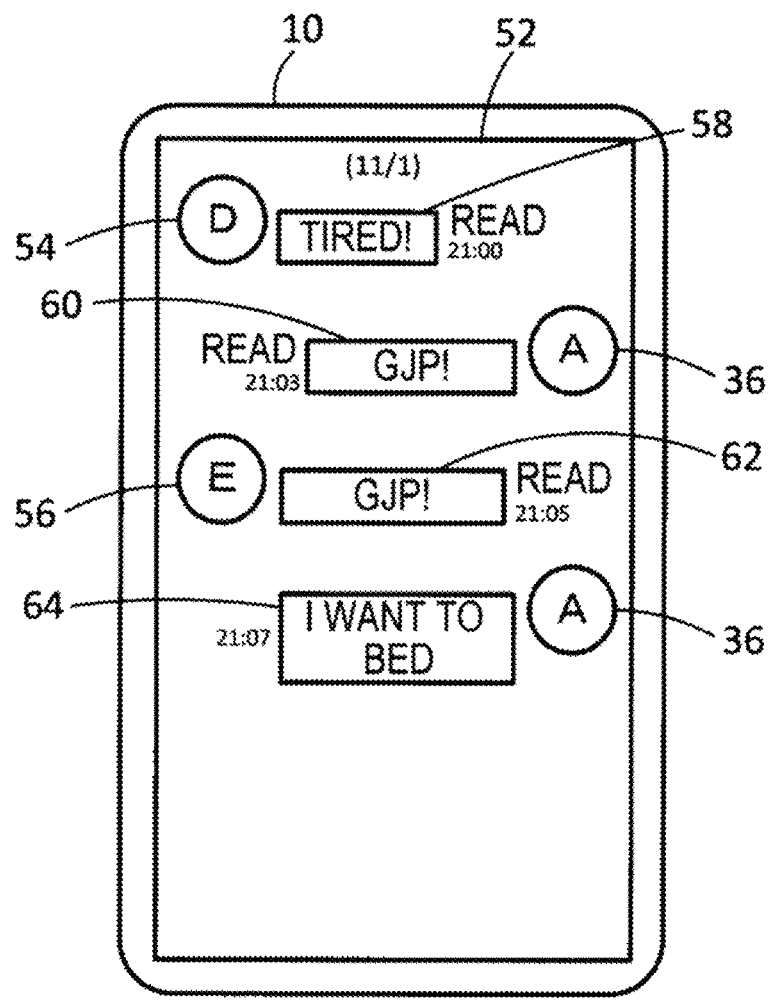
FIG. 5 is a view illustrating a screen.

Hereinafter, a screen for making a conversation with another conversation group will be described with reference to FIG. 5. FIG. 5 illustrates an example of the screen. A screen 52 is a screen on which the conversation contents between the users A, D and E being logging in to the conversation group 2 are displayed. The conversation group 2 being displayed is the current conversation partner (conversation group) for the user A, and the users D and E are the current speakers for the user A.

The display controller 24 displays the image 36 associated with the user A, an image 54 associated with the user D, and an image 56 associated with the user E on the screen 52. The image 54 is an image for identifying the user D, and the image 56 is an image for identifying the user E. Like the screen 34, instead of or in addition to the user's image, a character string indicating the user may be displayed. Like the screen 34, information indicating a time at which each remark content is transmitted (for example, hour and minute or date and time) may be displayed on the screen 52. In the example illustrated in FIG. 5, a character string indicating a date (for example, yesterday's date, November 1) is displayed on the screen 52. A remark content displayed below the display position of the character string of that date is a remark content transmitted after the date. A remark content displayed above the display position is a remark content transmitted before the date. For example, a remark content 58 is transmitted by the user D at 21:00 on November 1, and information indicating the time is displayed in association with the remark content 58. Similarly, information indicating the time is displayed for other remark contents. In addition, the read information or the unread information may be displayed, or display modes of an unread message and a read message may be different from each other so that the unread message and the read message can be distinguished from each other. In the example illustrated in FIG. 5, the read information is displayed in association with the remark content of the user A and the remark contents of other users. The image 36 associated with the user A is displayed in an area allocated to a user using the terminal device 10A in the screen 52. The image 54 associated with the user D and the image 56 associated with the user E are displayed in an area allocated to other users in the screen 52.

Thereafter, a conversation is made between the users A, D and E. The remark content of each user is transmitted from the terminal device 10 of his/her own to the terminal device 10 of another user who is logging in to the conversation group 2 and displayed. For example, the remark content 58 of the user D is displayed on the screen 52 in association with the image 54 of the user D, a remark content 60 of the user A is displayed on the screen 52 in association with the image 36 of the user A, a remark content 62 of the user E is displayed on the screen 52 in association with the image 56 of the user E, and a remark content 64 of the user A is displayed on the screen 52 in association with the image 36. Like the screen 34, each remark content is displayed in time series according to the date and time of transmission.

As described above, according to the first exemplary embodiment, it is possible to change a screen for making a conversation with a conversation partner by a simple operation (for example, gesture motion or voice). In the above example, it is possible to change a conversation group by changing the screen of the conversation group 1 to the screen of the conversation group 2 by a simple operation.

As a comparative example to the first exemplary embodiment, it is conceivable that a screen for selecting a conversation partner (for example, a selection screen for displaying a list of conversation groups) is displayed and, when changing a conversation partner, a user selects a conversation partner on the selection screen. In this case, it is considered that the screen 34 for making a conversation with the conversation group 1 is changed to the screen 52 for making a conversation with the conversation group 2 according to the following procedure. First, when the screen 34 is displayed, the user operates the UI unit 16 to give an instruction to display the selection screen of the conversation partner. In response to the display instruction, the selection screen is displayed instead of the screen 34. When the user selects the conversation group 2 as another conversation partner on the selection screen, the screen 52 is displayed instead of the selection screen. In this manner, in the comparative example, work and a process such as instructing to display a selection screen, displaying the selection screen and selecting the conversation group 2 on the selection screen occur. On the other hand, according to the first exemplary embodiment, it is possible to change a conversation partner and a screen without executing such work or a process.

As another comparative example, it is conceivable to display a pop-up message of another conversation group and switch a conversation partner to the other conversation group when a user selects that message. Even in this case, a process and work of displaying and selecting the pop-up message occur. According to the present exemplary embodiment, it is possible to change a screen with a conversation partner without executing such a process or work.

In addition, a list defining the display order of conversation groups may be prepared in advance and the display controller 24 may change a screen according to the display order. For example, when the display order is defined in the order of conversation groups 1, 2 and 3, the display controller 24 changes the screen in the order of conversation groups 1, 2 and 3 according to the screen changing operation. When the changing operation is performed while the screen of the conversation group 3 is being displayed, the display controller 24 changes the screen of the conversation group 3 to the screen of the conversation group 1. The display order may be defined by the user or may be defined according to the order of conversation group to which the user has logged in.

Hereinafter, modifications of the first exemplary embodiment will be described.

First Modification

Figure 6:
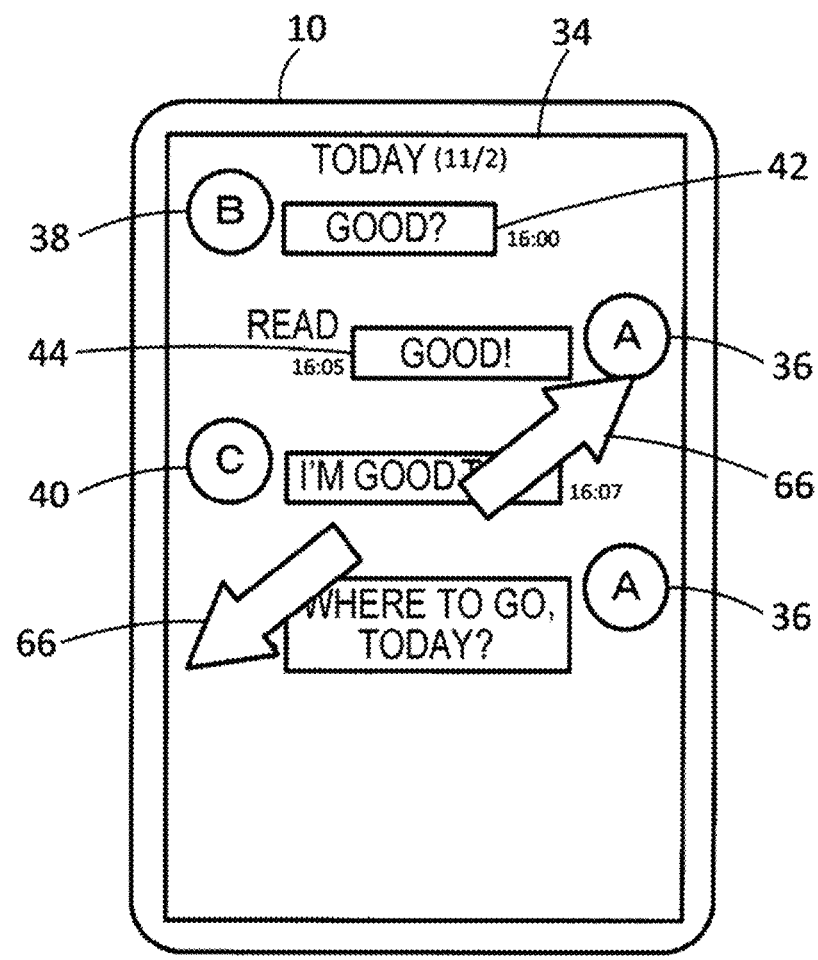
FIG. 6 is a view illustrating a screen.

In a first modification, the display controller 24 enlarges or reduces a screen being displayed according to an operation of a user. For example, as illustrated in FIG. 6, when the screen 34 is displayed, the user performs an operation of enlarging the screen 34 (for example, a pinch-out operation) as indicated by an arrow 66. When the operation is detected, the display controller 24 enlarges the screen 34. In addition, when the user performs an operation of pinching the screen 34 (for example, a pinch-in operation) and the operation is detected, the display controller 24 reduces the screen 34. The enlarging operation and the reducing operation may be, for example, predefined and their definitions may be changed by the user. The screen may be enlarged or reduced by operations other than the pinch-out operation or the pinch-in operation.

When the enlarging operation or the reducing operation is performed on the screen 34 being displayed, the display controller 24 may enlarge or reduce a screen (for example, the screen 52) for making a conversation with another conversation group not being displayed, in response to the enlarging operation or the reducing operation. That is, the display controller 24 synchronizes the enlargement or reduction of the screen between the screen of the conversation group being displayed and the screen of the conversation group not being displayed. The enlargement rate (enlargement amount) or reduction rate (reduction amount) of the screen 52 not being displayed may be the same as or different from the enlargement rate (enlargement amount) or reduction rate (reduction amount) of the screen 34 being displayed. This setting may be performed by the user. When an operation for changing a conversation group is detected, the display controller 24 changes the screen (for example, the screen 34) currently being displayed to a screen for making a conversation with another conversation group (a screen in which the enlargement or reduction is reflected) (for example, the screen 52). By doing this, even when the enlarging operation or the reducing operation is not performed on the changed screen, an enlarged or reduced screen is displayed, thereby saving the time taken for the enlarging operation or the reducing operation by the user.

When the enlarging operation or the reducing operation is performed on the screen being displayed, the display controller 24 may enlarge or reduce only the screen being displayed but not enlarge or reduce the screen for making a conversation with another conversation group not being displayed in response to the enlarging operation or the reducing operation. Interlock control (synchronous control) or non-interlock control (asynchronous control) may be set by the user.

Second Modification

Figure 7:
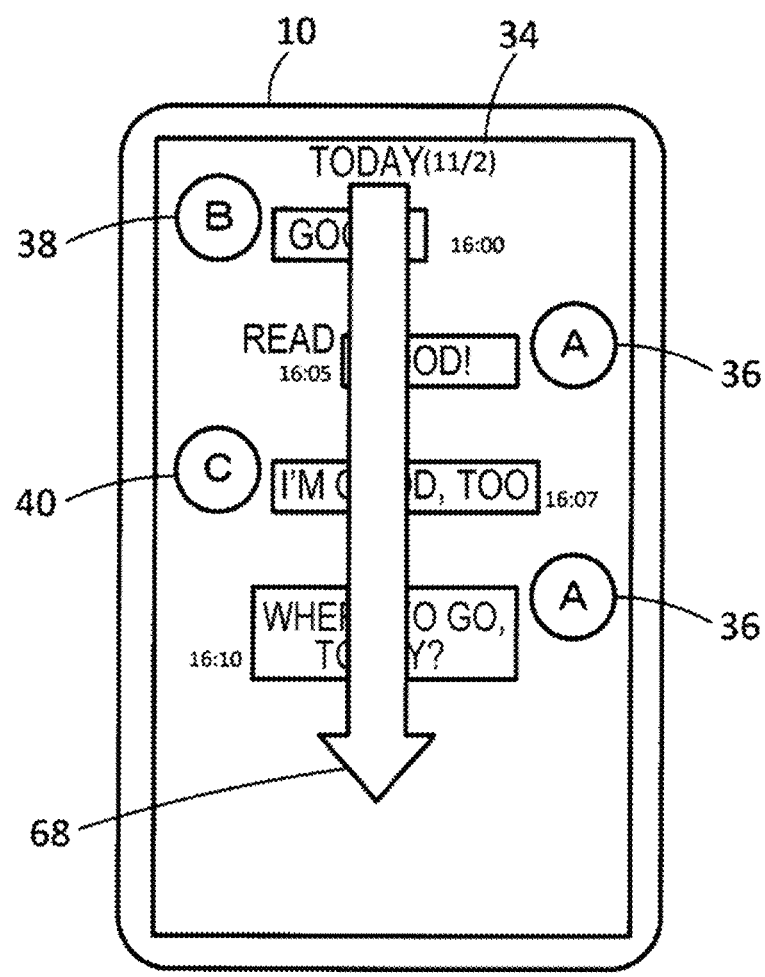
FIG. 7 is a view illustrating a screen.
Figure 8:
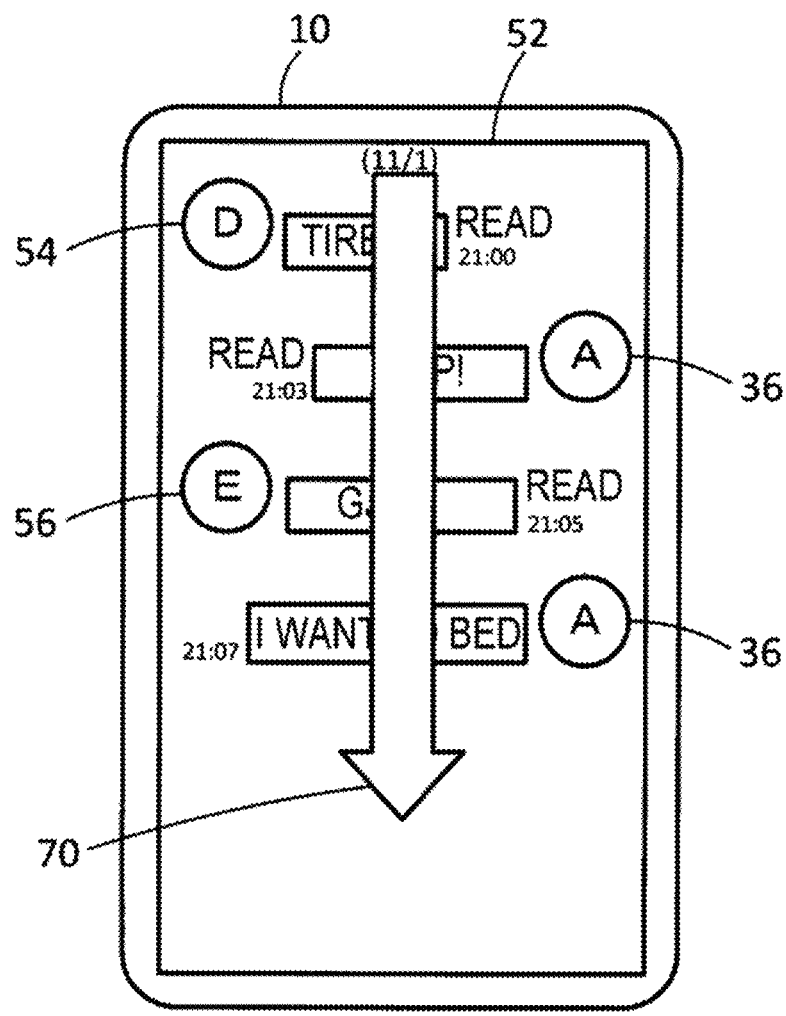
FIG. 8 is a view illustrating a screen.

A second modification will be described with reference to FIGS. 7 and 8. In the second modification, the display controller 24 causes the display unit to display information (character strings, images, etc.) that cannot be displayed on a screen being displayed, by scrolling the screen according to the operation of the user. For example, as illustrated in FIG. 7, when the screen 34 is displayed, the user A performs an operation of scrolling the screen 34 as indicated by an arrow 68. When the operation is detected, the display controller 24 scrolls the screen 34 in a direction indicated by the arrow 68.

When the scroll operation is performed on the screen being displayed, the display controller 24 may scroll a screen for making a conversation with another conversation group not being displayed in response to the scroll operation. That is, the display controller 24 synchronizes the screen scrolling between the screen of the conversation group being displayed and the screen of the conversation group not being displayed. A screen 52 for making a conversation with another conversation group is illustrated in FIG. 8. Although the screen 52 is not displayed on the display unit, the display controller 24 scrolls the screen 52 in a direction indicated by an arrow 70 (in the same direction as the direction indicated by the arrow 68) in response to the scroll operation on the screen 34. The scroll amount of the screen 52 being not displayed may be the same as or different from the scroll amount of the screen 34 being displayed. This setting may be performed by the user. When an operation for changing a conversation group is detected, the display controller 24 changes the screen (for example, the screen 34) currently being displayed to a screen for making a conversation with another conversation group (a screen in which the scroll is reflected) (for example, the screen 52). By doing so, since the scrolled screen is displayed without performing the scroll operation on the changed screen, it is possible to save the time for the scrolling operation by the user.

When the scroll operation is performed on the screen being displayed, the display controller 24 may scroll only the screen being displayed but may not scroll the screen for making a conversation with another conversation group being not displayed in response to the scroll operation. Interlock control (synchronous control) or non-interlock control (asynchronous control) may be set by the user.

When the scroll operation is performed on the screen being displayed, the display controller 24 may scroll the screen for making a conversation with another conversation group being not displayed to a position at which an unread message is displayed.

Figure 9:
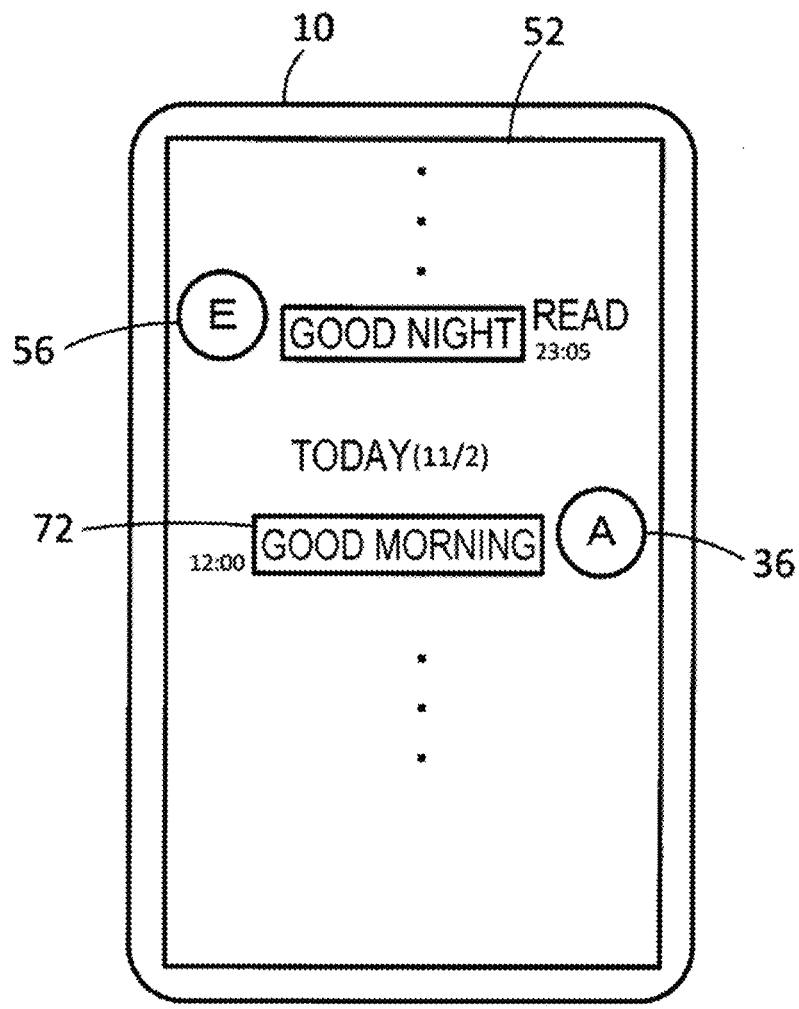
FIG. 9 is a view illustrating a screen.

For example, in the case where the scroll operation is performed on the screen 34 being displayed, if there is an unread message in the conversation group 2 being not displayed, the display controller 24 scrolls the non-displayed screen 52 of the conversation group 2 to a position at which the unread message is displayed. For example, the display controller 24 scrolls the screen 52 so that the unread message is displayed at a specific position (for example, the center position, the top position, the bottom position, etc.) of the screen 52. FIG. 9 illustrates an example of the scrolled screen 52. For example, when a remark content 72 transmitted by the user A today (November 2) is in an unread state, the display controller 24 scrolls the screen 52 such that the remark content 72 is displayed at the center position of the screen 52. Also, the display controller 24 may scroll the screen 52 such that the remark content 72 is displayed at the top or bottom of the screen 52. The remark content displayed below the display position of a character string indicating today's date (November 2) is a remark content transmitted after November 2, and the remark content displayed above the display position is a remark content transmitted before November 2. When there are plural unread messages, the display controller 24 may scroll the screen 52 to a position at which an unread message transmitted at the oldest date and time is displayed, or may scroll the screen 52 to a position at which an unread message transmitted at the latest date and time is displayed.

When an operation for changing a conversation group is detected, the display controller 24 changes a screen (for example, the screen 34) currently being displayed to a screen for making a conversation with another conversation group (a screen in which the scroll to the display position of the unread message is reflected) (for example, the screen 52). By doing so, the unread message is displayed without performing the scroll operation on the changed screen, thereby reducing the time taken for the scroll operation by the user. In the example illustrated in FIG. 9, the remark content 72 is displayed after the screen is changed.

In the case where the scroll operation is performed on the screen 34 being displayed, if there is an unread message not read by the user A in the conversation group 2 not being displayed, the display controller 24 scrolls the non-displayed screen 52 of the conversation group 2 to a position at which the unread message is displayed. In this way, when the screen 34 being displayed is changed to the screen 52, the unread message (a message not read by the user A) is displayed without performing the scroll operation on the changed screen 52, thereby reducing the time taken for the scroll operation by the user.

Further, when there is an unread message in the conversation group 1 being displayed, according to the scroll operation on the screen 34 being displayed, the display controller 24 may scroll the screen 34 to a position at which the unread message is displayed.

Third Modification

In a third modification, when an operation for changing the current conversation group to another conversation group is detected, the display controller 24 preferentially changes the screen of the conversation group that is currently being displayed to a screen for making a conversation with another active conversation group. The active conversation group is, for example, a conversation group to which another user is logging in, a conversation group in which the elapsed time from the transmission and reception of the last message is within a predetermined time, etc. For example, when the user A logs in to plural conversation groups and is making a conversation with the plural conversation groups, according to the screen changing operation, the display controller 24 changes the screen of the conversation group currently being displayed to a screen for making a conversation with the active conversation group.

On the other hand, the display controller 24 may exclude inactive conversation groups (conversation groups other than the above-described active conversation group) from the display target. When the changing operation is performed plural times, the display controller 24 may display on the display unit a screen for making a conversation with an inactive conversation group.

It is assumed that a user is more likely to make a conversation with an active conversation group than an inactive conversation group. Therefore, according to the third modification, a screen of a conversation group with which a user can make a conversation is preferentially displayed.

Fourth Modification

In a fourth modification, the display controller 24 changes a screen according to a priority based on the number of login users who are logging in to each conversation group. The controller 22 determines the priority of each conversation group based on the number of users (speakers) who are logging in to each conversation group. For example, a conversation group having the larger number of users who are logging in has a higher priority. As a specific example, it is assumed that the user A has logged in to conversation groups 4, 5 and 6. It is also assumed that four users including the user A have logged in to the conversation group 4, five users including the user A have logged in to the conversation group 5, and six users including the user A have logged in to the conversation group 6. In this case, the conversation group 6 has the first priority, the conversation group 5 has the second priority, the conversation group 4 has the third priority, and the screen is changed in the order of conversation groups 6, 5 and 4. For example, when a screen changing operation is detected while the screen of the conversation group 4 is being displayed, the display controller 24 changes the screen of the conversation group 4 to a screen for making a conversation with the conversation group 6 having the first priority. When a screen changing operation is detected while the screen of the conversation group 6 is being displayed, the display controller 24 changes the screen of the conversation group 6 to a screen for making a conversation with the conversation group 5 having the second priority. When a screen changing operation is detected while the screen of the conversation group 5 is being displayed, the display controller 24 changes the screen of the conversation group 5 to a screen for making a conversation with the conversation group 4 having the third priority. The same process is performed thereafter.

According to the fourth modification, the user can change a screen by a simple operation according to the number of users who are logging in.

The priority may be changed according to an operation. For example, when a first operation (for example, a flick operation in the right direction on a screen) is detected, the display controller 24 changes the screen according to the above-described priority. When a second operation (for example, a flick operation in the left direction on the screen) is detected, the display controller 24 changes the screen according to a priority reverse to the above-described priority. By doing this, the priority can be changed by a simple operation. The first operation and the second operation may be predetermined or may be changed by the user.

When a specific changing operation (for example, a flick operation in the upward direction on the screen) is detected, the controller 22 may specify another conversation group to which the user A is logging in and which has the largest number of users who are logging in, and the display controller 24 may change the screen currently being displayed to a screen for making a conversation with the specified conversation group. When a changing operation other than the specific changing operation is detected, the display controller 24 changes the screen according to the above-described priority. By doing this, the user may make a conversation with the conversation group having the largest number of users who are logging in, by a simple operation. The specific changing operation may be predetermined or may be changed by the user.

The third and fourth modifications may be used in combination. For example, when there are plural active conversation groups, the controller 22 determines priorities according to the third modification for the plural active conversation groups, and the display controller 24 changes the screen according to the determined priorities.

Fifth Modification

In a fifth modification, the display controller 24 changes a screen according to a priority based on the date and time of transmission of the latest remark content (message) in each conversation group. The controller 22 specifies the date and time at which the latest remark content has been transmitted (that is, the transmission date and time of the last message) for each conversation group, and determines the priority of each conversation group based on the transmission date and time of the latest remark content of each conversation group. For example, a conversation group with the transmission date and time of the latest remark content closer to the current date and time has a higher priority. As a specific example, it is assumed that the user A has logged in to conversation groups 4, 5 and 6. It is also assumed that the transmission date and time of the latest remark content in the conversation group 4 is "10:00 on Oct. 30, 2017", the transmission date and time of the latest remark content in the conversation group 5 is "10:30 on Oct. 30, 2017", and the transmission date and time of the latest remark content in the conversation group 6 is "11:00 on Oct. 30, 2017". In this case, the conversation group 6 has the first priority, the conversation group 5 has the second priority, the conversation group 4 has the third priority, and the screen is changed in the order of conversation groups 6, 5 and 4. That is, the screen is changed in the same order as described in the fourth modification.

According to the fifth modification, the user can change the screen by a simple operation according to the input date and time of remark content.

As in the fourth modification, the priority may be changed according to an operation. In addition, when a specific changing operation is detected, the controller 22 may specify a conversation group to which the user A is logging in and to which the latest remark content has been input (that is, a conversation group with the transmission date and time of the last remark content closest to the current date and time), and the display controller 24 may change the screen currently being displayed to a screen for making a conversation with the specified conversation group. When a changing operation other than the specific changing operation is detected, the display controller 24 changes the screen according to the above-described priority. By doing this, the user may make a conversation with the conversation group to which the latest remark content has been input, by a simple operation.

The third and fifth modifications may be used in combination. For example, when there are plural active conversation groups, the controller 22 determines priorities according to the fifth modification for the plural active conversation groups, and the display controller 24 changes the screen according to the determined priorities.

Further, the fourth and fifth modifications may be used in combination. That is, the controller 22 may determine a priority based on the number of users who are logging in and the transmission date and time of the latest remark content. In this case, the controller 22 may apply a weighting process to the priority based on the number of login users or the transmission date and time. The third to fifth modifications may be used in combination.

Sixth Modification

In a sixth modification, the display controller 24 changes a screen according to a priority based on the number of unread messages in each conversation group. In the terminal device 10A used by the user A, the unread message may be a message of the user A not read by another user, or a message of another user not read by the user A, or both of them. The controller 22 manages the number of unread messages for each conversation group in which the user A is logging in, and determines the priority of each conversation group based on the number of unread messages in each conversation group. For example, a conversation group having the larger number of unread messages has a higher priority. As a specific example, it is assumed that the user A has logged in to conversation groups 4, 5 and 6. It is also assumed that the number of unread messages in the conversation group 4 is "4", the number of unread messages in the conversation group 5 is "5", and the number of unread messages in the conversation group 6 is "6". In this case, the conversation group 6 has the first priority, the conversation group 5 has the second priority, the conversation group 4 has the third priority, and the screen is changed in the order of conversation groups 6, 5 and 4. That is, the screen is changed in the same order as described in the fourth modification.

According to the sixth modification, the user can change the screen by a simple operation according to the number of unread messages.

As in the fourth modification, the priority may be changed according to an operation. In addition, when a specific changing operation is detected, the controller 22 may specify a conversation group to which the user A is logging in and which has the largest number of unread messages as a conversation group to which the user A is logging in, and the display controller 24 may change the screen currently being displayed to a screen for making a conversation with the specified conversation group. When a changing operation other than the specific changing operation is detected, the display controller 24 changes the screen according to the above-described priority. By doing this, the user may make a conversation with the conversation group having the largest number of unread messages by a simple operation. In addition, a conversation group with the smaller number of unread messages may have a higher priority. This setting may be performed by the user.

The third and sixth modifications may be used in combination. For example, when there are plural active conversation groups, the controller 22 determines priorities according to the sixth modification for the plural active conversation groups, and the display controller 24 changes the screen according to the determined priorities.

Further, the fourth and sixth modifications may be used in combination. That is, the controller 22 may determine a priority based on the number of users who are logging in and the number of unread messages. In this case, the controller 22 may apply a weighting process to the priority based on the number of users or the number of unread messages. The third, fourth and sixth modifications may be used in combination.

Further, the fifth and sixth modifications may be used in combination. That is, the controller 22 may determine a priority based on the transmission date and time of the latest message and the number of unread messages In this case, the controller 22 may apply a weighting process to the priority based on the transmission date and time of the latest message or the number of unread messages. The third, fifth and sixth modifications may be used in combination, or the third, fourth, fifth and sixth modifications may be used in combination.

In addition, when the priority is not determined by the above-described priority determining method, the controller 22 may determine the priority based on the past display history of each conversation group. For example, if the transmission date and time of the latest message and the number of unread messages are the same in plural conversation groups, the priorities of the plural conversation groups cannot be determined depending on these conditions. In this case, the controller 22 determines the priority based on the display history of each conversation group. For example, the controller 22 assigns a higher priority to a conversation group having a longer period (non-display period) in which a conversation content is not displayed. If the priority cannot be determined also by the non-display period, the controller 22 may determine the priority based on the names of the conversation groups. For example, the controller 22 determines the priority in Japanese syllabary order or alphabetical order.

Seventh Modification

In a seventh modification, when an operation for changing the current conversation group to another conversation group is detected, the controller 22 specifies another conversation group to which one or plural users who log in to the current conversation group log in, and the display controller 24 changes the screen currently being displayed to a screen for making a conversation with the other conversation group. In the absence of such another conversation group, the display controller 24 changes the screen according to a predetermined display order.

A specific example will be described below. For example, it is assumed that the user A has logged in to the conversation groups 1, 2 and 3 and the conversation group 1 is the current conversation group. In this case, the screen 34 illustrated in FIG. 4 is displayed on the terminal device 10A of the user A. In this state, when the user A performs an operation to change a conversation group, the controller 22 specifies another conversation group to which the user A logs in and to which at least one of the users B and C logs in. As described above, the users A, B and C have logged in to the conversation group 1 and the users A, D and E have logged in to the conversation group 2. It is assumed that the users A, B and D have logged in to the conversation group 3. In this case, the controller 22 specifies the conversation group 3 to which the user B logs in, as another conversation group, and the display controller 24 changes the screen 34 to a screen for making a conversation with the conversation group 3. When an operation for changing a screen is detected while the screen for making a conversation with the conversation group 3 is being displayed, the display controller 24 changes the screen for making a conversation with the conversation group 3 to the screen 52 for making a conversation with the conversation group 2.

According to the seventh modification, the user may make a conversation with another conversation group to which a user logged in to the current conversation group is logging in, by a simple operation.

Further, the controller 22 may determine the priority based on the number of common users who are logging in, and the display controller 24 may change the screen according to the determined priority. For example, a conversation group having the larger number of common users who are logging in has a higher priority. A specific example will be described below. It is assumed that the user A has logged in to conversation groups 1, 7 and 8. It is also assumed that the users A, B and C have logged in to the conversation group 1, the users A, B and D have logged in to the conversation group 7, and the users A, B, C and E has logged in to the conversation group 8. In this case, except for the user A, the number of common users between the conversation group 1 and the conversation group 7 is "1" (the user B is the common user), and the number of common users between the conversation group 1 and the conversation group 8 is "2" (the users B and C are the common users). Therefore, the conversation group 8 has the first priority, the conversation group 7 has the second priority, and the display controller 24 changes the screen in the order of conversation groups 8 and 7. That is, in the above example, the screen is changed in the order of conversation groups 1, 8 and 7.

As in the fourth modification, the priority may be changed according to an operation. When a specific changing operation is detected, the controller 22 may specify a conversation group to which the user A is logging in and which has the largest number of common users, and the display controller 24 may change the screen currently being displayed to a screen for making a conversation with the specified conversation group. When a changing operation other than the specific changing operation is detected, the display controller 24 changes the screen according to the above-described priority. By doing this, the user may make a conversation with the conversation group having the largest number of common users by a simple operation.

At least one of the third to sixth modifications and the seventh modification may be used in combination.

Eighth Modification

In an eighth modification, the controller 22 specifies a conversation group with which the user A has made a conversation most recently, and the display controller 24 changes the screen currently being displayed to a screen for making a conversation with the specified conversation group. By doing this, a user may make a conversation with the latest conversation group by a simple operation.

Ninth Modification

In a ninth modification, the controller 22 performs duplication and transfer (copy & paste) of a remark content among plural conversation groups. The remark content may be a remark content transmitted by a user or may be a remark content transmitted by another user.

Figure 10:
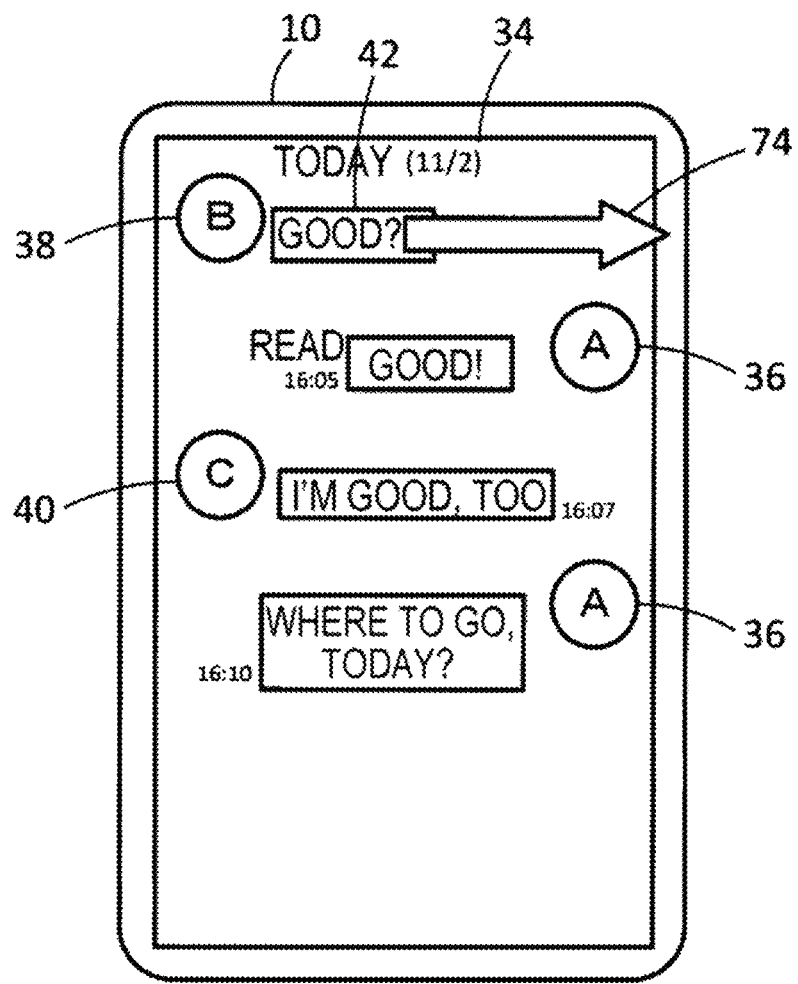
FIG. 10 is a view illustrating a screen.
Figure 11:
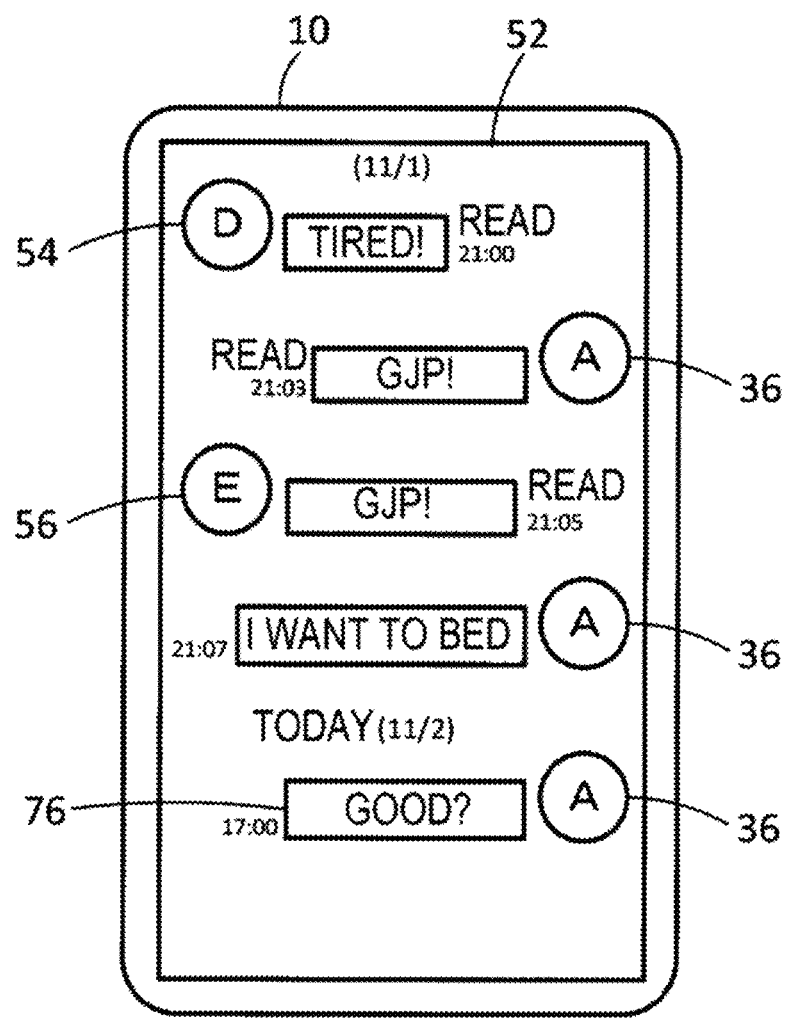
FIG. 11 is a view illustrating a screen.

The ninth modification will be described in detail below with reference to FIGS. 10 and 11. FIG. 10 illustrates the screen 34 of the conversation group 1 and FIG. 11 illustrates the screen 52 of the conversation group 2. For example, when the user A designates the remark content 42 of the user B on the screen 34 of the conversation group 1 being displayed and performs an operation of copying it to another conversation group not being displayed, the controller 22 copies the remark content 42 and pastes it on the screen of the other conversation group (for example, the screen 52 of the conversation group 2) not being displayed, as the remark content of the user A. The copying operation is, for example, an operation of sliding the remark content 42 in a direction indicated by an arrow 74. When the user A slides the remark content to be copied to the outside of the screen 34, the remark content may be pasted on the screen of another conversation group. In the screen 52 illustrated in FIG. 11, the copied remark content 42 is added as a remark content 76 of the user A. The remark content 76 is transmitted to the terminal devices 10 of the users D and E who are logging in to the conversation group 2. The remark content 76 may be transmitted to the terminal devices 10 of the users D and E at the timing when the copying operation is performed. Alternatively, the remark content 76 may be transmitted to the terminal devices 10 of the users D and E at the timing when an operation of changing the screen 34 to the screen 52 is detected.

When an operation for changing a conversation group is detected, the display controller 24 changes the screen (for example, the screen 34) currently being displayed to a screen for making a conversation with another conversation group (for example, the screen 52 on which the copied & pasted remark content is displayed).

According to the ninth modification, it is possible to copy and paste remark contents among plural conversation groups by a simple operation.

When the user A stops the copying operation within the screen 34 of the copy source (for example, when the user A stops touching the screen 34), the controller 22 does not copy.

Tenth Modification

In a tenth modification, the controller 22 adds a user logged in to a certain conversation group to another conversation group. For example, the controller 22 adds a user included in a conversation group being displayed to a conversation group not being displayed.

Figure 12:
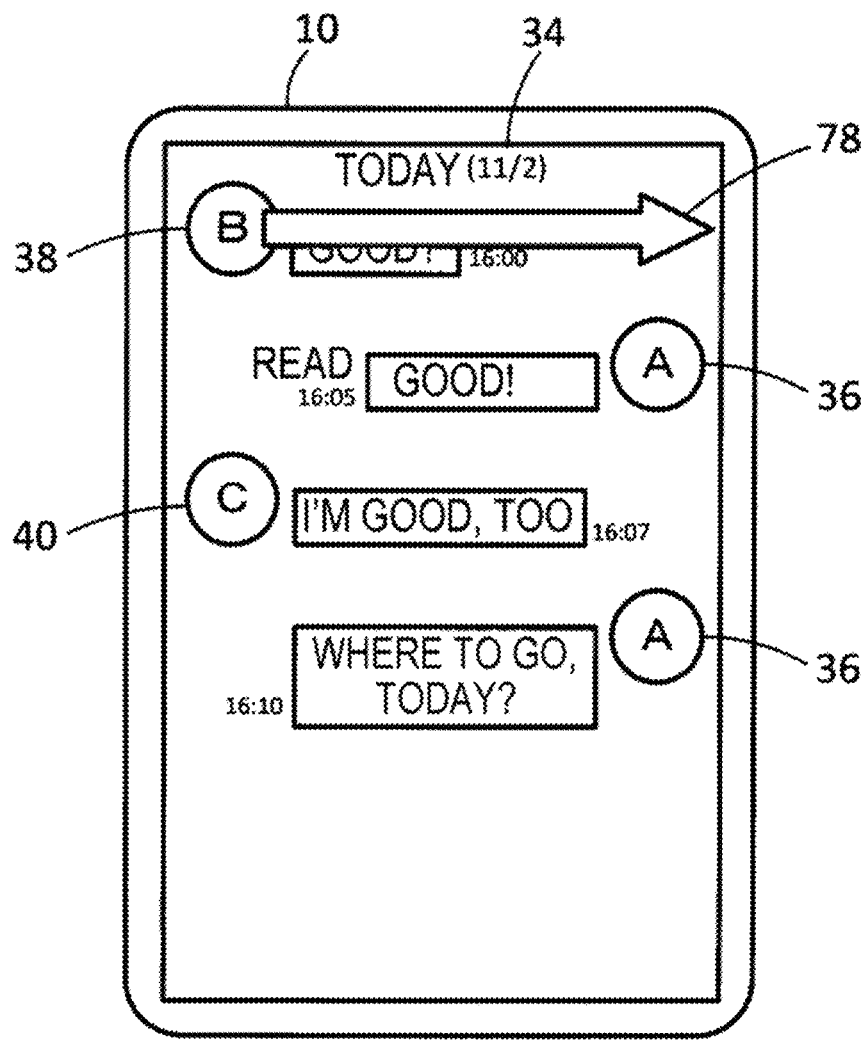
FIG. 12 is a view illustrating a screen.
Figure 13:
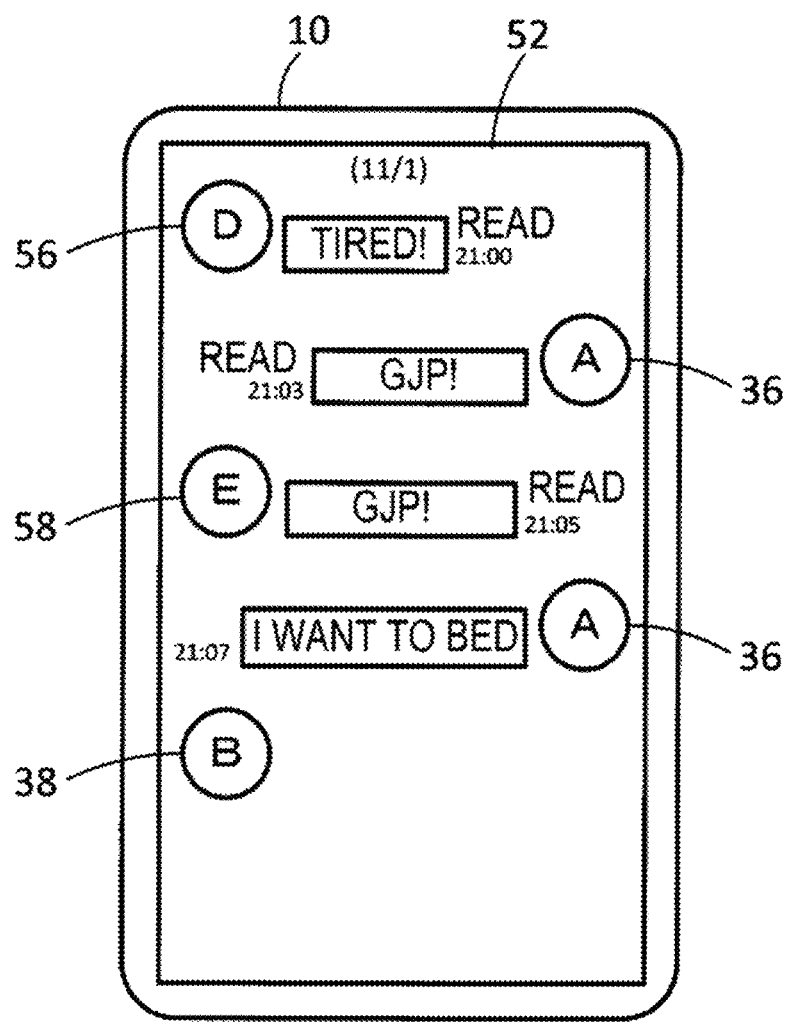
FIG. 13 is a view illustrating a screen.

The tenth modification will be described in detail below with reference to FIGS. 12 and 13. FIG. 12 illustrates the screen 34 of the conversation group 1 and FIG. 13 illustrates the screen 52 of the conversation group 2. For example, when the user A designates the image 38 associated with the user B on the screen 34 of the conversation group 1 being displayed and performs an operation of adding it to another conversation group not being displayed, the controller 22 adds the user B to the other conversation group (for example, the conversation group 2) not being displayed. The adding operation is, for example, an operation of sliding the image 38 in a direction indicated by an arrow 78. When the user A slides the user image to be added to the outside of the screen 34, the user to be added may be added to another conversation group. The image 38 associated with the user B is displayed on the screen 52 illustrated in FIG. 13, whereby the user B is added to the conversation group 2. That is, the user B has logged in to the conversation group 2.

When an operation for changing a conversation group is detected, the display controller 24 changes the screen (for example, the screen 34) currently being displayed to a screen for making a conversation with another conversation group (for example, the screen 52 of the conversation group 2 to which the user B is added).

According to the tenth modification, it is possible to add a user logged in to a certain conversation group to another conversation group by a simple operation.

When the user A stops the adding operation within the screen 34 of the addition source (for example, when the user A stops touching the screen 34 or places an image of a user to be added in a specific display area within the screen 34), the controller 22 does not add a user.

Figure 14:
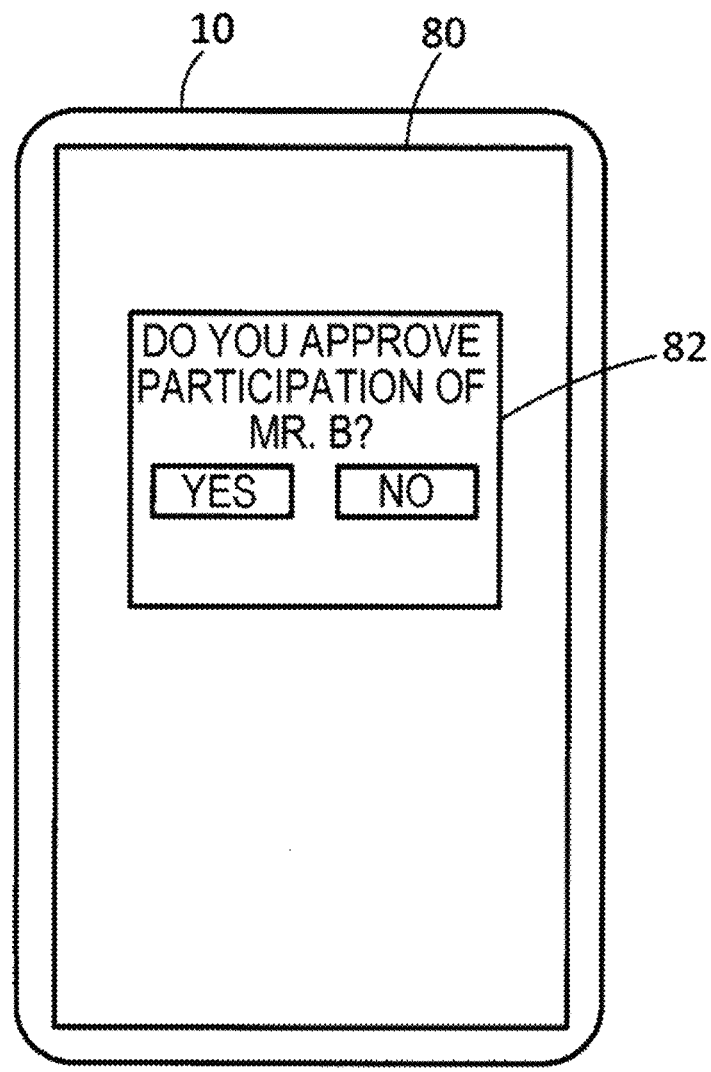
FIG. 14 is a view illustrating a screen.

In the tenth modification, when an approval of a user who is logging in to a conversation group to which another user is to be added is obtained, the other user may be added to the conversation group. On the other hand, when the approval is not obtained, the other user need not be added to the conversation group. For example, when the user A performs an operation of adding the user B who is logging in to the conversation group 1 to the conversation group 2, the terminal device 10A transmits an approval request to the terminal device 10D of the user D and the terminal device 10E of the user E. In this case, as illustrated in FIG. 14, an approval screen 80 is displayed on the UI units 16 of the terminal devices 10D and 10E, and a message 82 asking whether or not to approve the participation of the user B is displayed on the approval screen 80. When the user D approves the participation of the user B (for example, when the user D presses a "Yes" button on the approval screen 80), the terminal device 10D transmits information indicating the approval to the terminal devices 10A and 10B. When the user D does not approve the participation of the user B (for example, when the user D presses a "No" button on the approval screen 80), the terminal device 10D transmits information indicating no approval to the terminal devices 10A and 10B. The same applies to the user E.

When an approval is obtained by all users (for example, the users D and E), the user B is added to the conversation group 2. Otherwise, the user B will not be added to the conversation group 2. As another example, when an approval is obtained by a predetermined number of users or more, or when an approval is obtained by a specific user (for example, a user having approval authority), the user B may be added to the conversation group 2.

By requiring an approval as described above, it is possible to reflect the intention of a user who is logging in to a conversation group to which the user is to be added.

Figure 15:
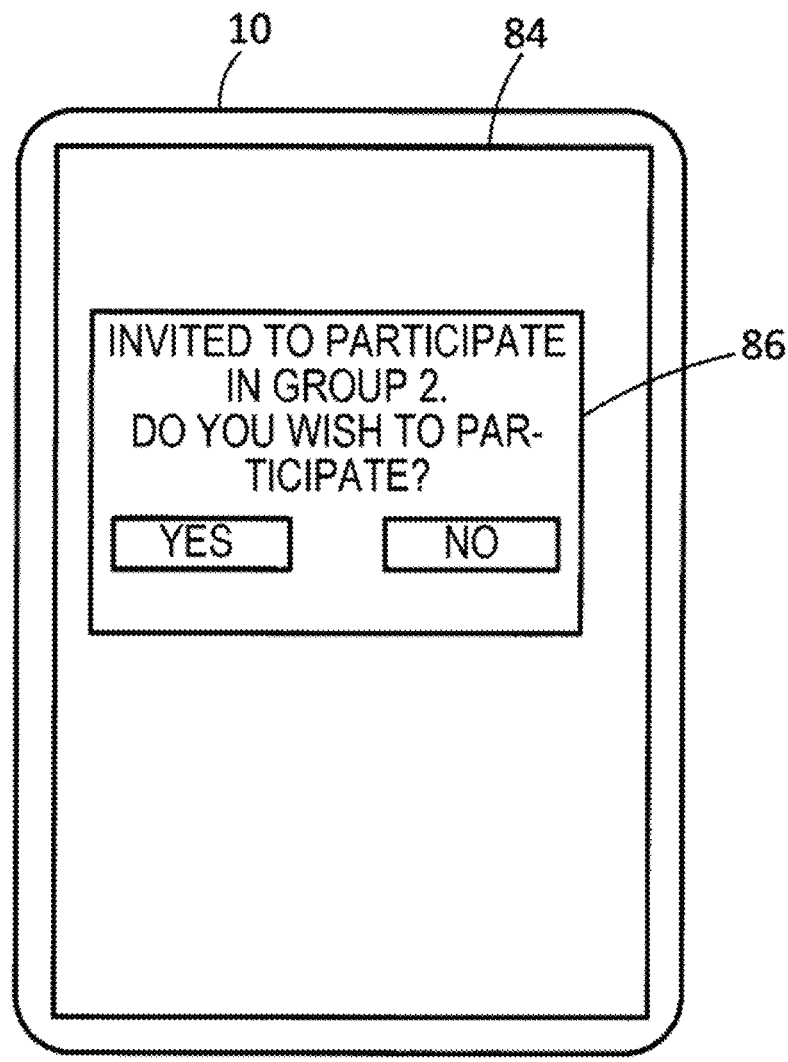
FIG. 15 is a view illustrating a screen.

In addition, when the user B to be added accepts the participation, the user B is added to the conversation group 2. On the other hand, when the user B does not accept the participation, the user B need not be added to the conversation group 2. For example, the terminal device 10A transmits a participation request to the terminal device 10B of the user B. In this case, as illustrated in FIG. 15, an invitation screen 84 is displayed on the UI unit 16 of the terminal device 10B, and a message 86 indicating that the user B is requested to participate in the conversation group 2 is displayed on the invitation screen 84. When the user B wishes to participate in the conversation group 2 (for example, when the user B presses a "Yes" button on the invitation screen 84), the terminal device 10B transmits information indicating the participation to the terminal device 10A. On the other hand, when the user B does not wish to participate in the conversation group 2 (for example, when the user B presses a "No" button on the invitation screen 84), the terminal device 10B transmits information indicating no participation to the terminal device 10A.

When the user B wishes to participate in the conversation group 2, the user B is added to the conversation group 2. When the user B does not wish to participate in the conversation group 2, the user B is not added to the conversation group 2. By doing this, it is possible to reflect the intention of a user to be added.

Further, when an approval of users (for example, the users D and E) who are logging in to a conversation group of an addition destination is obtained and a user to be added (for example, the user B) wishes to participate in the conversation group, the user to be added may be added to the conversation group.

Eleventh Modification

In an eleventh modification, the controller 22 changes a conversation group to be changed according to the mode of an operation of a user. The operation mode is determined based on at least one of, for example, the direction of the operation, the speed of the operation or the number of times the operation is performed.

Figure 16:
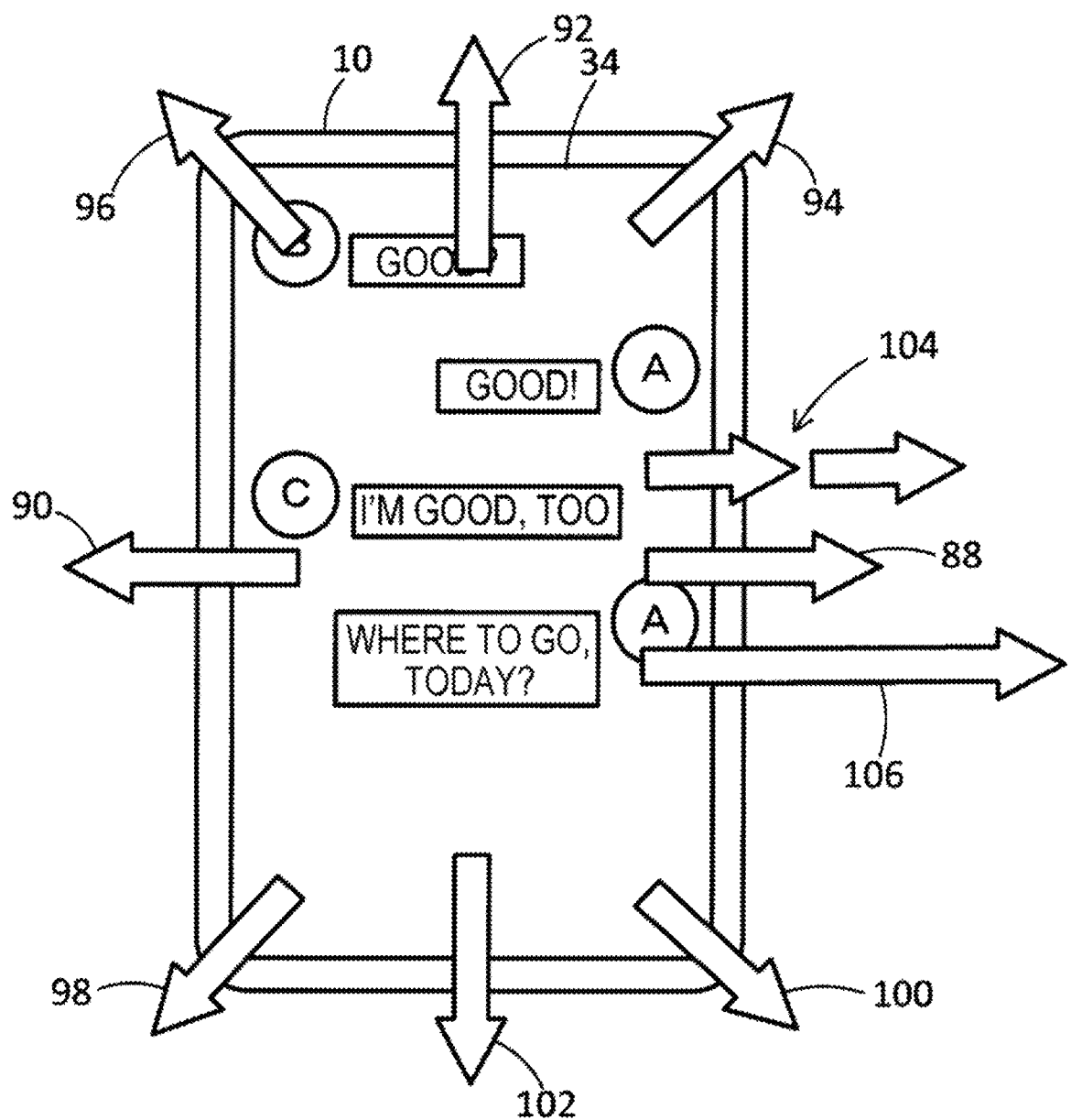
FIG. 16 is a view illustrating a screen.

The eleventh modification will be described in detail below with reference to FIG. 16. FIG. 16 illustrates the screen 34 of the conversation group 1. Flick operations in respective directions are associated with other conversation groups to which the user A is logging in. The correspondence relationship between the respective flick operations and the conversation groups is shown below.

One flick operation in the direction indicated by an arrow 88 (the right direction of the screen 34): conversation group 2

One flick operation in the direction indicated by an arrow 90 (the left direction of screen 34): conversation group 3

One flick operation in the direction indicated by an arrow 92 (the upward direction of screen 34): conversation group 4

One flick operation in the direction indicated by an arrow 94 (the diagonal upward to right direction of the screen 34): conversation group 5

One flick operation in the direction indicated by an arrow 96 (the diagonal upward to left direction of the screen 34): conversation group 6

One flick operation in the direction indicated by an arrow 98 (the diagonal downward to left direction of the screen 34): conversation group 7

One flick operation in the direction indicated by an arrow 100 (the diagonal downward to right direction of the screen 34): conversation group 8.

One flick operation in the direction indicated by an arrow 102 (the downward direction of the screen 34): conversation group 9

Two consecutive flick operations in the direction indicated by an arrow 104 (the right direction of the screen 34): conversation group 10

One quick flick operation in the direction indicated by an arrow 106 (the right direction of the screen 34): conversation group 11

Each flick operation will be described in more detail. The flick operation indicated by the arrow 102 from the arrow 88 is one flick operation within a predetermined normal speed range. The flick operation indicated by the arrow 104 is two consecutive flick operations within the normal speed range. For example, when a time interval between two flick operations is within a predetermined time, it is detected that two flick operations are performed consecutively. The flick operation indicated by the arrow 106 is one flick operation faster than the above normal speed range.

For example, when one flick operation within the normal speed range is performed and detected in the direction indicated by the arrow 88, the display controller 24 displays the screen 52 of the conversation group 2, instead of the screen 34 of the conversation group 1, on the display unit. When two flick operations within the normal speed range are successively performed and detected in the direction indicated by the arrow 104, the display controller 24 displays a screen of the conversation group 10, instead of the screen 34 of the conversation group 1, on the display unit. When one flick operation faster than the normal speed range is performed and detected in the direction indicated by the arrow 106, the display controller 24 displays a screen of the conversation group 11, instead of the screen 34 of the conversation group 1, on the display unit. Even when a flick operation in a different direction is detected, the screen being displayed is changed to a screen for making a conversation with a conversation group associated with the flick operation.

On the screen after the change, the conversation group 1 before the change is associated with the flick operation in the direction associated with the conversation group after the change. For example, when the flick operation indicated by the arrow 88 is performed on the screen 34, the screen 52 of the conversation group 2 is displayed instead of the screen 34. In this case, the conversation group 1 is associated with the one flick operation in the direction indicated by the arrow 88. When the flick operation indicated by the arrow 88 is performed on the screen 52, the screen 34 of the conversation group 1 is displayed instead of the screen 52. Also, an operation and a conversation group may be associated with each screen for each conversation group.

The above correspondence is merely an example, a different correspondence may be made, or the correspondence may be made by a user. For example, the direction of the operation, the speed of the operation, the number of times the operation is performed may be set by the user and an operation mode and a conversation group may be associated by the user.

According to the eleventh modification, since it is possible to change a conversation group depending on an operation mode, it is possible to change the conversation group by a simple operation.

The above-described flick operation is merely an example of an operation for changing a conversation group, and the conversation group may be changed by an operation (gesture motion or voice) other than the flick operation. In addition, the conversation group may be associated with a combination of user's gesture motion and voice.

Figure 17:
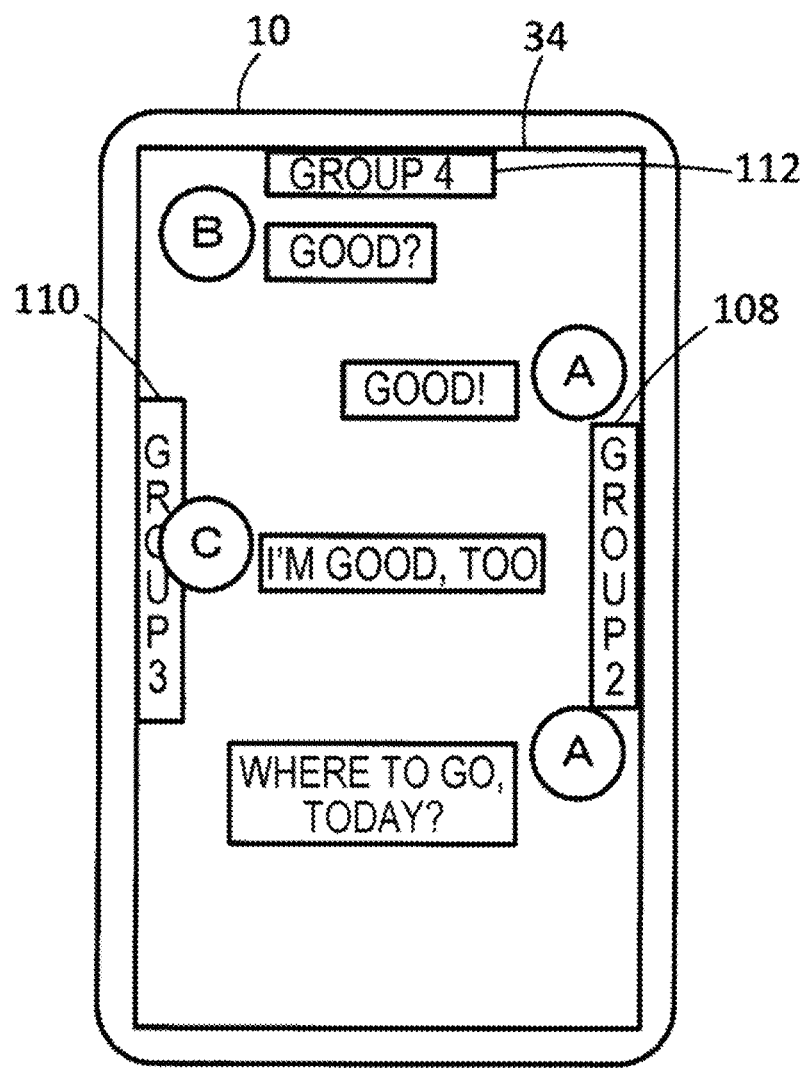
FIG. 17 is a view illustrating a screen.

In the eleventh modification, the display controller 24 may display information indicating the correspondence relationship between an operation mode and a conversation group on the display unit. For example, it is assumed that the user A has logged in to the conversation groups 1, 2, 3 and 4 and the current conversation group is the conversation group 1. In this case, as illustrated in FIG. 17, the display controller 24 displays the screen 34 of the conversation group 1 on the display unit. As in the example illustrated in FIG. 4, the display controller 24 displays on the screen 34 an image associated with each user who is logging in to the conversation group 1 and a conversation content, and further displays information indicating the other conversation groups 2, 3 and 4 on the screen 34. For example, it is assumed that the conversation group 2 is associated with the right direction of the screen 34, the conversation group 3 is associated with the left direction of the screen 34, and the conversation group 4 is associated with the upward direction of the screen 34. In this case, the display controller 24 displays information 108 indicating the conversation group 2 on the right side of the screen 34, information 110 indicating the conversation group 3 on the left side of the screen 34, and information 112 indicating the conversation group 4 on the upper side of the screen 34. The information indicating the conversation group is, for example, a character string or an image indicating a conversation group. When the user A performs a flick operation in the right direction on the screen 34 and the flick operation is detected, the display controller 24 displays the screen 52 of the conversation group 2, instead of the screen 34, on the display unit. By displaying the information indicating the correspondence relationship between an operation mode (for example, the operation direction) and a conversation group, the user is provided with visual information indicating which conversation group the user may make a conversation with when performing an operation.

The information 108 or the like indicating the conversation group may be displayed on the screen 34 all the time or may be displayed according to an instruction from the user. For example, when the user performs a specific operation and the specific operation is detected, the display controller 24 may display on the screen 34 the information 108 or the like indicating the conversation group within a predetermined time or until another operation is detected. The specific operation is, for example, an operation (press and hold operation) of pressing for a predetermined time or more a portion of the screen 34 on which an image or conversation content associated with the user is not displayed, or the like. Also, another operation may be defined as the specific operation. Further, the information 108 or the like may be displayed in a translucent state during displaying.

Figure 18:
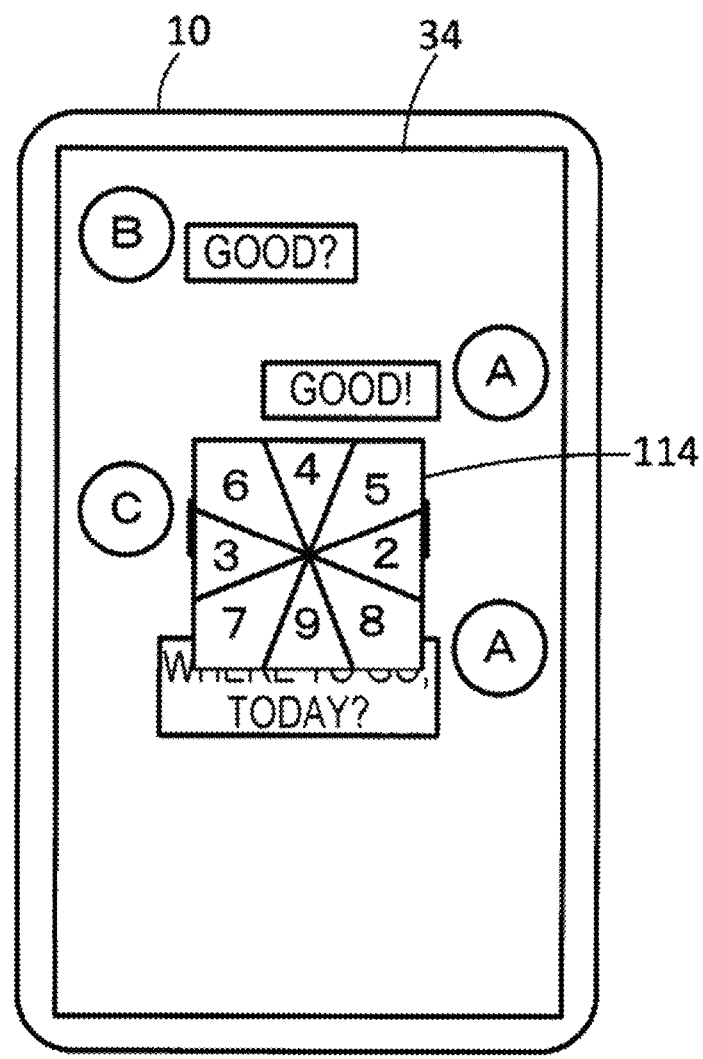
FIG. 18 is a view illustrating a screen.

FIG. 18 illustrates another example of the information indicating the correspondence relationship. In this example, the display controller 24 displays a map image 114 on the screen 34 of the conversation group 1. The map image 114 is an image indicating the correspondence relationship between an operation direction and a conversation group. A numerical value displayed in the map image 114 indicates the number of the conversation group, and the display position of the numerical value indicates an operation direction with which the conversation group is associated. For example, a numerical value "2" indicates the conversation group 2. Since the numerical value "2" is displayed at the right side position in the map image 114, the conversation group 2 is associated with an operation in the right direction. Therefore, when the user A performs an operation (for example, a flick operation) in the right direction on the screen 34 and the operation is detected, the display controller 24 displays the screen 52 of the conversation group 2, instead of the screen 34, on the display unit. By displaying such a map image 114, the user is provided with visual information indicating which conversation group the user may make a conversation with when performing an operation.

As in the example illustrated in FIG. 17, the map image 114 may be displayed on the screen 34 all the time or may be displayed according to an instruction from the user. For example, when a specific operation by the user is detected, the display controller 24 may display the map image 114 on the screen 34. In addition, when the screen 34 is changed to the screen of another conversation group while the map image 114 is being displayed or when another user is moved to another conversation group while the map image 114 is being displayed, the display controller 24 may not display the map image 114. By doing this, since the map image 114 is not displayed when the operation of the user is completed, it is possible to avoid a situation where it is hard for the user to see a remark content due to display of the map image 114. Also, the display controller 24 may display the map image 114 until the user gives a non-display instruction. Further, the map image 114 may be displayed in a translucent state during displaying.

Figure 19:
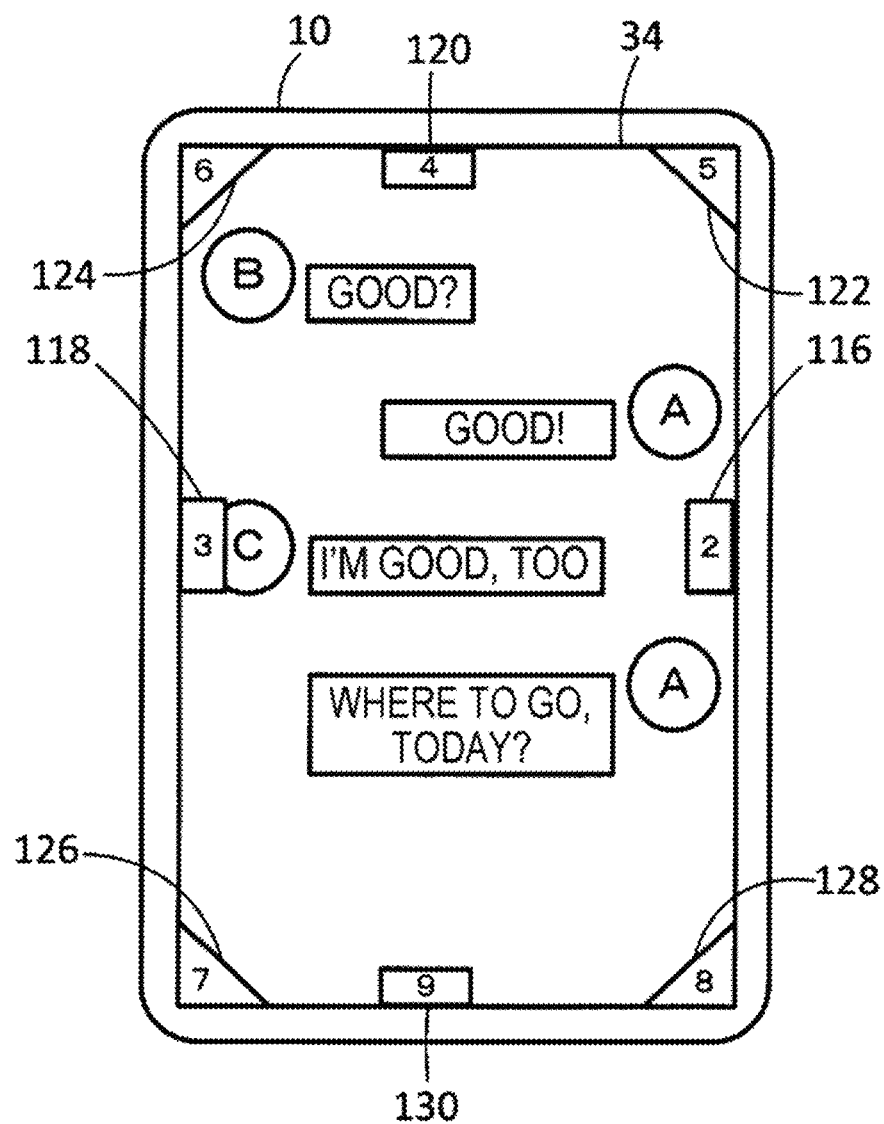
FIG. 19 is a view illustrating a screen.

FIG. 19 illustrates still another example of the information indicating the correspondence relationship. In the example illustrated in FIG. 19, the display controller 24 displays images 116 to 130 indicating the correspondence relationship between the operation direction and the conversation group on the edges of the screen 34. A numerical value displayed in each image indicates the number of a conversation group, and the display position of the image indicates the operation direction with which the conversation group is associated. For example, a numerical value "2" indicates the conversation group 2. Since the image 116 representing the numerical value "2" is displayed on the right edge of the screen 34, the conversation group 2 is associated with an operation in the right direction. Therefore, when the user A performs an operation (for example, a flick operation) in the right direction on the screen 34 and the operation is detected, the display controller 24 displays the screen 52 of the conversation group 2, instead of the screen 34, on the display unit. In this manner, by displaying an image indicating a conversation group on an edge of the screen, it becomes hard for the image to be superimposed on a remark content, so that the remark content becomes hard to be obstructed by the image. Also, the display controller 24 may grasp the position and size of the display content and arrange the image indicating the conversation group in the screen 34 so as to avoid the image associated with the user and the displayed portion of the remark content of each user. At that time, the display controller 24 may realize the above arrangement by reducing the image associated with the user or the remark content of each user. Alternatively, the display controller 24 may reduce the image indicating the correspondence relationship between the operation direction and the conversation group and may display it on the screen 34. By doing so, it is possible to display the image without degrading the visibility of the image indicating the correspondence relationship between the operation direction and the conversation group. Similarly to the map image 114 illustrated in FIG. 18, when the screen 34 is changed to the screen of another conversation group or when another user is moved to another conversation group, the display controller 24 may not display the images 116 to 130. Also, the display controller 24 may display the images 116 to 130 until the user gives a non-display instruction. In addition, the images 116 to 130 may be displayed in a translucent state during displaying. By doing so, even when the images 116 to 130 overlap with the display portion of the image associated with the user or the remark content of each user, it is possible to prevent the visibility of each image and the remark content from being degraded.

Second Exemplary Embodiment

Hereinafter, an information processing system according to a second exemplary embodiment will be described. The information processing system according to the second exemplary embodiment has the same configuration as the information processing system according to the first exemplary embodiment. A server 12 according to the second exemplary embodiment has the same configuration as the server 12 according to the first exemplary embodiment, and has a function of providing an SNS as in the first exemplary embodiment. A terminal device 10 according to the second exemplary embodiment has the same configuration as the terminal device 10 according to the first exemplary embodiment, but the function of a display controller 24 according to the second exemplary embodiment is different from the function of the display controller 24 according to the first exemplary embodiment. Hereinafter, the process of the display controller 24 according to the second exemplary embodiment will be mainly described in detail.

In the second exemplary embodiment, similarly to the first exemplary embodiment, when an SNS is used, the display controller 24 displays information (a character string, an image, etc.) transmitted or received using the SNS, on the display unit of the UI unit 16. In the second exemplary embodiment, when a user has logged in to plural conversation groups, the display controller 24 displays conversation contents of the plural conversation groups on the same screen.

Hereinafter, the operation of the terminal device 10 according to the second exemplary embodiment will be described in detail by way of a specific example.

For example, it is assumed that users A, B and C belong to conversation group 1, users A, D and E belong to conversation group 2, and a conversation is made using an SNS for both conversation groups 1 and 2. For example, it is also assumed that the users A, B and C log in to the conversation group 1 to exchange messages, and the users A, D and E log in to the conversation group 2 to exchange messages.

Figure 20:
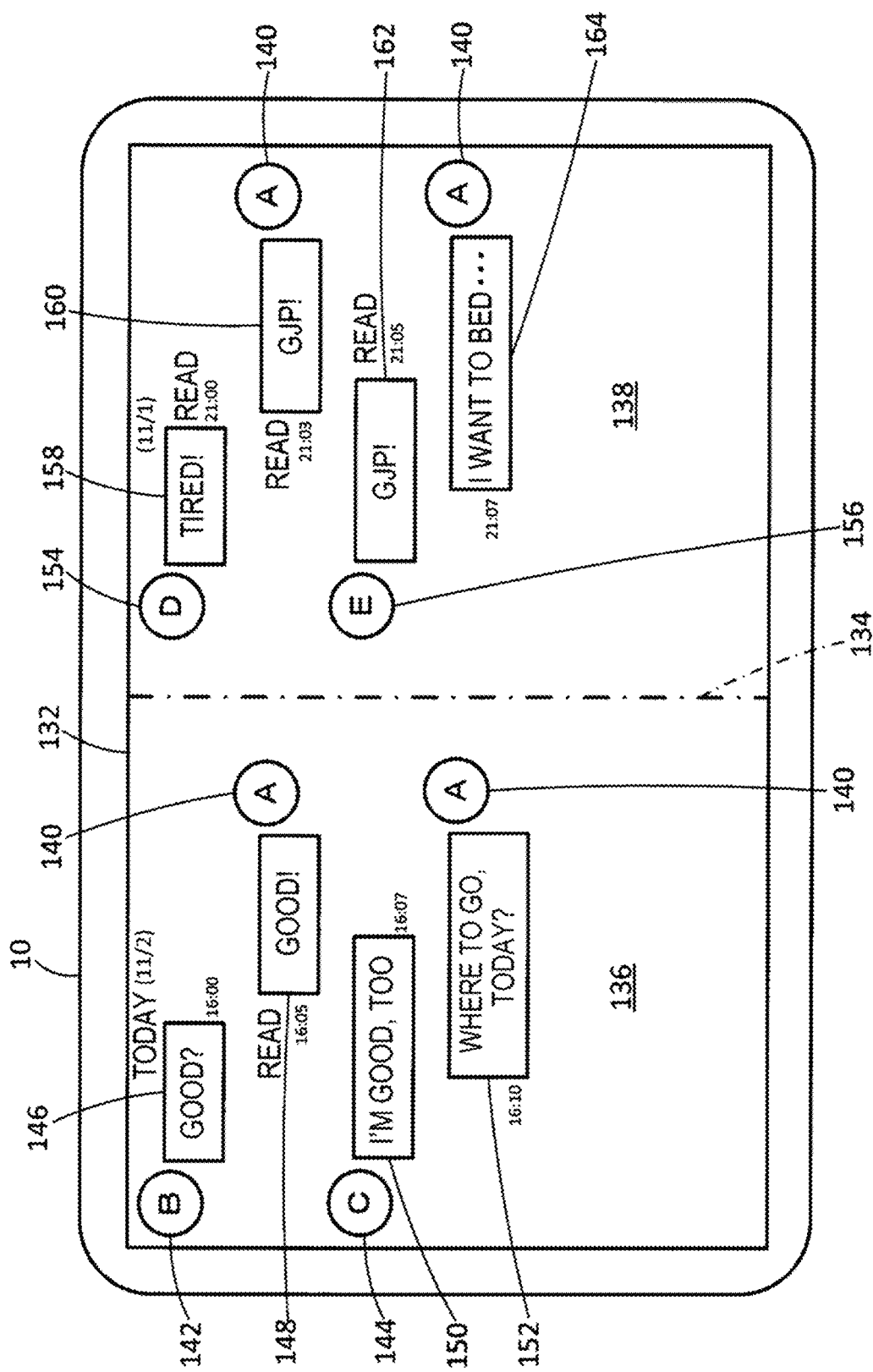
FIG. 20 is a view illustrating a screen.

A screen displayed on the terminal device 10 when using the SNS will be described below with reference to FIG. 20. FIG. 20 illustrates an example of a screen displayed on the terminal device 10A used by the user A. The display controller 24 of the terminal device 10A displays a screen 132 on the display unit of the UI unit 16 and displays various kinds of information on the screen 132. The screen 132 is an interface (conversation screen) for making a conversation with another user (speaker). Information (for example, a character string, an image, etc.) input by each user is displayed on the screen 132. The conversation between plural users may be a so-called chatting-type conversation (that is, a real-time conversation, in further other words, a form of conversation between users while remarking). For example, when the SNS application program is executed by the controller 22 of the terminal device 10A, the display controller 24 displays a screen for making a conversation using the SNS on the display unit of the UI unit 16. When the SNS application program is executed, it may be possible to use the Internet telephone function, etc. in addition to the chatting function.

For example, it is assumed that the user A has logged in to the conversation groups 1 and 2. In this case, the display controller 24 displays the conversation contents of the conversation group 1 and the conversation contents of the conversation group 2 on the same screen 132. For example, the display controller 24 sets display areas 136 and 138 in the lateral direction (on the left and right) within the screen 132 with a virtual line 134 as a boundary, displays the conversation contents of the conversation group 1 in the display area 136, and displays the conversation contents of the conversation group 2 in the display area 138. The conversation contents between the users A, B and C logged in the conversation group 1 are displayed in the display area 136. The conversation contents between the users A, D and E logged in the conversation group 2 are displayed in the display area 138. When the user A has logged in to two conversation groups, the virtual line 134 is set, for example, at the center in the lateral direction of the screen 132. Also, the display controller 24 may control the size of each display area by changing the position of the virtual line 134 according to the length of a remark content (for example, a message) in each conversation group. For example, the display controller 24 may change the position of the virtual line 134 so that the display area of a conversation group having a longer remark content is wider than the display area of a conversation group having a shorter remark content. Further, the display controller 24 may change the position of the virtual line 134 according to the amount of the remark content. The display controller 24 may change the position of the virtual line 134 according to the operation of the user. The display controller 24 may or may not display the virtual line 134 on the screen 132.

In the example illustrated in FIG. 20, the conversation contents of the two conversation groups are displayed on the same screen 132, but the conversation contents of three or more conversation groups may be displayed on the same screen 132. For example, when the user A has logged in to three or more conversation groups, the conversation contents of the three or more conversation groups are displayed on the same screen 132. Also, when the user A has logged in to one conversation group (for example, the conversation group 1), the conversation contents of the one conversation group (for example, the conversation group 1) are displayed as illustrated in FIG. 4.

For example, when the user A has logged in to one conversation group (for example, the conversation group 1), the display controller 24 displays the screen 34 for making a conversation with the conversation group 1 on the display unit, as illustrated in FIG. 4. In this situation, when the user A further logs in to another conversation group (for example, the conversation group 2), the display controller 24 widens the screen for making a conversation, for example, and displays the conversation contents of the conversation groups 1 and 2 on the screen 132.

As another example, when the user A has logged in to one conversation group (for example, the conversation group 1), the display controller 24 uses the screen in a vertically long state, as illustrated in FIG. 4, to display the conversation contents of the conversation group 1 on the vertically long screen. When the user A further logs in to another conversation group (for example, the conversation group 2), the display controller 24 changes the screen from the vertically long state to a laterally long state and displays the conversation contents of the conversation groups 1 and 2 on the laterally long screen 132. In the example illustrated in FIG. 20, the conversation contents of the conversation groups 1 and 2 are displayed on the laterally long screen 132.

Further, as the conversation contents of more conversation groups are displayed, the display controller 24 may reduce each conversation contents (a character string, an image, etc.) and display it on the screen.

Hereinafter, the information displayed in each display area will be described in detail.

The display controller 24 displays an image 140 associated with the user A, an image 142 associated with the user B, and an image 144 associated with the user C in the display area 136 assigned to the conversation group 1. The image 140 is an image for identifying the user A, the image 142 is an image for identifying the user B, and the image 144 is an image for identifying the user C. Instead of the image 140 or in addition to the image 140, a character string indicating the user A (for example, a character string for identifying the user A, such as a name, a user ID, a handle name, a nickname, etc.) may be displayed. The same applies to the images 142 and 144. The image 140 associated with the user A is displayed in an area allocated to the user A who uses the terminal device 10A in the display area 136, and the image 142 associated with the user B and the image 144 associated with the user C are displayed in an area allocated to other users in the display area 136.

Thereafter, a conversation is made between the users A, B and C. Each user may operate the UI unit 16 of the terminal device 10 of his/her own to input the remark contents with a character string, an image, voice or the like. In addition, the remark contents of each user may be output as voice. The remark contents are displayed in time series according to the date and time of transmission. When the conversation progresses on the display area 136, the display area 136 is scrolled such that the past remark contents which cannot be displayed on the display area 136 disappear from the display area 136 and the latest remark contents or the most recent remark contents are displayed on the display area 136.

A remark content 146 is a remark content (for example, a message) transmitted by the user B using the terminal device 10B and is displayed in the display area 136 in association with the image 142 of the user B. The remark content 146 is also displayed as the remark content of the user B on the terminal devices 10B and 10C. A remark content 148 is a remark content transmitted by the user A using the terminal device 10A and is displayed in the display area 136 in association with the image 140 of the user A. The remark content 148 is also displayed as the remark content of the user A on the terminal devices 10B and 10C. A remark content 150 is a remark content transmitted by the user C using the terminal device 10C and is displayed in the display area 136 in association with the image 144 of the user C. The remark content 150 is also displayed as the remark content of the user C on the terminal devices 10B and 10C. A remark content 152 is a remark content transmitted by the user A. In the example illustrated in FIG. 20, the remark contents 146, 148, 150 and 152 are transmitted in this order, and the remark contents 146, 148, 150 and 152 are displayed in time series according to the date and time of transmission. The same also applies to the following remark contents.

In addition, as in the first exemplary embodiment, information indicating the time at which each remark content has been transmitted (for example, the timing or the date and time) may be displayed in the display area 136. For example, a character string indicating a date (for example, today's date, November 2) is displayed in the display area 136. A remark content displayed below the display position of the character string indicating the date is a remark content transmitted after that date. A remark content displayed above the display position is a remark content transmitted before that date. Information indicating hour and minute or date and time may not be displayed as well.

In addition, as in the first exemplary embodiment, read and unread of a remark content may be managed. The definition of a read message and an unread message is the same as the definition according to the first exemplary embodiment.

Further, the display controller 24 displays the image 140 associated with the user A, an image 154 associated with the user D, and an image 156 associated with the user E in the display area 138 allocated to the conversation group 2. The image 154 is an image for identifying the user D, and the image 156 is an image for identifying the user E. Similarly to the display area 136, a character string indicating a user may be displayed instead of or in addition to the user's image. The image 140 associated with the user A is displayed in an area allocated to the user A who uses the terminal device 10A in the display area 138, and the image 154 associated with the user D and the image 156 associated with the user E are displayed in an area allocated to other users in the display area 138.

Thereafter, a conversation is made between the users A, D and E. The remark content of each user is transmitted from the terminal device 10 of his/her own to the terminal device 10 of another user who is logging in to the conversation group 2 and displayed. For example, a remark content 158 of the user D is displayed in the display area 138 in association with the image 154 of the user D, a remark content 160 of the user A is displayed in the display area 138 in association with the image 140 of the user A, a remark content 162 of the user E is displayed in the display area 138 in association with the image 156 of the user E, and a remark content 164 of the user A is displayed in the display area 138 in association with the image 140 of the user A. Similarly to the display area 136, each remark content is displayed in time series according to the date and time of transmission.

In addition, similarly to the display area 136, information indicating the time at which each remark content has been transmitted (for example, the timing or the date and time) may be displayed in the display area 138. For example, a character string indicating a date (for example, yesterday's date, November 1) is displayed in the display area 138. A remark content displayed below the display position of the character string indicating the date is a remark content transmitted after that date. A remark content displayed above the display position is a remark content transmitted before that date. Information indicating hour and minute or date and time may not be displayed as well.

In addition, similarly to the conversation group 1, for the conversation group 2, read and unread of a remark content may be managed.

The user A can send a remark content to the conversation groups 1 and 2 on the screen 132. That is, it is in a state where it is possible to transmit the remark content to the conversation groups 1 and 2. For example, the user A uses the UI unit 16 to select a conversation group of a transmission destination and input the remark content. Accordingly, the remark content is transmitted to the conversation group of the transmission destination. For example, when the user A designates the display area 136 and inputs the remark content, the remark content is transmitted to the conversation group 1. The designation of the display area is performed, for example, by a touch operation on the display area or by voice. The user A may designate a conversation group to which the remark content is to be transmitted after inputting the remark content. For example, the user A may designate a conversation group of a transmission destination by an operation such as a flick operation. Also in this case, the remark content is transmitted to the conversation group of the transmission destination.

As described above, according to the second exemplary embodiment, it is possible to display plural conversation groups on the same screen for conversation. For example, it is possible to display plural conversation groups for conversation without expanding the display area, increasing the number of display units, or using plural screens.

Hereinafter, modifications of the second exemplary embodiment will be described.

Twelfth Modification

In a twelfth modification, the display controller 24 displays a conversation content of an active conversation group on the display unit and does not display a conversation content of an inactive conversation group on the display unit. When there are plural active conversation groups, the display controller 24 displays the conversation contents of the plural conversation groups on the same screen.

The active conversation group is, for example, a conversation group to which another user is logging in, a conversation group in which the elapsed time from the transmission and reception of the last message is within a predetermined time, etc.

For example, when the user A has logged in to the conversation groups 1 and 2 and the conversation groups 1 and 2 correspond to the active conversation group, the display controller 24 displays the conversation contents of the conversation groups 1 and 2 on the same screen 132, as illustrated in FIG. 20.

The display controller 24 excludes inactive conversation groups (conversation groups other than the above-described active conversation group) from the display target. When a specific operation by the user (an operation indicating a display instruction of a conversation content of an inactive conversation group) is detected, the display controller 24 may display the conversation content of the inactive conversation group on the display unit. In this case, the display controller 24 may display both the conversation content of the active conversation group and the conversation content of the inactive conversation group on the same screen, or may display the conversation content of the inactive conversation group on the display unit without displaying the conversation content of the active conversation group on the display unit.

It is assumed that a user is more likely to make a conversation with an active conversation group than an inactive conversation group. Therefore, according to the twelfth modification, a conversation group with which a user can make a conversation is preferentially displayed.

Thirteenth Modification

Figure 21:
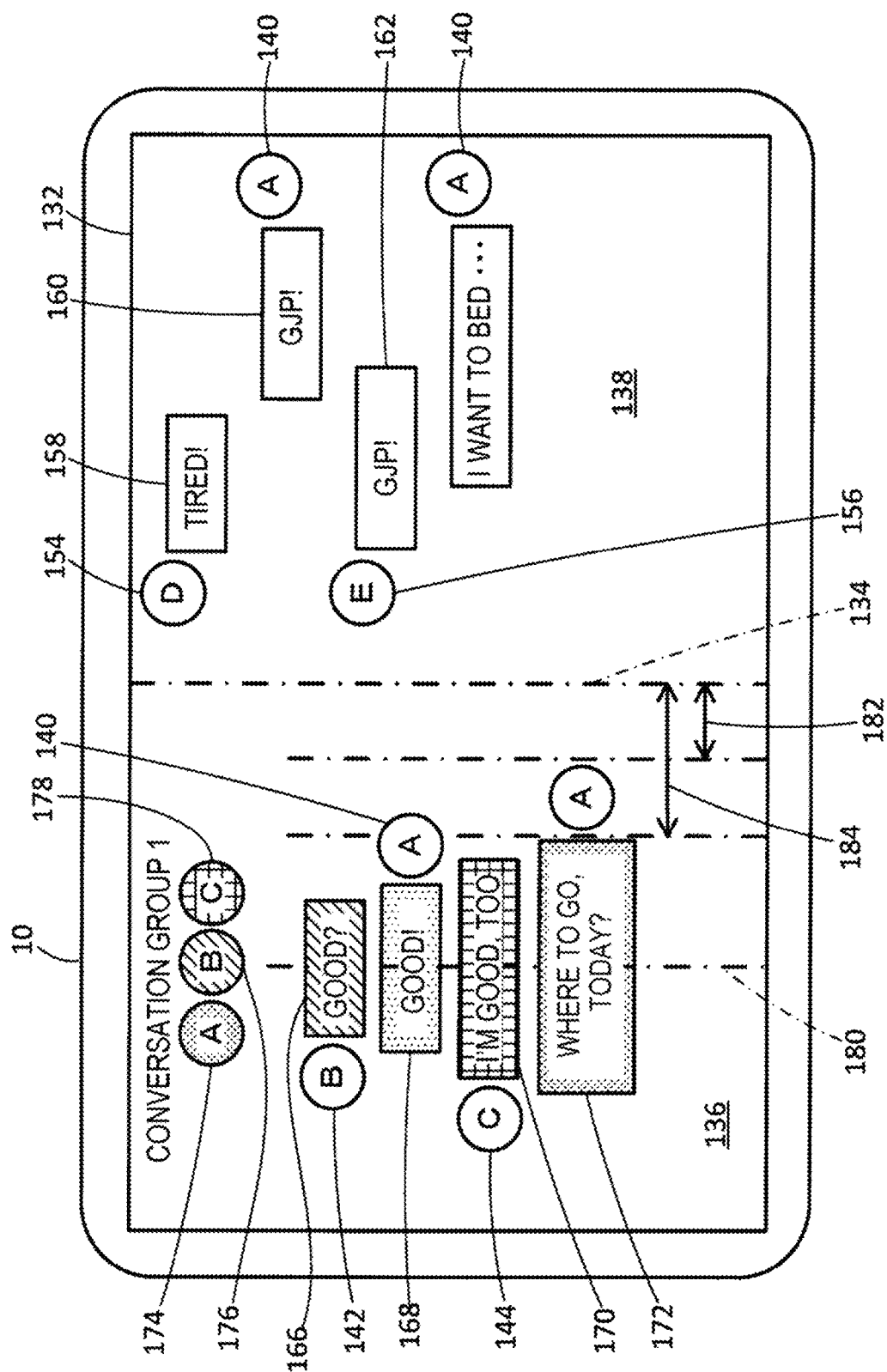
FIG. 21 is a view illustrating a screen.

In a thirteenth modification, the display controller 24 controls the display of each remark content so that a user who issues a remark content included in a conversation content of a conversation group is identifiable. For example, the display controller 24 displays remark contents color-coded for different users. Hereinafter, the thirteenth modification will be described in detail with reference to FIG. 21. FIG. 21 illustrates a screen 132.

Here, the conversation group 1 will be described. As in the example illustrated in FIG. 20, the display controller 24 displays a remark content 166 of the user B, remark contents 168 and 172 of the user A, and a remark content 170 of the user C in the display area 136. At this time, the display controller 24 makes the display colors of the remark contents of the users different from each other.

Further, the display controller 24 may display a character string (for example, a character string "conversation group 1") for identifying the conversation group 1 in the display area 136. In the example illustrated in FIG. 21, the character string "Conversation group 1" is displayed in the upper portion of the display area 136.

In addition, the display controller 24 may display information of users who are logging in to the conversation group 1 collectively in the display area 136. In the example illustrated in FIG. 21, as the information of the users, images 174, 176 and 178 associated with the users are collectively displayed in the upper portion of the display area 136. The image 174 is an image associated with the user A, the image 176 is an image associated with the user B, and the image 178 is an image associated with the user C. The display color of each image corresponds to the display color of the remark content of each user. For example, the display color of the image 174 associated with the user A is the same as the display color of the remark contents 168 and 172 of the user A. The display color of the image 176 associated with the user B is the same as the display color of the remark content 166 of the user B. The display color of the image 178 associated with the user C is the same as the display color of the remark content 170 of the user C. By doing this, it becomes easy to visually understand whom a remark content is for.

In the case of displaying color-coded remark contents, the images 140, 142 and 144 associated with the users need not be displayed. This is because, even if the images 140, 142 and 144 are not displayed, it is possible to identify whom each remark content is for.

The display controller 24 may make the display shapes of the respective remark contents different from each other by color-coding the remark contents or without color-coding. Accordingly, the display controller 24 may make the display shapes of the images 174, 176 and 178 associated with the users different from each other. For example, the display controller 24 displays the images and the remark contents in the display area 136 with the same image associated with the same user and the same display shape of the remark content.

In the example illustrated in FIG. 21, the above process is applied only to the conversation group 1, but the above process may also be applied to the conversation group 2.

Fourteenth Modification

In a fourteenth modification, the display controller 24 arranges remark contents (for example, messages) included in the conversation content of the same conversation group on the same straight line and displays the remark contents in a display area allocated to the conversation group. Hereinafter, the fourteenth modification will be described in detail with reference to FIG. 21.

Here, the conversation group 1 will be described. The display controller 24 sets a virtual straight line 180 along a time-series direction in the display area 136 and arranges the remark contents 166, 168, 170 and 172 on the straight line 180. For example, the display controller 24 places the remark contents so that the central portion of each remark content is arranged on the straight line 180. Accordingly, the remark contents are line-symmetrical with respect to the straight line 180 as an axis of symmetry (bilaterally symmetrical). By doing this, as illustrated in FIG. 20, it is possible to secure more space in the display area 136 than a case where the remark contents of the users are bilaterally divided within the display area 136. In other words, by arranging the remark contents in a stuffed state along the straight line 180, it is possible to secure more space than a case where the remark contents are arranged in a distributed manner. For example, a space (a space denoted by reference numeral 182) corresponding to a distance between a virtual line 134 defining the display areas 136 and 138 and the image 140 associated with the user A displayed at the position closest to the virtual line 134 can be secured. Further, as described in the thirteenth modification, when the images 140, 142 and 144 associated with the users are not displayed, a space (a space denoted by reference numeral 184) corresponding to a distance between the virtual line 134 and the remark content 172 displayed at the position closest to the virtual line 134 can be secured. The display areas of other conversation groups may be increased by the space. For example, the display area 136 of the conversation group 1 may be narrowed by the space, and the display area 138 of the conversation group 2 may be widened by the space.

According to the fourteenth modification, it is possible to effectively utilize a finite display area.

The above-described layout is merely an example, and another layout may be adopted. For example, the display controller 24 may move the remark contents arranged on the straight line 180 to one edge (for example, a left edge of the screen 132) within the display area 136, or may align one ends of the display areas on a straight line.

In the example illustrated in FIG. 21, the above process is applied only to the conversation group 1, but the above process may also be applied to the conversation group 2.

In addition, the display controller 24 may arrange respective remark contents in a conversation group whose longest remark content is shortest among the plural conversation groups, on the same straight line and display the arranged remark contents on the display area. For example, the display controller 24 compares the longest remark content (for example, a message with the largest number of characters) in the conversation group 1 with the longest remark content in the conversation group 2. When the longest remark content in the conversation group 1 is shorter (for example, smaller in terms of the number of characters) than the longest remark content in the conversation group 2, the display controller 24 arranges the remark contents in the conversation group 1 on the same straight line. By doing this, it is possible to secure more space. Also, the display controller 24 may apply the process according to the fourteenth modification to all the conversation groups.

Fifteenth Modification

Figure 22:
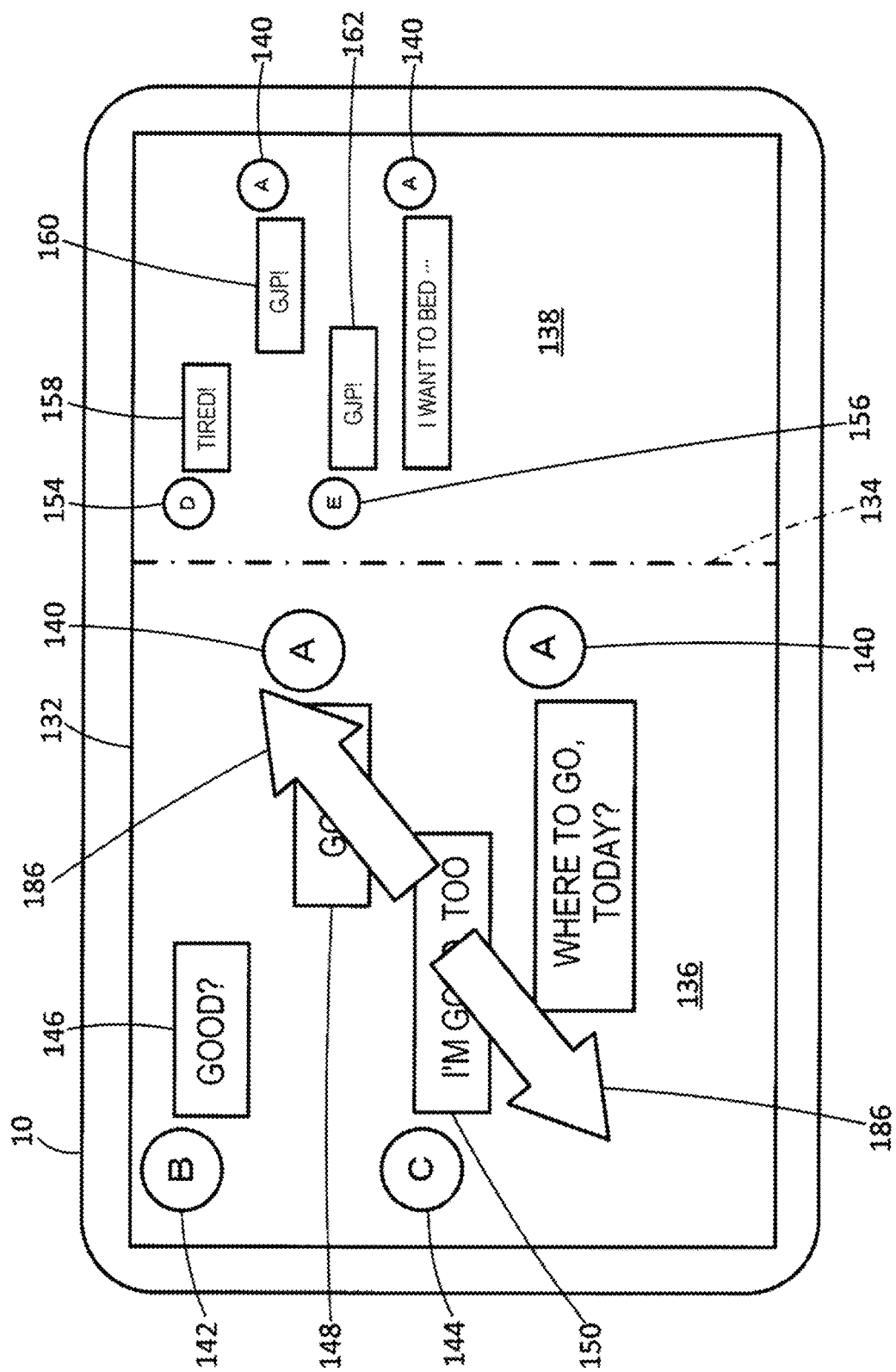
FIG. 22 is a view illustrating a screen.

In a fifteenth modification, in response to a change in a display area of a conversation content of a certain conversation group included in plural conversation groups, the display controller 24 changes a display area of a conversation content of another conversation group. For example, in response to a user's operation (for example, an enlargement operation or a reduction operation) on a display area of a certain conversation group, the display controller 24 enlarges or reduces a display area of another conversation group. Hereinafter, the fifteenth modification will be described in detail with reference to FIG. 22. FIG. 22 illustrates a screen 132.

For example, while the screen 132 is being displayed, when the user performs an operation (for example, a pinch-out operation) of enlarging the display area 136 of the conversation group 1, as indicated by an arrow 186, and the operation is detected, the display controller 24 enlarges the display area 136. Along with this, a remark content displayed in the display area 136 and an image associated with the user are enlarged and displayed. Further, in response to the operation of enlarging the display area 136, the display controller 24 reduces the display area 138 of the conversation group 2 by the enlargement. Along with this, a remark content displayed in the display area 138 and an image associated with the user are reduced and displayed. The display controller 24 displays the enlarged conversation content of the conversation group 1 and the reduced conversation content of the conversation group 2 on the same screen 132. In addition, when the user performs an operation (for example, a pinch-in operation) to pinch the display area 136 and the operation is detected, the display controller 24 reduces the display area 136 and, in response thereto, enlarges the display area 138 of the conversation group 2.

According to the fifteenth modification, it is possible to enlarge or reduce the conversation contents of some conversation groups in a limited display area.

Further, the display controller 24 may enlarge a display area of a conversation group to which the user A inputs a remark content and, in response thereto, may reduce a display area of another conversation group. For example, when the user A is inputting a remark content for the conversation group 1, the display controller 24 enlarges the display area 136 of the conversation group 1 and reduces the display area 138 of the conversation group 2. When the transmission of the remark content is completed, the display controller 24 returns the size of the display area 136 to the size before the enlargement and returns the size of the display area 138 to the size before the reduction. Further, when the user A is inputting the remark content for the conversation group 1, the display controller 24 may display the display area 136 on the entire screen 132 without displaying the display area 138 on the screen 132. That is, the display area 136 is fully displayed on the screen 132. When the transmission of the remark content is completed, the display controller 24 returns the sizes of the display areas 136 and 138 to their original sizes. The same applies to a case where a remark content for the conversation group 2 is input.

Also, when the enlargement operation or the reduction operation is performed on the screen 132, the display controller 24 may enlarge or reduce the entire area of the screen 132. This setting may be performed by the user.

Sixteenth Modification

In a sixteenth modification, the display controller 24 scrolls a display area according to a user's operation so that information (a character string, an image, etc.) that cannot be displayed in the display area can be displayed on the display unit. At this time, the display controller 24 synchronizes the scroll of the conversation contents among plural conversation groups. That is, when the scroll operation is performed on a display area of a conversation group, the display controller 24 scrolls the display area of the conversation group and further scrolls a display area of another conversation group displayed on the same screen. Hereinafter, the sixteenth modification will be described in detail with reference to FIG. 23.

Figure 23:
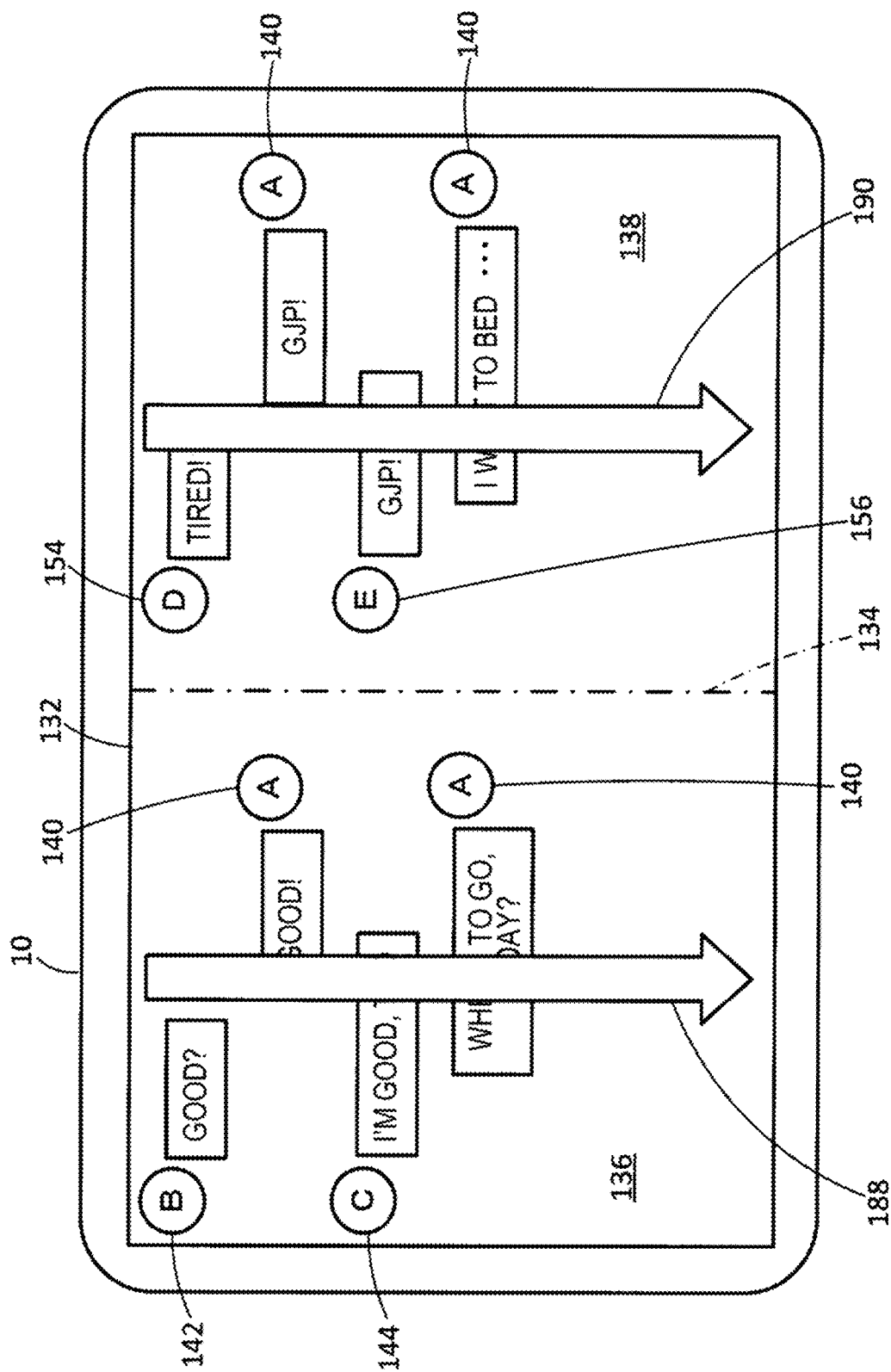
FIG. 23 is a view illustrating a screen.

FIG. 23 illustrates a screen 132. For example, when the user A performs an operation of scrolling the display area 136 of the conversation group 1, as indicated by an arrow 188, and the operation is detected, the display controller 24 scrolls the display area 136 in a direction indicated by an arrow 188. Further, the display controller 24 scrolls the display area 138 of the conversation group 2, as indicated by an arrow 190, in the same direction as the direction indicated by the arrow 188. By doing so, a display area on which the scroll operation is not actually performed is also scrolled, thereby saving the time of the scroll operation by the user.

The scroll amount in the display area 136 on which the scroll operation is actually performed may be the same as or different from the scroll amount in the display area 138 on which the scroll operation is not performed. This setting may be performed by the user.

Figure 24:
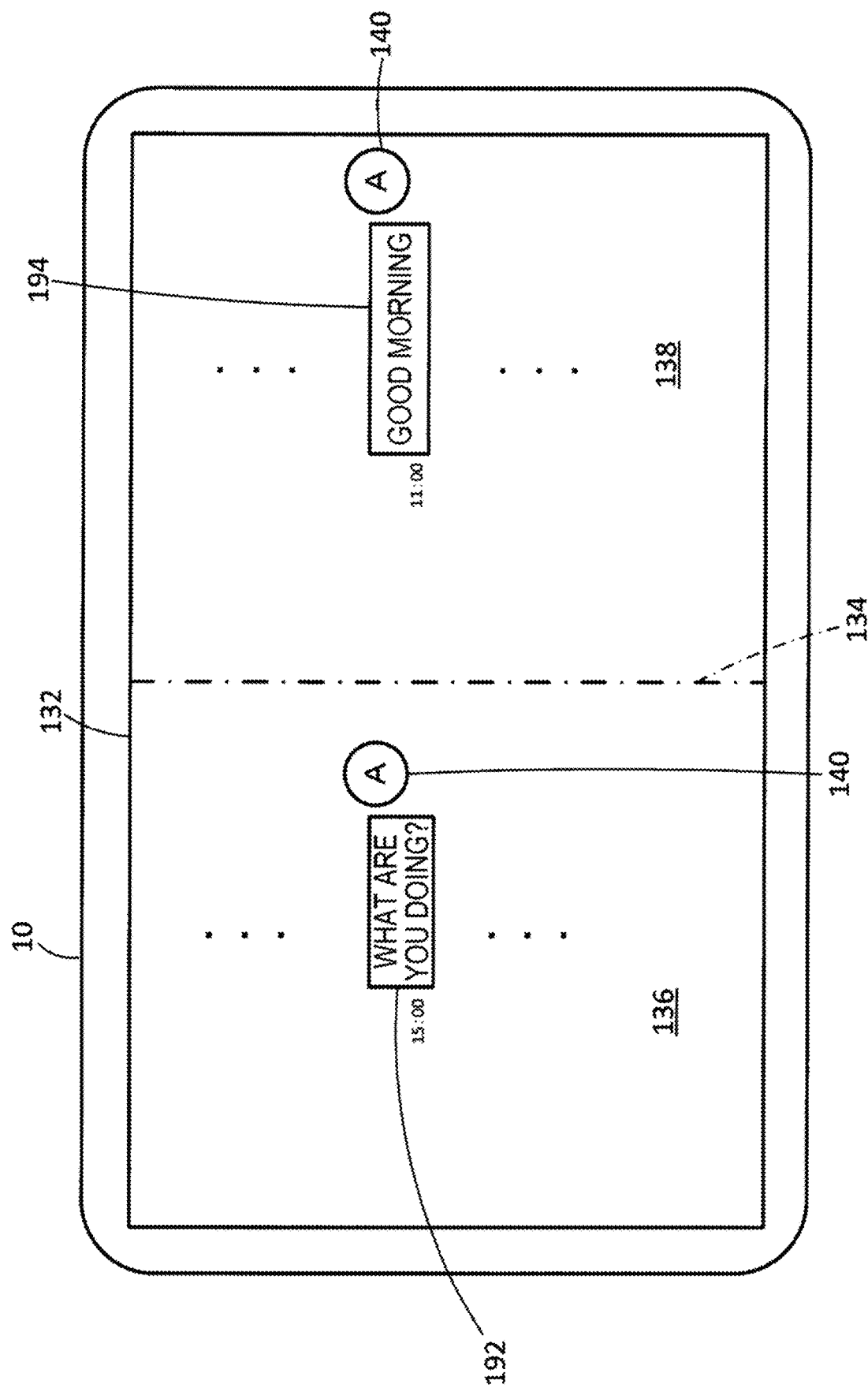
FIG. 24 is a view illustrating a screen.

Also, the display controller 24 may scroll the display area 136 on which the scroll operation has actually been performed but may not scroll the display area 138 on which the scroll operation has not been performed, in response to the scroll operation. The interlock control (synchronous control) or non-interlock control (asynchronous control) may be set by the user. In the case where the scrolling operation is performed, when there is an unread message, the display controller 24 may scroll the display area to the display position of the unread message. Hereinafter, this process will be described with reference to FIG. 24. FIG. 24 illustrates a screen 132.

For example, in a case where a scroll operation is performed on the display area 136 of the conversation group 1, when there is an unread message in the conversation group 1, the display controller 24 scrolls the display area 136 to the display position of the unread message. For example, the display controller 24 scrolls the display area 136 so that the unread message is displayed at a specific position (for example, the center position, the top position, the bottom position, or the like) of the display area 136. FIG. 24 illustrates the scrolled display area 136. For example, when a remark content 192 of the user A in the conversation group 1 is in an unread state, the display controller 24 scrolls the display area 136 so that the remark content 192 is displayed at a specific position in the display area 136. When there are plural unread messages, the display controller 24 may scroll the display area 136 to the display position of an unread message transmitted at the oldest date and time, or may scroll the display area 136 to the display position of an unread message transmitted at the latest date and time.

When there is an unread message in the conversation group 2 on which the scroll operation has not been performed, the display controller 24 may scroll the display area 138 of the conversation group 2 to the display position of the unread message. FIG. 24 illustrates the scrolled display area 138. For example, when a remark content 194 of the user A in the conversation group 2 is in an unread state, the display controller 24 scrolls the display area 138 so that the remark content 194 is displayed at a specific position in the display area 138. The process when there are plural unread messages is the same as the above process for the display area 136.

As described above, by scrolling a display area to the display position of an unread message, it is possible to save the time taken for the user to search for an unread message. In addition, by scrolling a display area on which no scrolling operation has been performed to the display position of an unread message, the time of the scroll operation by the user can be saved.

Seventeenth Modification

In a seventeenth modification, the controller 22 performs duplication and transfer (copy & paste) of a remark content among plural conversation groups. The remark content may be a remark content transmitted by a user or may be a remark content transmitted by another user.

Figure 25:
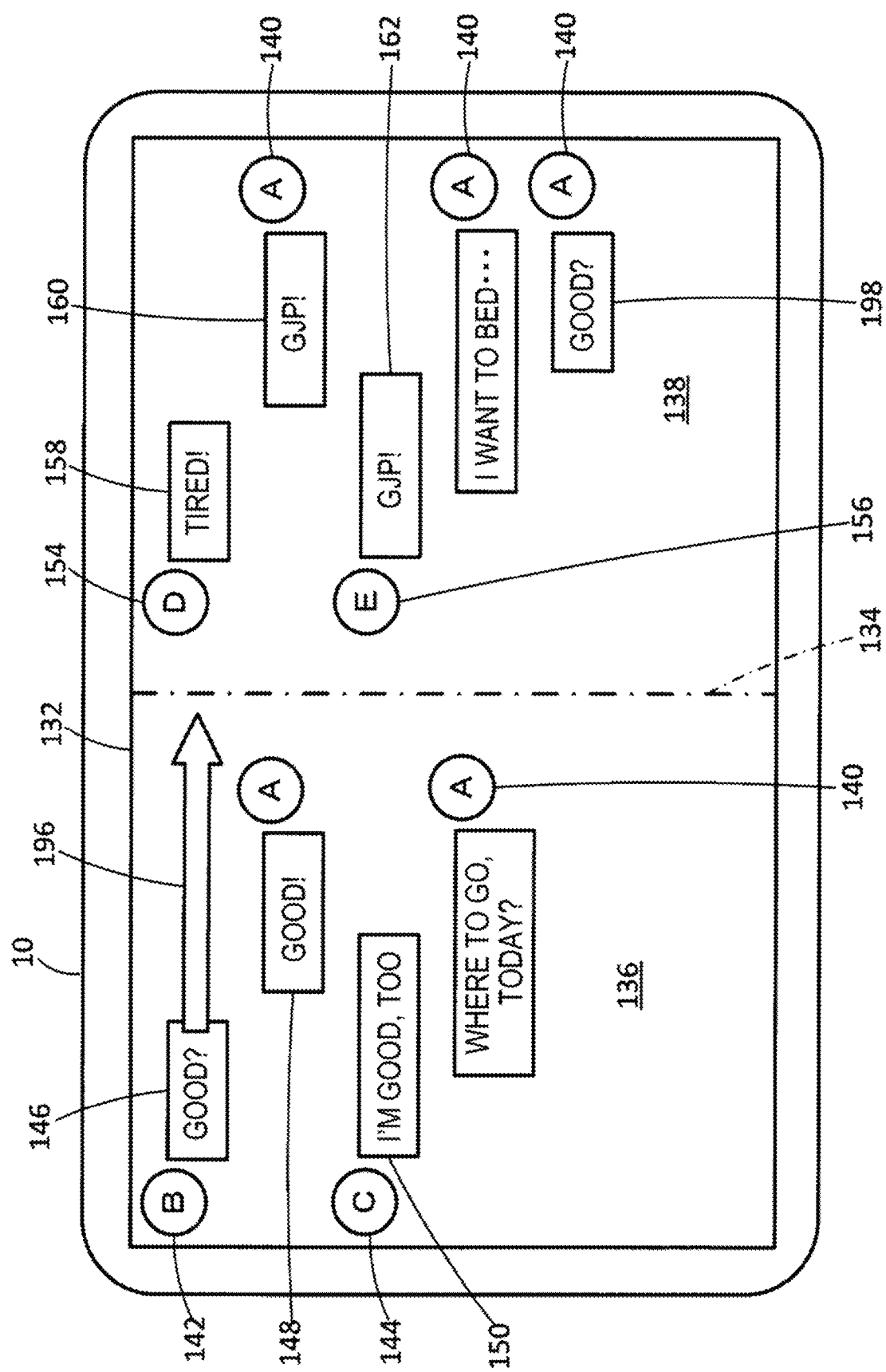
FIG. 25 is a view illustrating a screen.

The seventeenth modification will be described in detail below with reference to FIG. 25. FIG. 25 illustrates a screen 132. For example, when the user A designates the remark content 146 of the user B on the display area 136 of the conversation group 1 and performs an operation of copying it to the conversation group 2, the controller 22 copies the remark content 146 and pastes it on the display area 138 of the conversation group 2 as the remark content of the user A. The copying operation is, for example, an operation of sliding the remark content 146 in a direction indicated by an arrow 196. When the user A slides the remark content 146 to be copied to the display area 138 of the conversation group 2 of the copy destination, the controller 22 may paste the remark content 146 in the display area 138. In the example illustrated in FIG. 25, the copied remark content 146 is displayed as the remark content 198 of the user A in the display area 138. The remark content 198 is transmitted to the terminal devices 10 of the users D and E who are logging in to the conversation group 2. The remark content 198 may be transmitted to the terminal devices 10 of the users D and E at the timing when the copying operation is performed. Alternatively, the remark content 198 may be transmitted to the terminal devices 10 of the users D and E when the user A gives a transmission instruction.

According to the seventeenth modification, it is possible to copy and paste remark contents among plural conversation groups by a simple operation.

When the user A stops the copying operation within the display area 136 of the copy source (for example, when the user A stops touching the display area 136), the controller 22 does not copy.

Eighteenth Modification

In an eighteenth modification, the controller 22 adds a user logged in to a certain conversation group to another conversation group.

Figure 26:
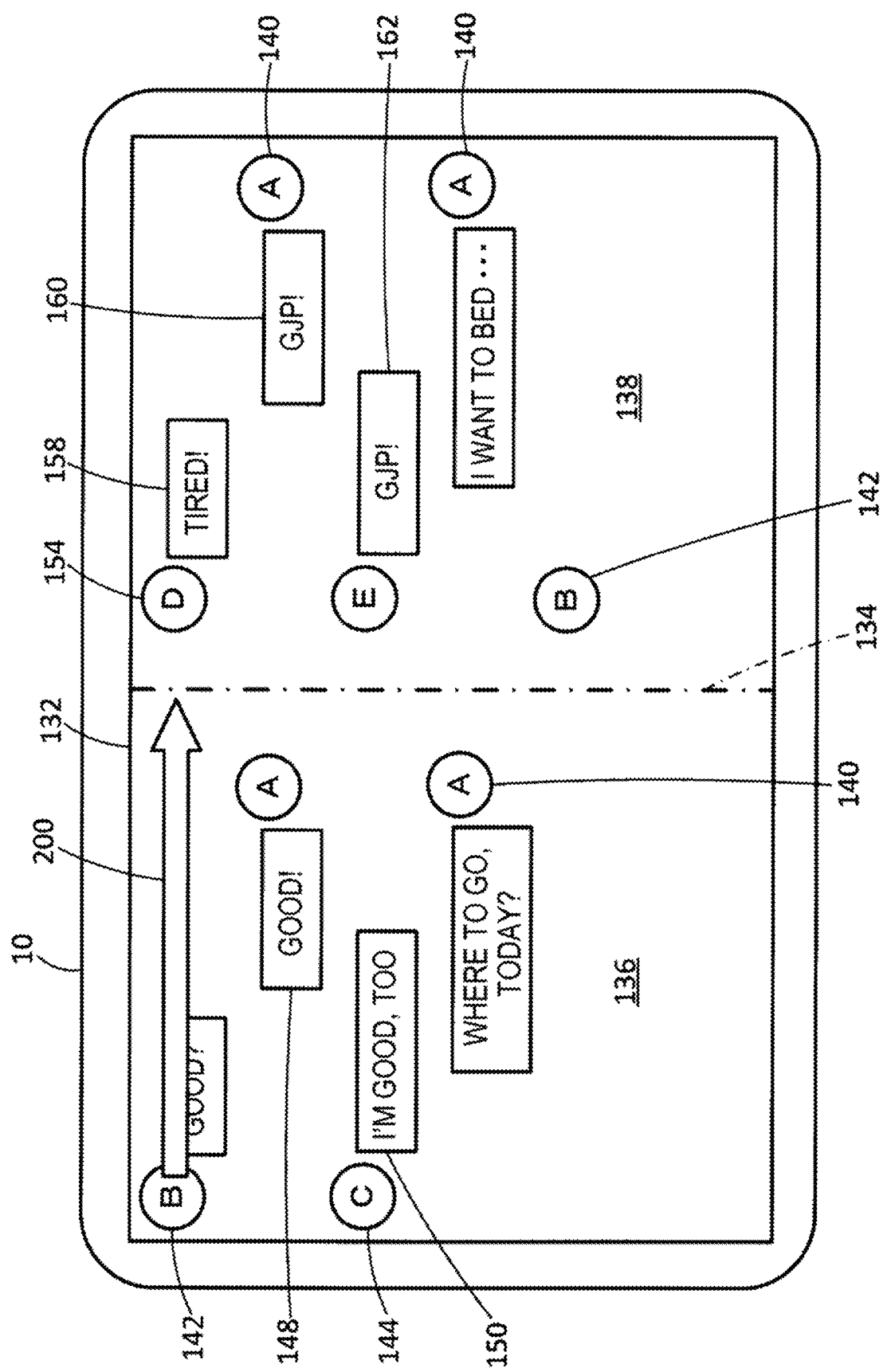
FIG. 26 is a view illustrating a screen.

The eighteenth modification will be described in detail below with reference to FIG. 26. FIG. 26 illustrates a screen 132. For example, when the user A designates the image 142 associated with the user B on the display area 136 of the conversation group 1 and performs an operation of adding it to the conversation group 2, the controller 22 adds the user B to the conversation group 2. The adding operation is, for example, an operation of sliding the image 142 in a direction indicated by an arrow 200. When the user A slides the image 142 of the user B to be added to the display area 138 of the conversation group 2 of the addition destination, the controller 22 may add the user B to the conversation group 2. In the example illustrated in FIG. 26, the image 142 associated with the user B is displayed within the display area 138 of the conversation group 2, whereby the user B is added to the conversation group 2. That is, the user B has logged in to the conversation group 2.

According to the eighteenth modification, it is possible to add a user logged in to a certain conversation group to another conversation group by a simple operation.

When the user A stops the adding operation within the display area 136 of the addition source (for example, when the user A stops touching the display area 136 or places an image of a user to be added in a specific display area within the display area 136), the controller 22 does not add a user.

In the eighteenth modification, when an approval of a user who is logging in to a conversation group to which another user is to be added is obtained, the other user may be added to the conversation group. On the other hand, when the approval is not obtained, the other user need not be added to the conversation group. For example, when the user A performs an operation of adding the user B who is logging in to the conversation group 1 to the conversation group 2, the terminal device 10A transmits an approval request to the terminal device 10D of the user D and the terminal device 10E of the user E. In this case, as in the first exemplary embodiment, an approval screen (for example, the approval screen 80 illustrated in FIG. 14) is displayed on the UI units 16 of the terminal devices 10D and 10E, and a message asking whether or not to approve the participation of the user B is displayed on the approval screen. When the user D approves the participation of the user B (for example, when the user D presses a "Yes" button on the approval screen), the terminal device 10D transmits information indicating the approval to the terminal devices 10A and 10B. When the user D does not approve the participation of the user B (for example, when the user D presses a "No" button on the approval screen), the terminal device 10D transmits information indicating no approval to the terminal devices 10A and 10B. The same applies to the user E.

When an approval is obtained by all users (for example, the users D and E), the user B is added to the conversation group 2. Otherwise, the user B will not be added to the conversation group 2. As another example, when an approval is obtained by a predetermined number of users, or when an approval is obtained by a specific user (for example, a user having approval authority), the user B may be added to the conversation group 2.

By requiring an approval as described above, it is possible to reflect the intention of a user who is logging in to a conversation group to which the user is to be added.

In addition, when the user B to be added accepts the participation, the user B is added to the conversation group 2. On the other hand, when the user B does not accept the participation, the user B need not be added to the conversation group 2. For example, the terminal device 10A transmits a participation request to the terminal device 10B of the user B. In this case, as in the first exemplary embodiment, an invitation screen (for example, the invitation screen 84 illustrated in FIG. 15) is displayed on the UI unit 16 of the terminal device 10B, and a message indicating that the user B is requested to participate in the conversation group 2 is displayed on the invitation screen. When the user B wishes to participate in the conversation group 2 (for example, when the user B presses a "Yes" button on the invitation screen), the terminal device 10B transmits information indicating the participation to the terminal device 10A. On the other hand, when the user B does not wish to participate in the conversation group 2 (for example, when the user B presses a "No" button on the invitation screen), the terminal device 10B transmits information indicating no participation to the terminal device 10A.

When the user B wishes to participate in the conversation group 2, the user B is added to the conversation group 2. When the user B does not wish to participate in the conversation group 2, the user B is not added to the conversation group 2. By doing this, it is possible to reflect the intention of a user to be added.

Further, when an approval of users (for example, the users D and E) who are logging in to a conversation group of an addition destination is obtained and a user to be added (for example, the user B) wishes to participate in the conversation group, the user to be added may be added to the conversation group.

Nineteenth Modification

Figure 27:
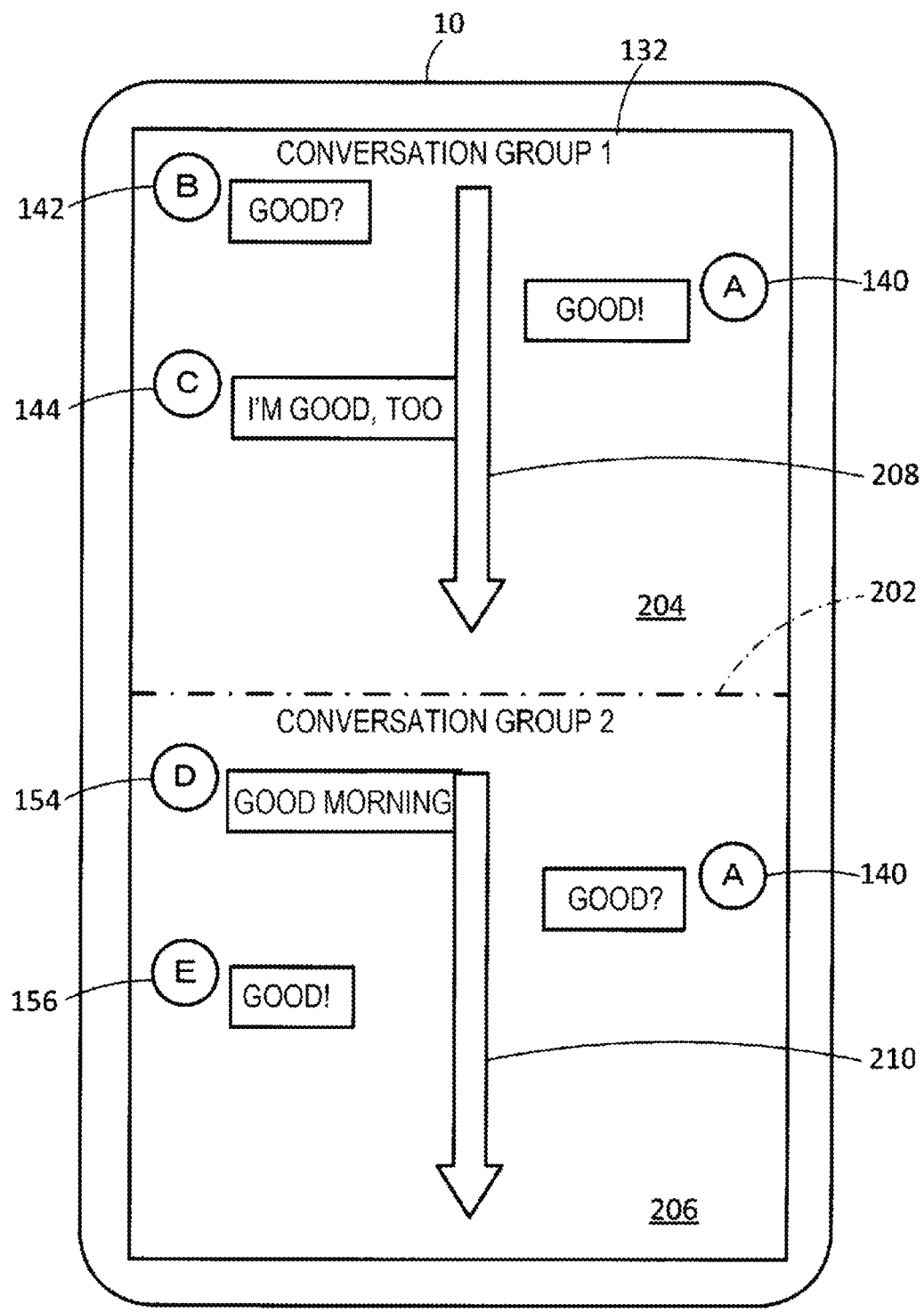
FIG. 27 is a view illustrating a screen.

In a nineteenth modification, the display controller 24 displays the conversation contents of plural conversation groups on the same screen in a state of being arranged in the vertical direction. Hereinafter, the nineteenth modification will be described in detail with reference to FIG. 27. FIG. 27 illustrates a screen 132.

The display controller 24 displays the conversation contents of the conversation groups 1 and 2 on the screen 132 in a state where the conversation contents are aligned in a vertical direction of the screen 132. For example, the display controller 24 sets display areas 204 and 206 in the vertical direction within the screen 132 with a virtual line 202 as a boundary, displays the conversation contents of the conversation group 1 in the display area 204, and displays the conversation contents of the conversation group 2 in the display area 206. The conversation contents between the users A, B and C logged in the conversation group 1 are displayed in the display area 204. The conversation contents between the users A, D and E logged in the conversation group 2 are displayed in the display area 206. When the user A has logged in to two conversation groups, the virtual line 202 is set, for example, at the center in the vertical direction of the screen 132. Also, the display controller 24 may control the size of each display area by changing the position of the virtual line 202 according to the length of a remark content in each conversation group. For example, the display controller 24 may change the position of the virtual line 202 so that the display area of a conversation group having a longer remark content is wider than the display area of a conversation group having a shorter remark content. Further, the display controller 24 may change the position of the virtual line 202 according to the amount of the remark content. For example, the display controller 24 may change the position of the virtual line 202 so that the display area of a conversation group with more remark contents is wider than the display area of a conversation group with fewer remark contents. The display controller 24 may change the position of the virtual line 202 according to the operation of the user. The display controller 24 may or may not display the virtual line 202 on the screen 132.

In the example illustrated in FIG. 27, the conversation contents of the two conversation groups are displayed on the same screen 132, but the conversation contents of three or more conversation groups may be displayed on the same screen 132.

For example, when the user A has logged in to one conversation group (for example, the conversation group 1), the display controller 24 displays the conversation content of the conversation group 1 on the vertical screen, as illustrated in FIG. 4. In this situation, when the user A logs in to another conversation group (for example, the conversation group 2), the display controller 24 aligns the conversation contents of the conversation groups 1 and 2 in the vertical direction of the screen 132.

When the user A performs an operation of scrolling the display area 204 of the conversation group 1, as indicated by an arrow 208, and the operation is detected, the display controller 24 scrolls the display area 204 in a direction indicated by the arrow 208. Further, the display controller 24 scrolls the display area 206 of the conversation group 2, as indicated by an arrow 210, in the same direction as the direction indicated by the arrow 208. By doing so, a display area on which the scroll operation is not actually performed is also scrolled, thereby saving the time of the scroll operation by the user.

Also, the display controller 24 may scroll the display area 204 on which the scroll operation has actually been performed and, in response to the scroll operation, may not scroll the display area 206 on which the scroll operation has not been performed. The interlock control (synchronous control) or non-interlock control (asynchronous control) may be set by the user.

In the example illustrated in FIG. 27, although the transmission date and time of the remark content and the read information are not displayed, they may be displayed.

Further, as in the sixteenth modification, the display controller 24 may scroll the display area on which the scroll operation has been performed to the display position of the unread message. The display controller 24 may scroll the display area on which the scroll operation has not been performed to the display position of the unread message, in response to the scroll of the display area on which the scrolling operation has been performed.

In addition, as in the twelfth modification, the display controller 24 may display a conversation content of an active conversation group on the display unit and may not display a conversation content of an inactive conversation group on the display unit. As in the thirteenth modification, the display controller 24 may color-code the remark contents of different users. As in the fifteenth modification, the display controller 24 may enlarge or reduce the display area of another conversation group in response to the enlargement or reduction of a display area of a certain conversation group. As in the seventeenth modification, the controller 22 may copy and paste the remark contents among plural conversation groups. As in the eighteenth modification, the controller 22 may add a user logged in to a certain conversation group to another conversation group.

Figure 28:
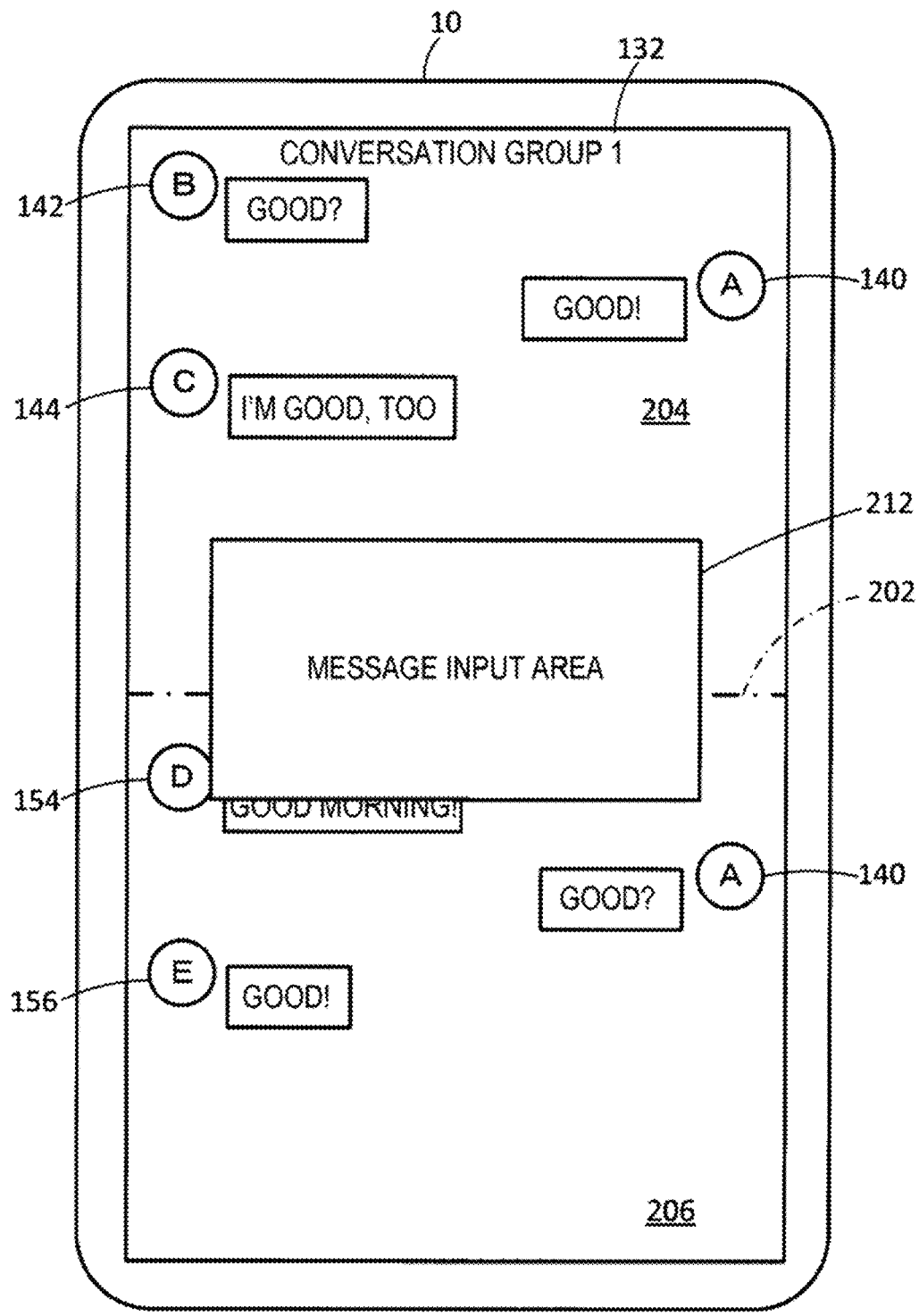
FIG. 28 is a view illustrating a screen.

Upon inputting a remark content (for example, a message), the display controller 24 displays an input area 212 on the screen 132, as illustrated in FIG. 28. When the user A inputs a message in the input area 212 and instructs transmission of the message, the message input in the input area 212 is transmitted to a conversation group designated as a transmission destination. For example, when transmitting a remark content to the conversation group 1, the user A designates the display area 204 of the conversation group 1. The display controller 24 displays the input area 212 on the screen 132 according to the designation. The display controller 24 may display the input area 212 in the display area 204 of the conversation group 1 or may display the input area 212 in the display area 206 of the conversation group 2 which is not the transmission destination of the remark content. Further, the display controller 24 may display the input area 212 on the screen 132 beyond the display areas 204 and 206. The setting of the display position and display size of the input area 212 may be performed by the user. When a message is input in the input area 212 and the transmission of the message is completed, the display controller 24 does not display the input area 212. Also, after inputting the message in the input area 212, the user A may designate a conversation group to which the message is to be transmitted. For example, when the user A moves the input area 212 to a certain display area by an operation such as a flick operation, the controller 22 transmits the message to a conversation group associated with the display area.

In addition, the display controller 24 may switch between a laterally long screen (see FIG. 20) and a vertically long screen (see FIG. 27) according to screen switching conditions. The screen switching conditions may be set by the user or may be predetermined. For example, the display controller 24 may switch between the laterally long screen and the vertically long screen depending on the total size of the screen 132, the number of conversation groups in which the user A is logging in, the number and length of remarks of conversation group per unit time, the number of unread messages per unit time, the number and length of remarks in the recent (the time between the present time and the time before a predetermined time since the present time), the number of most recent unread messages, the total number of remarks, the total length of remarks, the total number of unread messages, etc. The display controller 24 may switch the screen according to plural conditions. For example, the display controller 24 may use the vertically long screen when the number of conversation groups to which the user A is logging in is equal to or greater than a predetermined threshold value, and may use the laterally long screen when the number of conversation groups is smaller than the threshold value. Also, the display controller 24 may switch between the laterally long screen and the vertically long screen according to an instruction from the user.

Twentieth Modification

Figure 29:
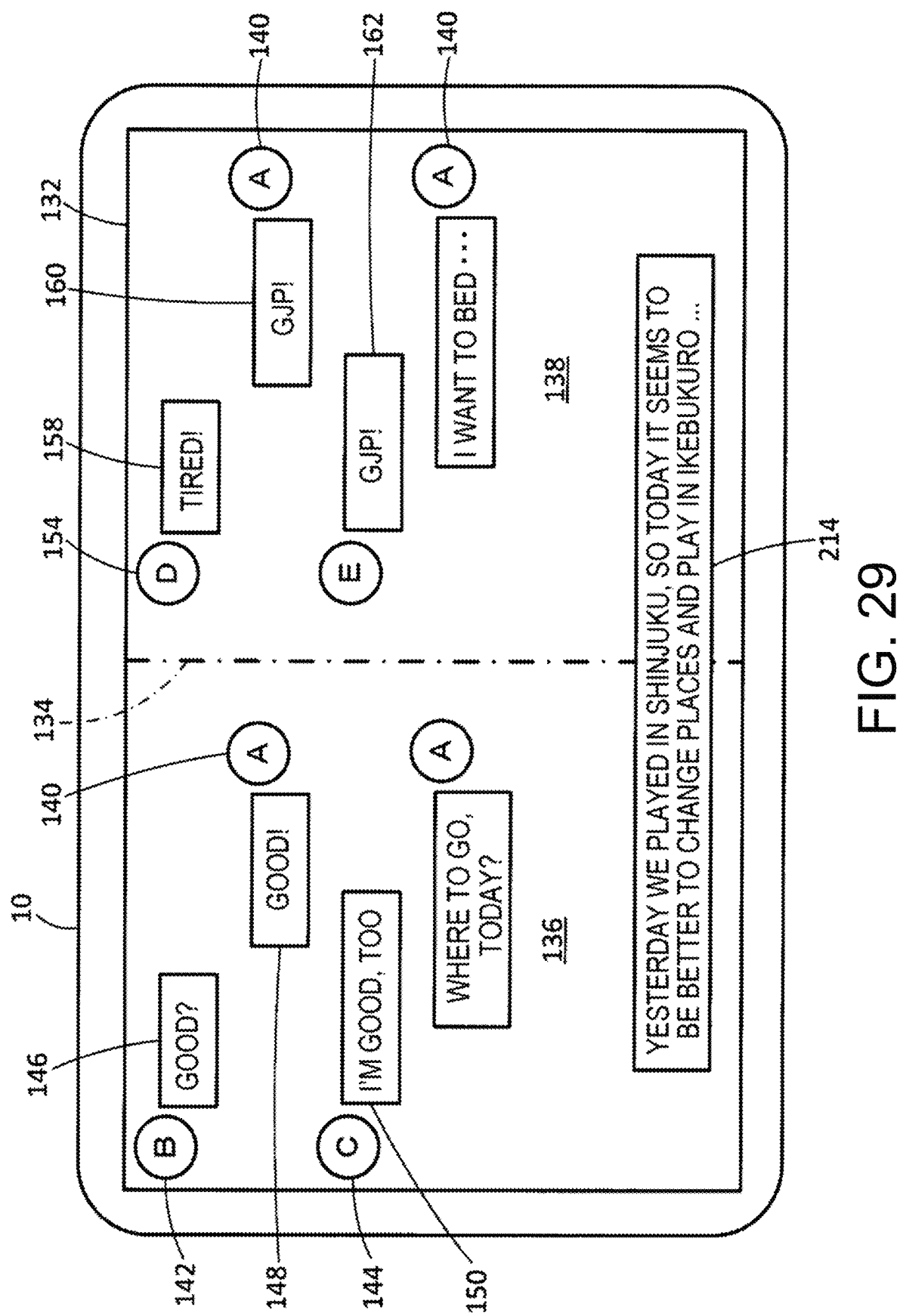
FIG. 29 is a view illustrating a screen.
Figure 30:
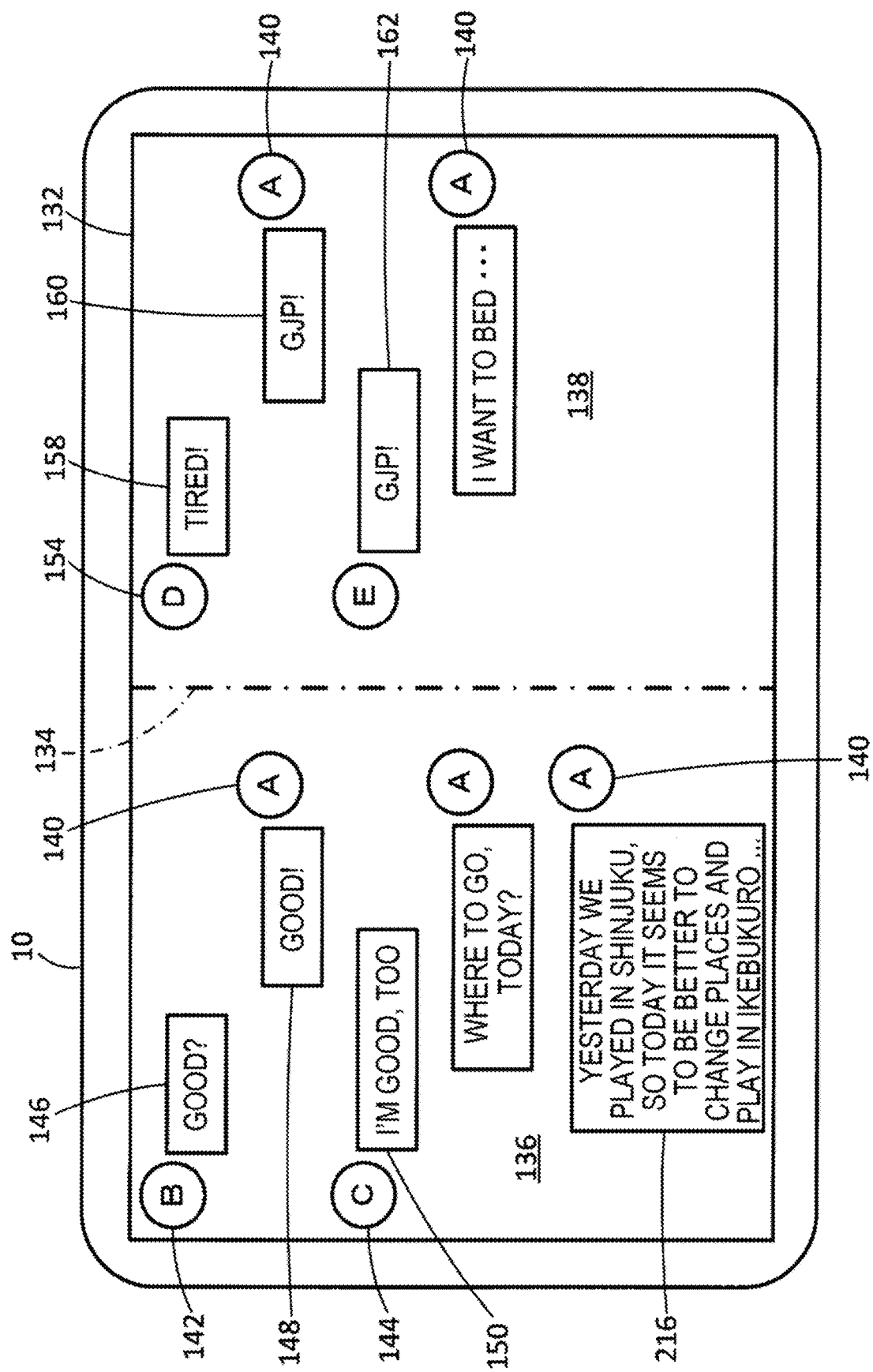
FIG. 30 is a view illustrating a screen.

In a twentieth modification, the display controller 24 displays an input area for inputting a remark content on the screen across the display areas of plural conversation groups. When the transmission of the remark content is completed, the display controller 24 does not display the input area and displays the remark content in a display area of a conversation group of a transmission destination. Hereinafter, the twentieth modification will be described in detail with reference to FIGS. 29 and 30. FIGS. 29 and 30 illustrate a screen 132.

For example, when inputting a remark content (message), the display controller 24 displays an input area 214 on the screen 132, as illustrated in FIG. 29. At this time, the display controller 24 displays the input area 214 on the screen 132 across the display area 136 of the conversation group 1 and the display area 138 of the conversation group 2. When the user A inputs a message in the input area 214 and instructs transmission of the message, the message is transmitted to the terminal device 10 of a user who is logging in to a conversation group designated as a transmission destination. The designation of the conversation group of the transmission destination may be performed before the display of the input area 214 or after the display of the input area 214. For example, when the user A designates the display area 136 of the conversation group 1, the controller 22 identifies the conversation group 1 as a conversation group of the transmission destination, and the display controller 24 displays the input area 214 on the screen 132. Subsequently, when the user A inputs a message in the input area 214 and instructs transmission of the message, the message is transmitted to the terminal devices 10 of the users B and C who are logging in to the conversation group 1, as the remark content of the user A. As another example, when the user A gives a display instruction of the input area 214, the display controller 24 displays the input area 214 on the screen 132. Subsequently, when the user A inputs a message in the input area 214 and designates the conversation group 1 of the transmission destination to give a transmission instruction, the message is transmitted to the terminal devices 10 of the users B and C who are logging in to the conversation group 1, as the remark content of the user A. For example, when the user A moves the input area 214 into the display area 136 of the conversation group 1 by a flick operation or the like, the controller 22 transmits the message to the terminal devices 10 of the users B and C.

When the message of the user A is transmitted, as illustrated in FIG. 30, the message is displayed in the display area 136 in association with the image 140 of the user A, as a remark content 216 of the user A. When the transmission of the message is completed, the display controller 24 does not display the input area 214.

21st Modification

Figure 31:
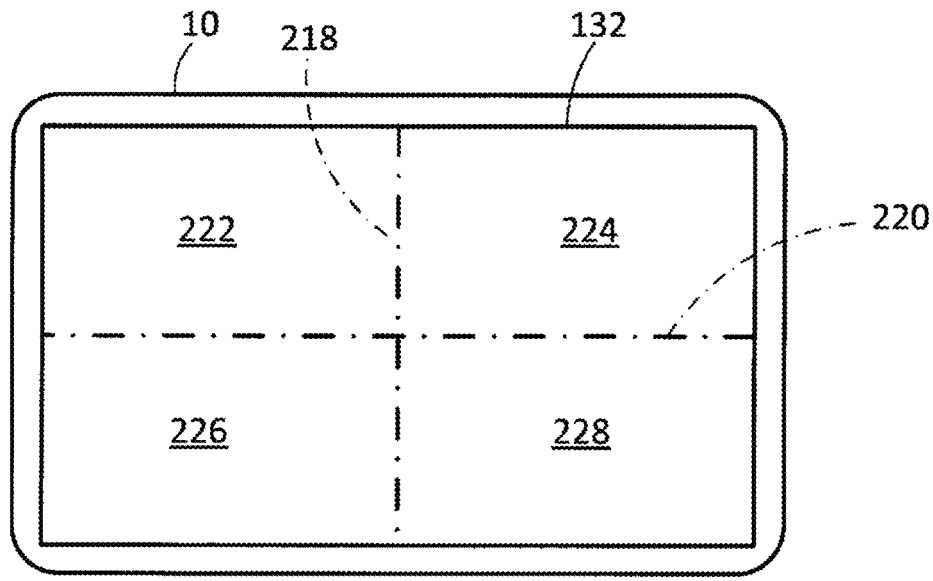
FIG. 31 is a view illustrating a screen.
Figure 32:
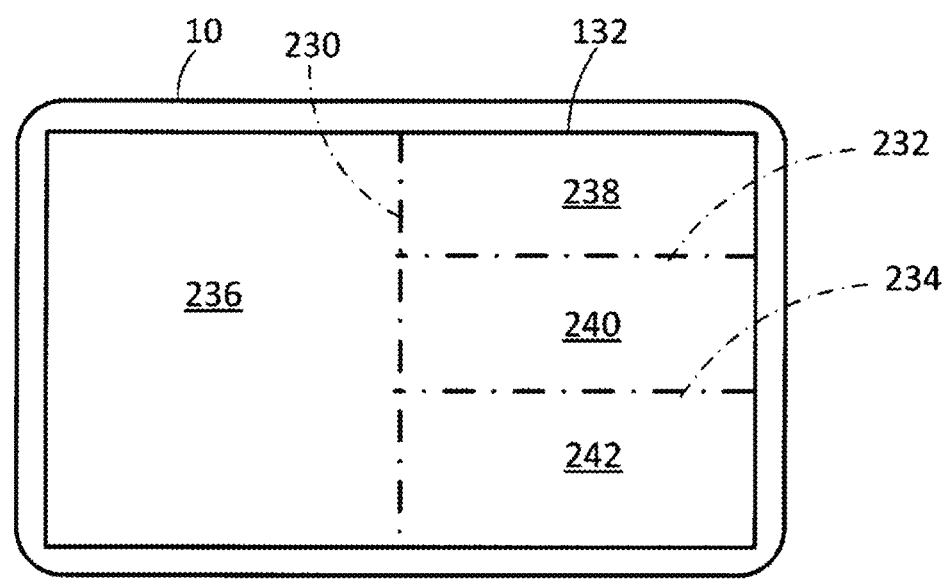
FIG. 32 is a view illustrating a screen.

A 21st modification will be described with reference to FIGS. 31 and 32. In the second exemplary embodiment, the conversation contents of two conversation groups are displayed on the same screen, but the conversation contents of three or more conversation groups may be displayed on the same screen. FIGS. 31 and 32 illustrate display examples in a case where the number of conversation groups is four.

For example, when the user A is logging in to four conversation groups 1, 2, 3 and 4, the display controller 24 sets four display areas 222, 224, 226 and 228 by setting a virtual line 218 dividing a screen 132 laterally and a virtual line 220 dividing the screen 132 vertically, as illustrated in FIG. 31. For example, the display controller 24 displays the conversation content of the conversation group 1 in the display area 222, displays the conversation content of the conversation group 2 in the display area 224, displays the conversation content of the conversation group 3 in the display area 226, and displays the conversation content of the conversation group 4 in the display area 228. The sizes of the display areas may be equal to each other or may be different from each other depending on the number and length of remarks of each conversation group. The size of each display area may be changed by the user, or, when a certain display area is enlarged or reduced, another display area may be enlarged or reduced in response thereto.

FIG. 32 illustrates another display example. In this example, the display controller 24 sets four display areas 236, 238, 240 and 242 by setting a virtual line 230 dividing a screen 132 laterally and virtual lines 232 and 234 dividing the lateral half (for example, the right half) of the screen into three areas in the vertical direction. The display area 236 is wider than the other display areas, and the display areas 238, 240 and 242 have the same size. For example, the display area 236 is used as a main display area in which the conversation content of a main conversation group designated by the user is displayed. The display areas 238, 240 and 242 are used as sub display areas in which the conversation contents of conversation groups other than the main conversation group are displayed.

The display controller 24 may change the conversation group displayed in the main display area 236 according to a priority. The priority is determined, for example, depending on the number and length of remarks of conversation group per unit time, the number of unread messages per unit time, the number and length of remarks in the recent (the time between the present time and the time before a predetermined time since the present time), the number of most recent unread messages, the total number of remarks, the total length of remarks, the total number of unread messages, etc. For example, the display controller 24 may display the conversation content of a conversation group having the largest number of recent remarks in the display area 236, or may display the conversation content of a conversation group having the longest recent remark in the display area 236, or may display the conversation content of a conversation group having the largest number of recent unread messages in the display area 236. Further, the display controller 24 may display the conversation content of an active conversation group in the display area 236. Further, the display controller 24 may change the size of each of the display areas 238, 240 and 242 according to the priority.

Third Exemplary Embodiment

Hereinafter, an information processing system and a terminal device 10 according to a third exemplary embodiment will be described. In the third exemplary embodiment, the display controller 24 switches between the display control according to the first exemplary embodiment and the display control according to the second exemplary embodiment according to the switching conditions. That is, the display controller 24 switches between a screen representing the conversation content of one conversation group and a screen representing the conversation contents of plural conversation groups according to the switching conditions. Hereinafter, the process according to the switching conditions will be described in detail.

For example, the display controller 24 may switch the display control according to the number of conversation groups to which the user A is logging in. Specifically, the display controller 24 executes the display control according to the first exemplary embodiment when the number of conversation groups to which the user A is logging in is equal to or greater than a predetermined threshold value, and executes the display control according to the second exemplary embodiment when the number of conversation groups to which the user A is logging in is smaller than the predetermined threshold value. The threshold value may be changed by the user.

For example, it is assumed that the threshold value is "3." When the user A has logged in to three or more conversation groups (for example, conversation groups 1, 2 and 3), the display controller 24 executes the display control according to the first exemplary embodiment. In other words, the display controller 24 changes the screen of a conversation group being displayed to the screen of another conversation group according to a changing operation by the user. For example, in the case where the screen of the conversation group 1 is displayed on the display unit, when the changing operation is performed by the user, the display controller 24 changes the screen from the screen of the conversation group 1 to the screen of the conversation group 2. On the other hand, when the user A has logging in to two conversation groups (for example, conversation groups 1 and 2), the display controller 24 executes the display control according to the second exemplary embodiment. That is, the display controller 24 displays the conversation contents of the conversation groups 1 and 2 on the same screen.

In the case of displaying the conversation contents of plural conversation groups on the same screen, as the number of conversation groups increases, the display area of the conversation content of each conversation group is narrowed, which makes it hard for the user to see the conversation content. On the other hand, the smaller the number of conversation groups is, the wider the display area of each conversation content can be. Therefore, even when the conversation contents of the plural conversation groups are displayed on the same screen, the conversation content can be more easily seen for the user than a case where the conversation contents of more conversation groups are displayed on the same screen. Therefore, when the number of conversation groups is equal to or larger than the threshold value, by executing the display control according to the first exemplary embodiment, it is possible to change the screen of each conversation group while preventing the conversation content of each conversation group from becoming invisible to the user. In addition, when the number of conversation groups is smaller than the threshold value, by executing the display control according to the second exemplary embodiment, it is possible to display the conversation contents of the plural conversation groups in a state easy for the user to see while eliminating a need to change the screen.

In addition, as a combination of the first exemplary embodiment and the second exemplary embodiment, the display controller 24 may change the screen representing the conversation contents of the plural conversation groups to a screen representing the conversation contents of other plural conversation groups according to a changing operation by the user. This process will be described in detail with reference to FIGS. 33 and 34.

Figure 33:
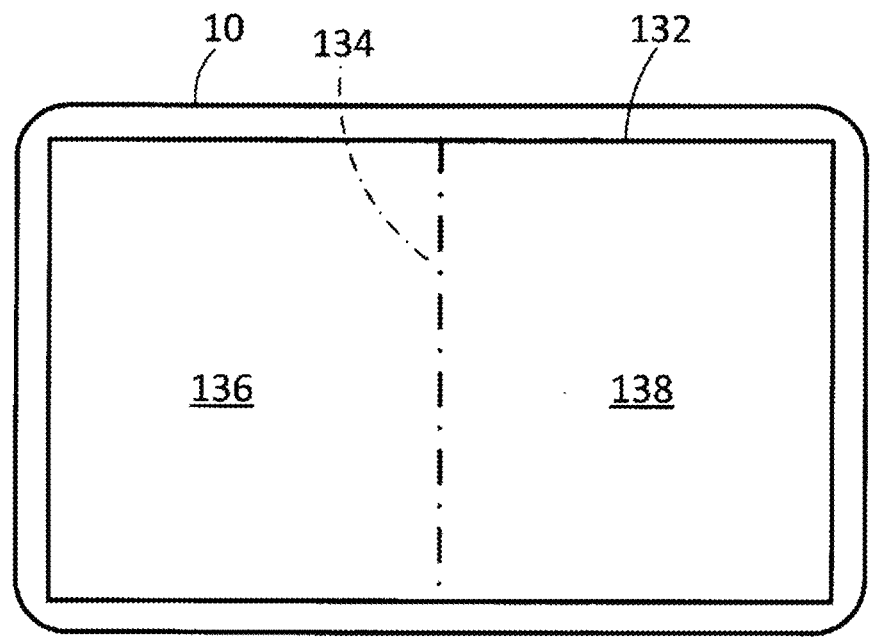
FIG. 33 is a view illustrating a screen.
Figure 34:
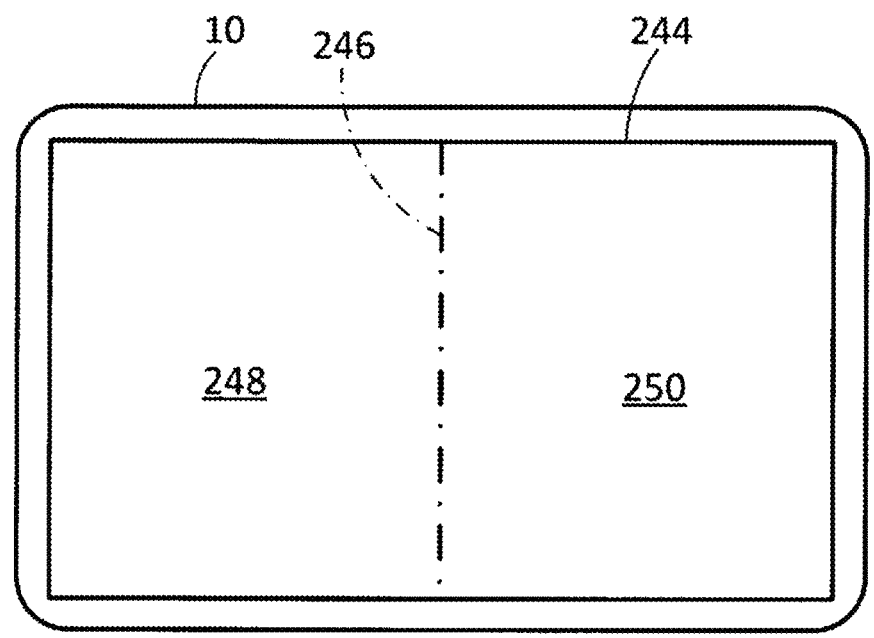
FIG. 34 is a view illustrating a screen.

A screen 132 is illustrated in FIG. 33, and a screen 244 is illustrated in FIG. 34. For example, it is assumed that the user A has logged in to conversation groups 1, 2, 3 and 4. On the screen 132, the display areas 136 and 138 are defined by a virtual line 134. Similarly, on the screen 244, the display areas 248 and 250 are defined by a virtual line 246. As an example, the display area 136 is an area in which the conversation content of the conversation group 1 is displayed, the display area 138 is an area in which the conversation content of the conversation group 2 is displayed, the display area 248 is an area in which the conversation content of the conversation group 3 is displayed, and the display area 250 is an area in which the conversation content of the conversation group 4 is displayed. For example, the display controller 24 may determine a display area in which the conversation content of each conversation group is displayed, according to the order in which the user A logs in to each conversation group, or the user A may designate a display area of each conversation group. Alternatively, the display area of each conversation group may be determined according to the priority described in the 21st modification. The size of each display area may be changed by the user, or may be determined according to a priority, or may be predetermined.

For example, while the screen 132 is being displayed on the display unit, when a changing operation is performed by the user, as in the first exemplary embodiment, the display controller 24 changes the screen being displayed from the screen 132 to the screen 244. By doing so, the user A may make a conversation with the plural conversation groups without performing a screen changing operation. Further, the user A may make a conversation with other plural conversation groups by performing a simple screen changing operation.

Other Exemplary Embodiments

Figure 35:
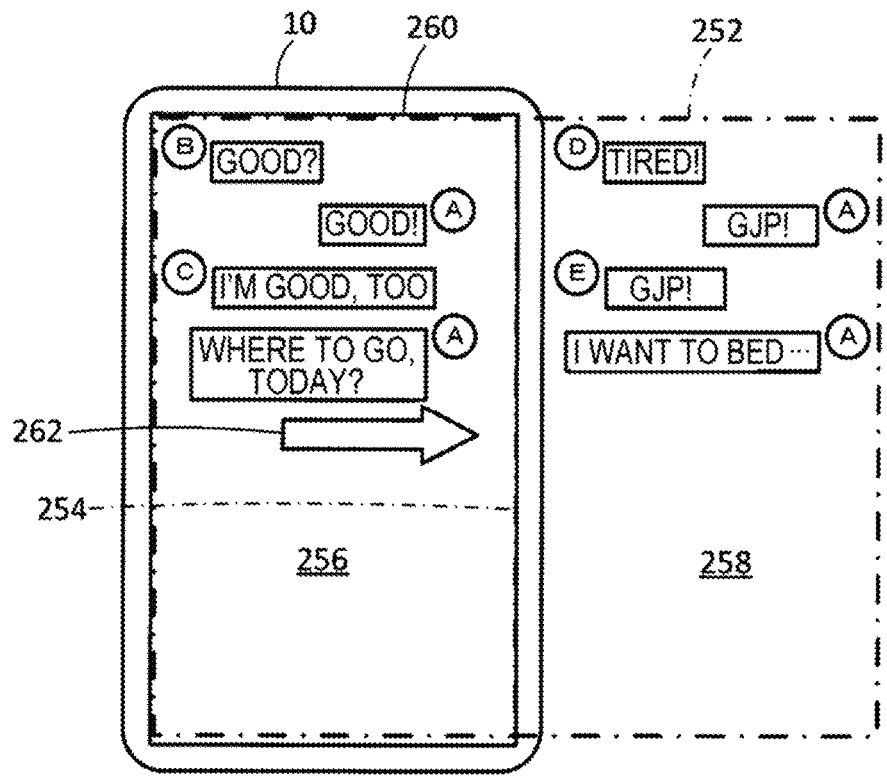
FIG. 35 is a view illustrating a screen.
Figure 36:
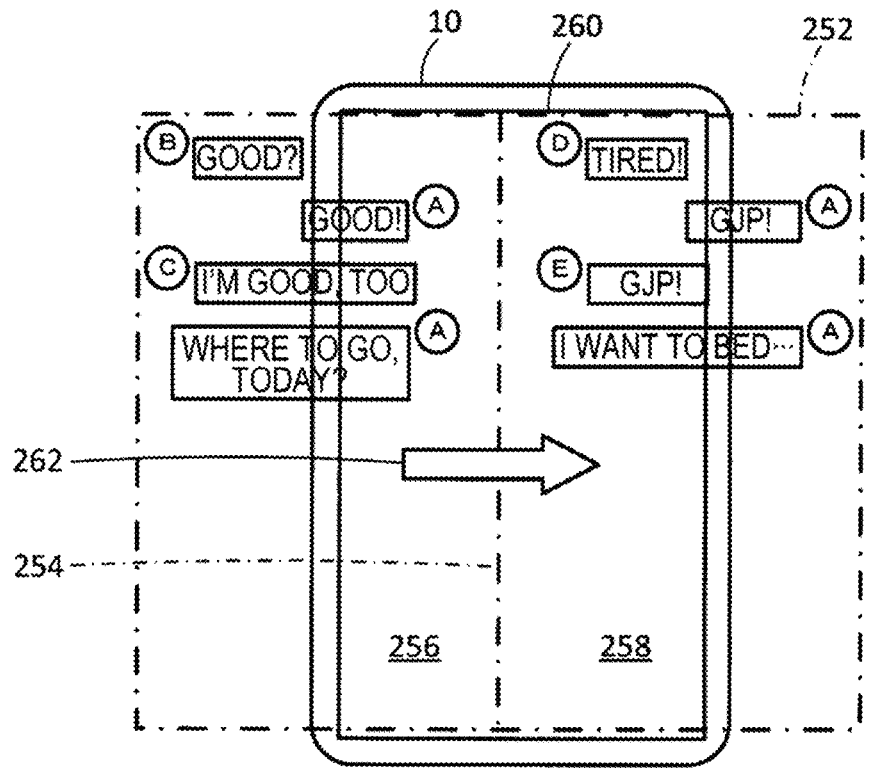
FIG. 36 is a view illustrating a screen.
Figure 37:
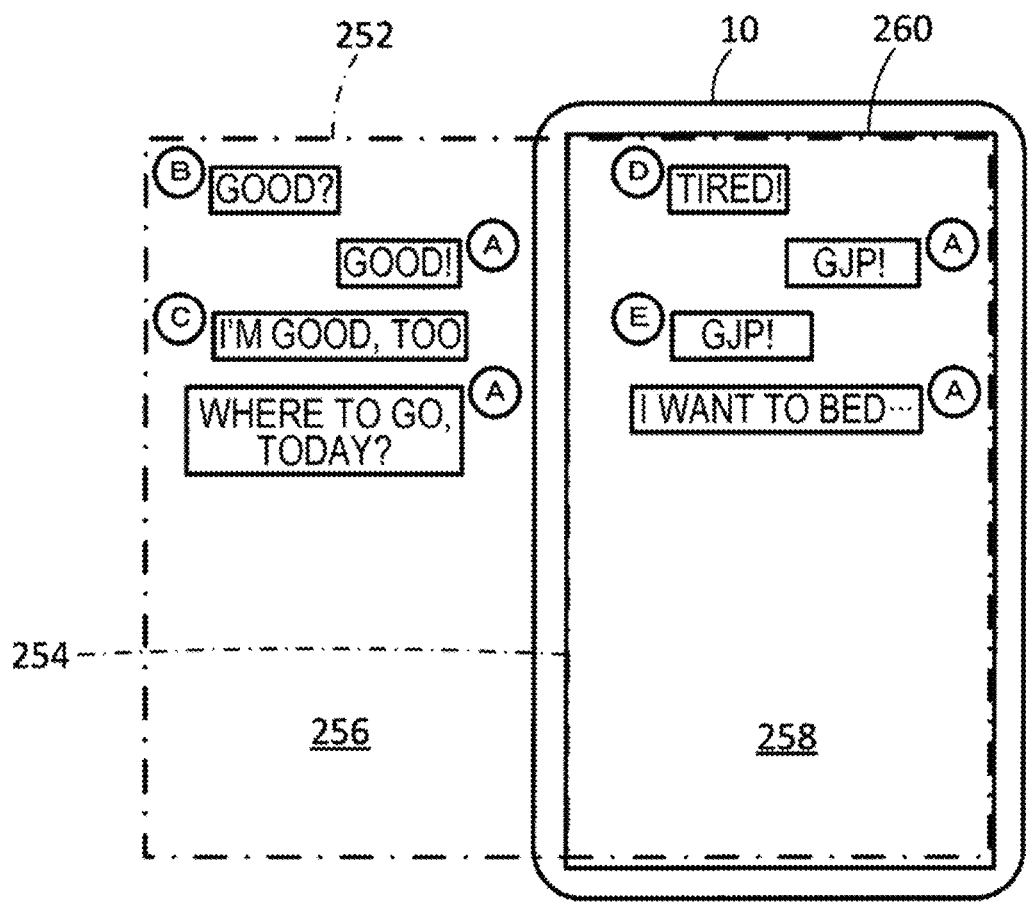
FIG. 37 is a view illustrating a screen.

In the first exemplary embodiment, the screen may be gradually changed according to the user's changing operation. This process will be described below with reference to FIGS. 35 to 37. FIGS. 35 to 37 illustrate screens displayed on the terminal device 10.

For example, it is assumed that the user A has logged in to the conversation groups 1 and 2. In this case, as illustrated in FIGS. 35 to 37, the controller 22 forms a display area 252, sets a virtual line 254 in the display area 252, and sets display areas 256 and 258. The controller 22 arranges the conversation contents of the conversation group 1 in the display area 256 and arranges the conversation contents of the conversation group 2 in the display area 258. This arrangement situation may be, for example, the same as the arrangement situation of the conversation contents according to the second exemplary embodiment.

In the examples illustrated in FIG. 35 to FIG. 37, the display area 252 is wider than the screen 260 of the terminal device 10. More specifically, the lateral width of the display area 252 is wider than the lateral width of the screen 260. Therefore, the entire display area 252 cannot be displayed at once on the screen 260. In the example illustrated in FIG. 35, the display area 256 of the conversation group 1 is displayed on the screen 260, and the user A may make a conversation with the users B and C who are logging in to the conversation group 1. This display state is the same as the display state illustrated in FIG. 4. The display area 258 of the conversation group 2 is not displayed on the screen 260.

In a state where the display area 256 is displayed on the screen 260, when the user A operates the screen 260 in the direction of the display area 258 of the conversation group 2 (for example, when the user A performs a flick operation or a slide operation in the direction indicated by an arrow 262), the display controller 24 changes the location of the display area 252 displayed on the screen 260 according to the operation amount. For example, as illustrated in FIG. 36, a portion of the display area 256 and a portion of the display area 258 are displayed on the screen 260 according to the operation amount. In this manner, the display area 256 of the conversation group 1 and the display area 258 of the conversation group 2 are continuously displayed on the screen 260.

When the user A further operates the screen 260 in the direction of the arrow 262, the display controller 24 changes the location of the display area 252 displayed on the screen 260 according to the operation amount. For example, as illustrated in FIG. 37, the entire display area 258 is displayed on the screen 260 according to the operation amount. In this state, the display area 256 is not displayed on the screen 260.

As described above, the display area of a certain conversation group and the display area of another conversation group are connected, and an area displayed on the screen 260 may be continuously changed by the operation of the user.

In the first to third exemplary embodiments and the modifications thereof described above, the user's conversation partner is not limited to a user as a human being, but may be an automatic response artificial intelligence (AI). Some or all of speakers that belong to a conversation group may be an automatic response AI. In other words, both another user as human beings and an automatic response AI may belong as speakers to a conversation group (mixture of a user and an automatic response AI), or all speakers may be an automatic response AI.

The automatic response AI has a function of analyzing a remark content of each user and providing the user with an answer such as a response to the remark content. The automatic response AI may be a so-called chat-bot (an automatic conversation program making use of artificial intelligence). The automatic response AI has a learning function by artificial intelligence and may have the ability to make a judgment close to a person by its learning function. In addition, neural network type deep learning may be used, or reinforcement learning or the like which partially strengthens the learning field may be used, or genetic algorithm, cluster analysis, self-organization map, ensemble Learning, etc. may be used. Also, technologies related to artificial intelligence other than them may be used.

A program related to the automatic response AI may be installed in the terminal device 10 or may be installed in an external device such as the server 12 to provide the function of the automatic response AI from the external device to the terminal device 10.

Each of the terminal device 10 and the server 12 is realized by cooperation of hardware and software as an example. Specifically, each of the terminal device 10 and the server 12 includes one or plural processors such as a CPU (not shown). When the one or plural processors read and execute a program stored in a storage device (not shown), the functions of the respective units of the terminal device 10 and the server 12 are realized. The program is stored in the storage device via a recording medium such as a CD or a DVD, or via a communication path such as a network. As another example, the respective units of the terminal device 10 and the server 12 may be realized by hardware resources such as a processor, an electronic circuit, an ASIC (Application Specific Integrated Circuit), and the like. A device such as a memory may be used for its realization. As still another example, the respective units of the terminal device 10 and the server 12 may be realized by a DSP (Digital Signal Processor), an FPGA (Field Programmable Gate Array) or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a display device; and
   a controller configured to:
   simultaneously display a first conversation screen, which is used for making a conversation with a user and a first conversation group, and a second conversation screen, which is used for making a conversation with the user and a second conversation group, on the display device;
   when a gesture movement performed toward the second conversation screen is received from a message transmitted by a person of the first conversation group, comprising:
      in response to the gesture movement ending on the second conversation screen, paste the message transmitted by the person of the first conversation group as a message with the user as a transmitter and the second conversation group as a destination, and display the pasted message in the second conversation screen; and
      in response to the gesture movement not ending on the second conversation screen, not paste the message transmitted by the person of the first conversation group among plural conversation groups.

2. The information processing apparatus according to claim 1, wherein the controller is configured to:
   transmit the pasted message to the second conversation group when an instruction to transmit the pasted message to the second conversation group is received from the user.

3. The information processing apparatus according to claim 1, wherein the message pasted by the gesture movement is transmitted by the person other than the user in the first conversation group.

4. An information processing method performed by a controller, comprising:
   simultaneously displaying a first conversation screen, which is used for making a conversation with a user and a first conversation group, and a second conversation screen, which is used for making a conversation with the user and a second conversation group, on a display device; and
   when a gesture movement performed toward the second conversation screen is received from a message transmitted by a person of the first conversation group, comprising:
      in response to the gesture movement ending on the second conversation screen, pasting the message transmitted by the person of the first conversation group as a message with the user as a transmitter and the second conversation group as a destination, and displaying the pasted message in the second conversation screen; and
      in response to the gesture movement not ending on the second conversation screen, not pasting the messages transmitted by the person of the first conversation group among plural conversation groups.

5. The information processing method according to claim 4, further comprising:
   transmitting the pasted message to the second conversation group when an instruction to transmit the pasted message to the second conversation group is received from the user.

6. The information processing method according to claim 4, wherein the message pasted by the gesture movement is transmitted by the person other than the user in the first conversation group.

7. A non-transitory computer readable medium storing a program that causes a computer to execute information processing, the information processing comprising:
   simultaneously displaying a first conversation screen, which is used for making a conversation with a user and a first conversation group, and a second conversation screen, which is used for making a conversation with the user and a second conversation group, on a display device;
   when a gesture movement performed toward the second conversation screen is received from a message transmitted by a person of the first conversation group, comprising:
      in response to the gesture movement ending on the second conversation screen, pasting the message transmitted by the person of the first conversation group as a message with the user as a transmitter and the second conversation group as a destination, and displaying the pasted message in the second conversation screen; and
      in response to the gesture movement not ending on the second conversation screen, not pasting the messages transmitted by the person of the first conversation group among plural conversation groups.

8. The non-transitory computer readable medium according to claim 7, wherein the information processing further comprises:
   transmitting the pasted message to the second conversation group when an instruction to transmit the pasted message to the second conversation group is received from the user.

9. The non-transitory computer readable medium according to claim 7, wherein the message pasted by the gesture movement is transmitted by the person other than the user in the first conversation group.

* * * * *